(12) United States Patent
Kidwell et al.

(10) Patent No.: US 7,343,753 B2
(45) Date of Patent: *Mar. 18, 2008

(54) COAXIAL-FLOW HEAT TRANSFER SYSTEM EMPLOYING A COAXIAL-FLOW HEAT TRANSFER STRUCTURE HAVING A HELICALLY-ARRANGED FIN STRUCTURE DISPOSED ALONG AN OUTER FLOW CHANNEL FOR CONSTANTLY ROTATING AN AQUEOUS-BASED HEAT TRANSFER FLUID FLOWING THEREWITHIN SO AS TO IMPROVE HEAT TRANSFER WITH GEOLOGICAL ENVIRONMENTS

(75) Inventors: John E. Kidwell, Tulsa, OK (US); Michael L. Fraime, Corrales, NM (US)

(73) Assignee: Kelix Heat Transfer Systems, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/193,044

(22) Filed: Jul. 29, 2005

(65) Prior Publication Data

US 2006/0201180 A1 Sep. 14, 2006

Related U.S. Application Data

(63) Continuation of application No. 11/076,428, filed on Mar. 9, 2005.

(51) Int. Cl.
*F25D 23/12* (2006.01)
*F24J 3/08* (2006.01)

(52) U.S. Cl. .......................................... 62/260; 165/45
(58) Field of Classification Search .................. 62/260; 165/45, 142
See application file for complete search history.

(56) References Cited

U.S. PATENT DOCUMENTS 3,456,319 A 7/1969 Gier, Jr.

(Continued)

FOREIGN PATENT DOCUMENTS

JP 59081444 5/1984
JP 8-193792 A * 7/1996

OTHER PUBLICATIONS

Scientific presentation entitled "Experimental Study on Thermal Resistance of Vertical Ground Heat Exchangers" by Hiroaki Okubo et al., Department of Earth Resources Engineering, Kyushu University, Fukuako, Japan, pp. 1-15.

(Continued)

*Primary Examiner*—Mohammad M. Ali
(74) *Attorney, Agent, or Firm*—Thomas J. Perkowski, Esq., P.C.

(57) ABSTRACT

A coaxial-flow heat transfer system installed in a geological environment and facilitating the transfer of heat energy between an external heat energy exchanging system and the geological environment. The coaxial-flow heat transfer system includes aqueous-based heat transfer fluid that is pumped through the external heat energy exchanging system so as to transfer heat between the aqueous-based heat transfer fluid and the external heat energy exchanging system. A coaxial-flow heat transfer structure is installed within the geological environment and has a proximal end and a distal end for exchanging heat between the source of aqueous-based heat transfer fluid at a first temperature and a geological environment at a second temperature. The coaxial-flow heat transfer structure comprises a thermally conductive outer tube section, and an inner tube section having an inner flow channel and being coaxially arranged within the outer tube section. An outer flow channel is formed between the inner and outer tube sections, and a helically-arranged fin structure is disposed along the outer flow channel, so as to form at least one helically-extending outer flow channel, for constantly rotating the aqueous-based heat transfer fluid flowing between the inner and outer flow channels, and thereby improving the transfer of heat energy between the aqueous-based heat transfer fluid and the geological environment along the length of the outer flow channel.

16 Claims, 81 Drawing Sheets

U.S. PATENT DOCUMENTS

| | | | |
|---|---|---|---|
| 4,317,268 A | | 3/1982 | Bowden et al. |
| 4,325,228 A | | 4/1982 | Wolf |
| 4,359,092 A | * | 11/1982 | Jones .................. 166/265 |
| 4,392,531 A | | 7/1983 | Ippolito |
| 4,419,802 A | | 12/1983 | Riese |
| 4,574,875 A | | 3/1986 | Rawlings et al. |
| 4,644,750 A | | 2/1987 | Lockett et al. |
| 4,741,388 A | | 5/1988 | Kuroiwa |
| 4,867,229 A | | 9/1989 | Mogensen |
| 4,993,483 A | * | 2/1991 | Harris .................. 165/45 |
| 5,025,634 A | | 6/1991 | Dressler |
| 5,333,465 A | * | 8/1994 | McBride ............... 62/53.1 |
| 5,365,750 A | * | 11/1994 | Greenthal .............. 62/293 |
| 5,375,661 A | * | 12/1994 | Daneshy et al. .......... 166/278 |
| 5,461,876 A | | 10/1995 | Dressler |
| 5,623,986 A | | 4/1997 | Wiggs |
| 5,738,164 A | * | 4/1998 | Hildebrand ............ 165/45 |
| 5,816,314 A | * | 10/1998 | Wiggs et al. ............ 165/45 |
| 5,937,665 A | | 8/1999 | Kiessel et al. |
| 5,937,934 A | * | 8/1999 | Hildebrand ............ 165/45 |
| 5,946,928 A | * | 9/1999 | Wiggs .................. 62/260 |
| 6,138,744 A | | 10/2000 | Coffee |
| 6,212,896 B1 | | 4/2001 | Genung |
| 6,250,371 B1 | * | 6/2001 | Amerman et al. ........ 165/45 |
| 6,251,179 B1 | | 6/2001 | Allan |
| 6,450,247 B1 | * | 9/2002 | Raff .................... 165/45 |
| 6,615,601 B1 | | 9/2003 | Wiggs |
| 6,672,371 B1 | * | 1/2004 | Amerman et al. ........ 165/45 |
| 6,789,608 B1 | | 9/2004 | Wiggs |
| 6,931,879 B1 | * | 8/2005 | Wiggs .................. 62/260 |

OTHER PUBLICATIONS

2007 Product Brochure for the Turbotec TRU-TWIST™ Heat Transfer Tubes, Turbotec Products, Inc., Windsor, CT, 2 pages.

2007 Product Brochure for the Turbotec Titanium Coaxial Heat Exchanger Series, Turbotec Products, Inc., Windsor, CT, 2 pages.

2007 Product Brochure for the Turbotec Titanium Heat Transfer Performance Comparison, Turbotec Products, Inc., Windsor, CT, 2 pages.

2007 Product Brochure for the Turbotec Pool-Safe™, Turbotec Products, Inc., Windsor, CT, 1 page.

2007 Webpage for Hangzhou Shenshi Heat Exchanger Co., Ltd., *http://www.coaxial-coils.com/advanatages.asp*, 1 page.

2007 Webpage for the Heat Pump Coaxial Coils by Hangzhou Shenshi Heat Exchanger Co., Ltd., *http://www.coaxial-coils.com/Heat-pump-coaxial-coils.htm*, 2 pages.

2007 Product Brochure for Coaxial Heat Exchanger by Hangzhou Shenshi Heat Exchanger Co., Ltd., Hangzhou City, China, 25 pages.

2007 Flotek™ Product Brochure for the Spiral Vane Centralizer by Flotek Industries, Inc., Houston, TX 2 pages.

2007 Flotek™ Product Brochure for the Turbo-Lok™ Rigid Vane Turbulator by Flotek Industries, Inc., Houston, TX 2 pages.

* cited by examiner

REAR VIEW

FRONT VIEW

TOP VIEW

FRONT VIEW

TOP VIEW

TOP VIEW

FRONT VIEW

FRONT VIEW

TOP VIEW

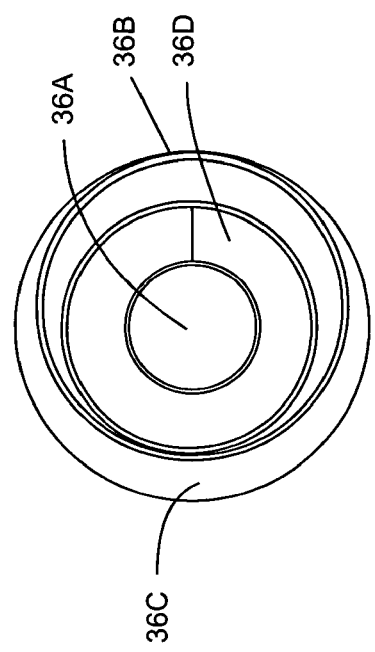
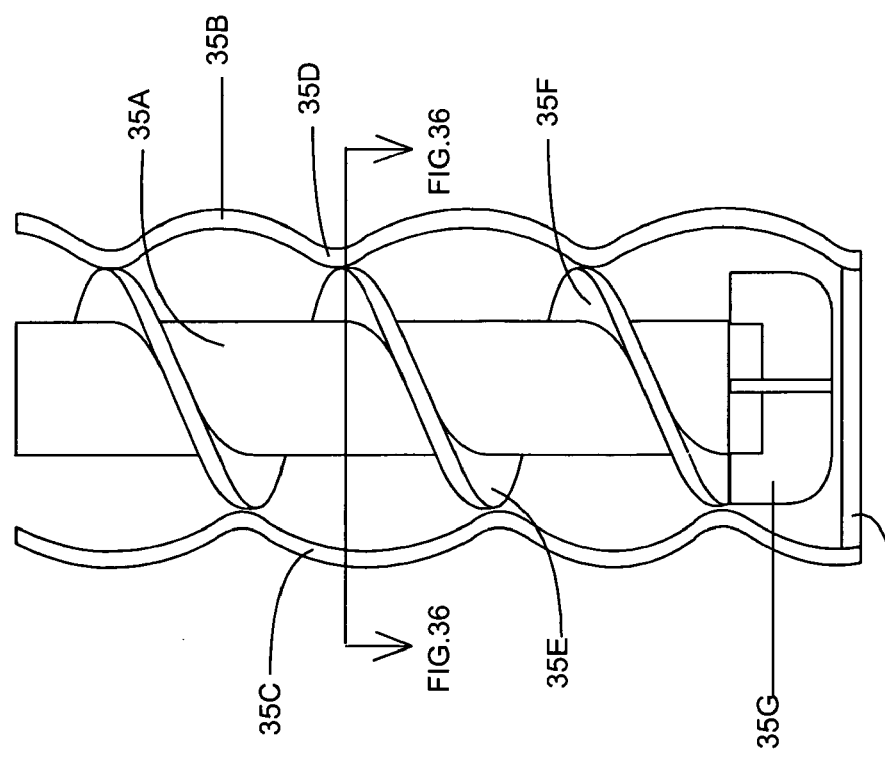

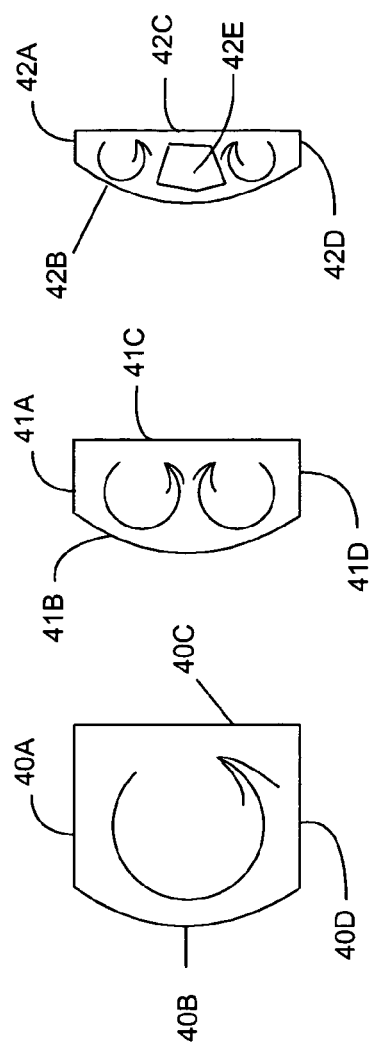
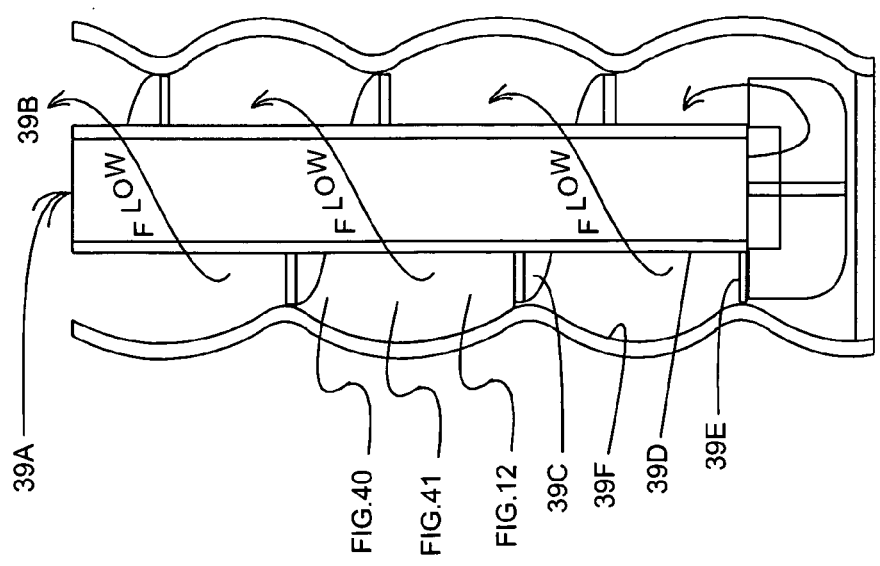

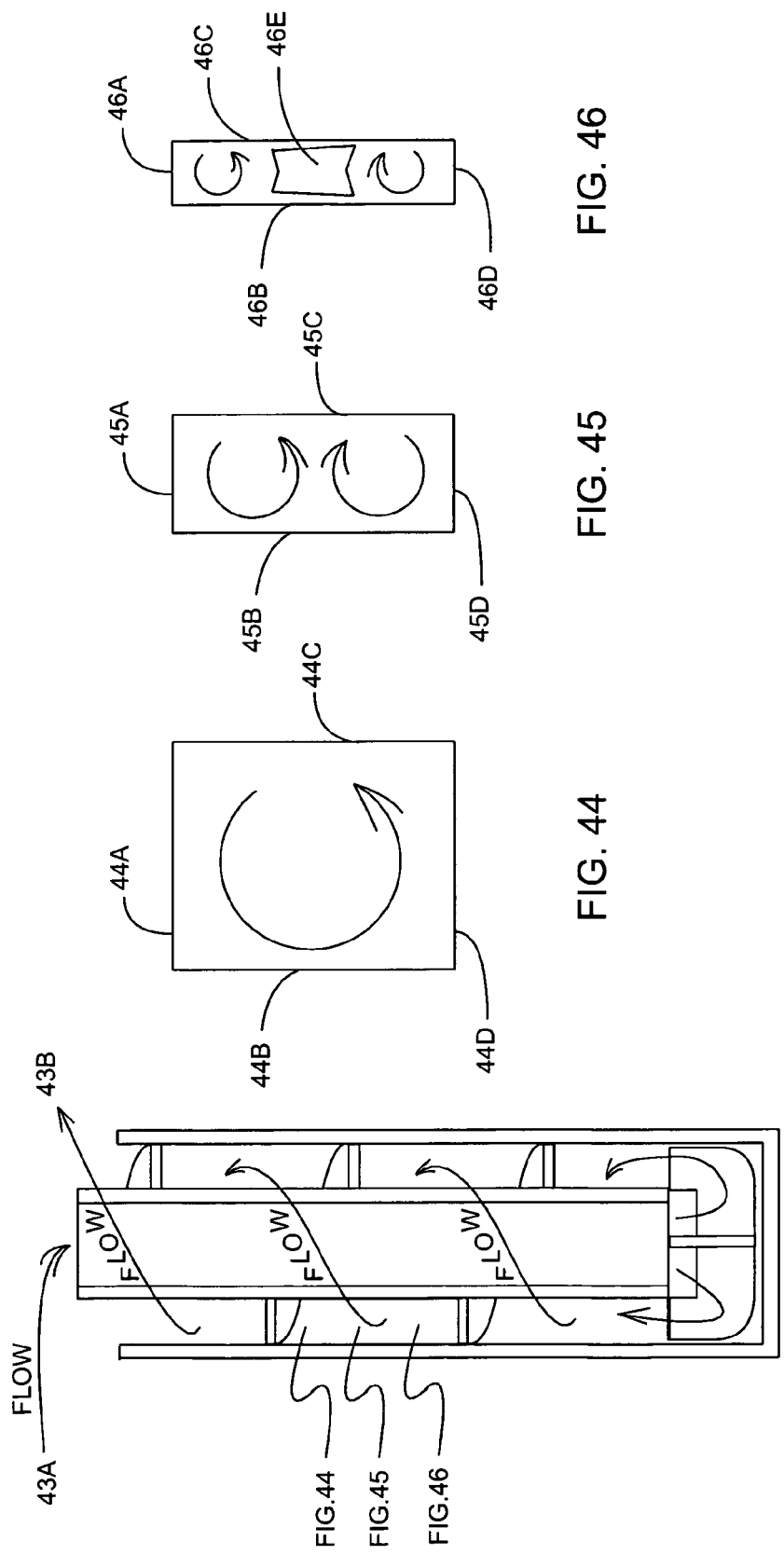

NATURAL GAS DEHYDRATION SYSTEM

TOP VIEW

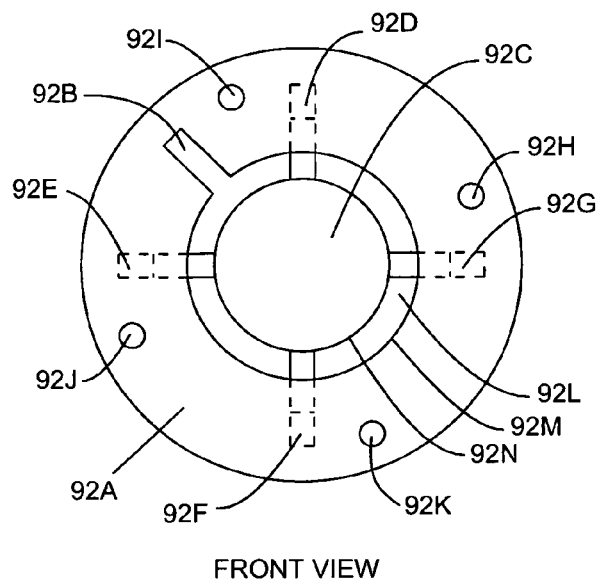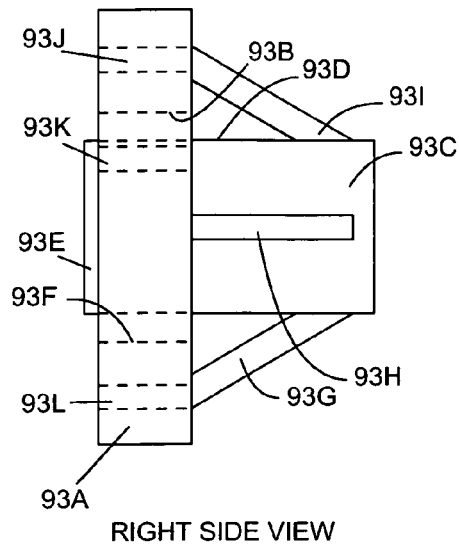
FIG. 92  FIG. 93
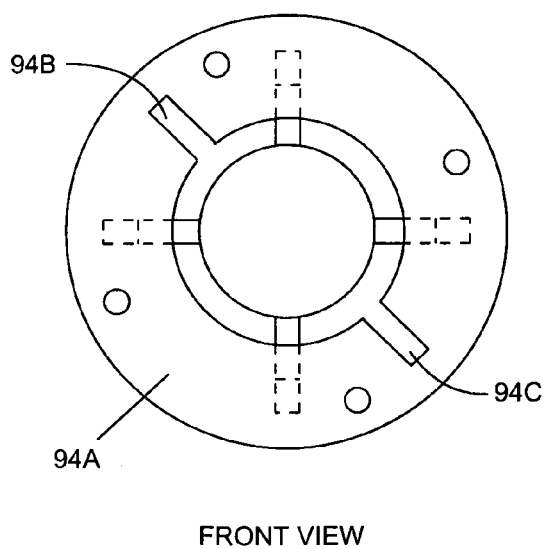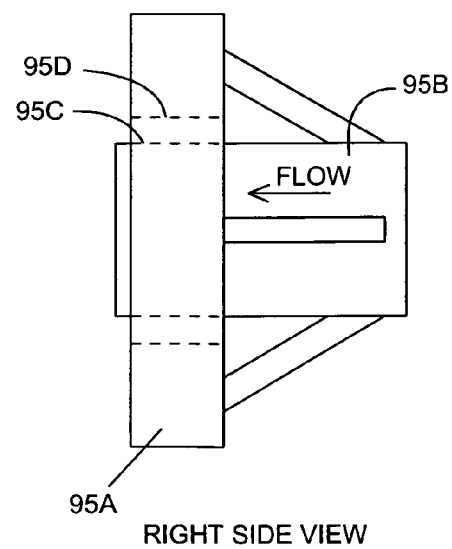
FIG. 94  FIG. 95

COAXIAL-FLOW HEAT TRANSFER SYSTEM EMPLOYING A COAXIAL-FLOW HEAT TRANSFER STRUCTURE HAVING A HELICALLY-ARRANGED FIN STRUCTURE DISPOSED ALONG AN OUTER FLOW CHANNEL FOR CONSTANTLY ROTATING AN AQUEOUS-BASED HEAT TRANSFER FLUID FLOWING THEREWITHIN SO AS TO IMPROVE HEAT TRANSFER WITH GEOLOGICAL ENVIRONMENTS

RELATED CASES

This application is a Continuation of the U.S. application Ser. No. 11/076,428 filed Mar. 9, 2005; said Application being assigned to and commonly owned by Kelix Heat Transfer Systems, LLC of Tulsa, Okla.

BACKGROUND OF THE INVENTION

1. Field of Invention

The present invention relates to a novel method of and apparatus for transferring heat using heat exchanging fluids that are safely isolated from the environment above and below the Earth's surface and circulated within a sealed heat exchanging structure so as to improve the heat transfer performance of aqueous-based fluid heat transfer systems, wherein the ground, a lake, a river, or sea water is used as the primary or secondary heat sink or heat source in the sealed heat exchanging structure.

2. Brief Description of the State of Knowledge in the Art

The development of refrigeration processes, associated equipment and two-phase chemical refrigerants evolved primarily from the need of mankind to preserve food. Several different kinds of heat transfer systems have been developed for dissipating heat removed from the food to the exterior of the food storage container.

One kind heat transfer system is a typical refrigeration system which includes an evaporator for absorbing heat from one location, a condenser for dissipating heat to another location, a compressor for compressing the vaporous two-phase refrigerant exiting the evaporator for delivery into the condenser where the refrigerant is condensed back into a liquid, and a two-phase throttling device connected to the evaporator inlet for receiving the liquid refrigerant and refrigerant expansion, to complete a refrigeration cycle.

Condensers can be constructed in various configurations, namely: as a tube with air-cooled fins, or as a water-cooled tube and shell configuration. In the water-cooled tube and shell condenser, the rate of heat transfer between the refrigeration-sealed system refrigerant and the water flowing around the tube and shell condenser tube is much higher than the rate of heat transfer between the refrigeration-sealed system refrigerant and air flowing around the tubes of the air-cooled fin and tube condenser.

A water-cooled tube and shell condenser is normally connected with pipes to a cooling tower and a water pump. The heat is absorbed by the water while circulated through the condenser. The heat in the water entering the cooling tower is then dissipated into the atmosphere from the water completing a closed-loop water-cooled refrigeration process.

Environmental concerns have caused strict restrictions to be placed on water-cooled tube and shell condenser systems utilizing a water pump to gather water from other sources such as a lake, river, sea water, and other fluid systems to be circulated through the water-cooled tube and shell condenser of heat transfer systems. Environmental contaminations vary but are mostly related to chemical concentrations and temperature variations being dispensed into the water source.

A water-cooled tube and shell condenser can be connected with pipes to a ground-source heat transfer well which is used to dissipate heat into the Earth. In various manufacturing processes, the required operating temperature and capacity or volume of heat transfer fluid circulated through the ground source heat transfer well, may not require adding refrigeration to the system.

Residential and commercial comfort air conditioning systems using air-cooled condensers are well known in the art and are used extensively world-wide on air conditioners including heat pumps. Water-cooled tube and shell condensers are normally used in large tonnage commercial and industrial applications such as high-rise buildings, natural gas dehydration, and liquefied natural gas gasification systems.

A heat pump, originally called reverse refrigeration, reverses the refrigeration process through the use of sealed system valves and controls causing the evaporator to dissipate heat while causing the condenser to absorb heat. In its cooling mode of operation, a heat-pump air conditioning system will dissipate heat into the Earth while, and absorb heat from the Earth in its heating mode of operation.

Over the years, ground/water source heat pump has proven very useful as a very efficient form of heating and cooling technology. The use of ground/water source type heat pumps have three distinct advantages over air source type heat pumps, namely: during the peak cooling and heating seasons, the ground/water source usually has a more favorable temperature difference than the atmospheric air; the liquid-refrigerant exchanger on the heat pump permits a closer temperature approach than an air-refrigerant exchanger; and there is no concern with frost/snow/ice/dirt buildup or removal on the heat exchanger.

In general, prior art heat pump installations have employed undersized ground loops because refrigerant-based fluids can provide a sufficient temperature difference between the fluid and the ground so that enough heat is transferred to and from the ground to match the heating/cooling load on the heat pump; however, the use of undersized ground loops is also known to reduce the SEER rating of the heat-pump system. Also, the design goals of prior art heat pump systems have been to minimize the length of the metal pipe used in the ground loop, while just passing the minimum standards for efficiency.

When prior art heat pump systems experience peaks or spikes in heating/cooling load during daily operation, thermal storage solutions are oftentimes added to the system to average the load over the time period of interest. Thermal storage solution also help reduce the cost of the ground loop by allowing the loop to be sized for the average base load over the day, week or season. In fact, many large buildings and residences use thermal storage solutions in order to reduce the cost of heating and cooling by (i) using less expensive night-time electrical loads to heat/cool the thermal mass, and then (ii) using the thermal mass to heat/cool the building during the day. In order to reduce capital cost of the heat pump system, prior art heat pump system installations often use the metal rebar in the foundation or piling as a major part of the thermal mass of the ground loop of the heat pump system.

Ground source or water source type heat pumps can use a close or open loop as a heat exchanger. Open loops include water circulated to cooling towers; water circulated between wells, geothermal steam wells, water circulated in a body of water such as a river or lake. Closed loops include aqueous based fluids and refrigerant based fluids circulated in cooling/heating coils that transfer heat to air, water, and ground. Most power plants use at least one open loop to generate steam (the burner exhaust) and one open loop (cooling towers or lake) to condense the steam back to water. The de-ionized steam source water is preserved in a close loop to prevent scale buildup in the heat exchanger. Most conventional refrigerators, freezers and air conditioners use a closed loop of refrigerant to cool the load and an open loop of external air to condense the refrigerant.

The shortcomings and drawbacks of using air to transfer heat from the condenser coil is that air requires a high temperature differential and a large condenser coil surface area to get reasonable heat transfer rates. The high temperature differentials translate to a high-pressure differential which implies higher energy costs to transfer a unit of heat. When a heat pump uses a liquid, from a water or ground loop, to transfer heat from the condenser coil, a smaller coil and a lower temperature and pressure differential can be used to transfer the same unit of heat as the air cool condenser coil which, in turn, improves efficiency and reduces energy costs.

When closed loops are used in the ground or water source of a heat pump system, there is a trade off between using (i) metal tubing with a high heat transfer coefficient (i.e. which is subject to corrosion and thermal expansion), and (ii) plastic tubing with a low heat transfer coefficient (which is resistant to corrosion and thermal expansion). For average soil conditions, plastic tubing usually will require 3 times the heat transfer area of the metal tubing to maintain an equivalent heat transfer rate. Metal tubing is usually reserved for refrigerant based fluids due to the high fill pressures and the reactivity of the refrigerant with plastic tubing.

While protective coatings and grouting can reduce the corrosion rates of metal tubing, pin holes in the coating or grout can actually concentrate the anode corrosion rate in the pin-hole area. Electrical measurements have shown that circulating aqueous based fluids between the ground loop and heat pump can cause the flow of a low level current between the building and the ground.

In accordance with convention, a close-loop ground/water source heat pump can use a refrigerant based fluid or an aqueous based fluid. With refrigerant based fluids, the heat pump can use a high differential temperature to transfer heat between the ground and the fluid in the tubing, but extra energy load reduces the SEER rating of the heat pump system. Metal tubing is used to contain the pressurized refrigerant based fluid and minimize the volume of refrigerant in the ground loop system due to the high heat transfer coefficient of the metal. As discussed in U.S. Pat. No. 5,025,634 to Dressler, refrigerant based fluids have very high maintenance cost when a small leak develops in the ground/water loop and a very high environmental impact when there is a release of the refrigerant. Also, over a long period of time, field experience has shown that high pressure head loss can develop in the closed ground/water source loop when lubricating oil from the compressor collects low spots in horizontal loop or at the bottom of the bore hole in vertical loop. The inventors design goal was to use an aqueous based fluid in the ground loop to overcome the environmental risk and maintenance problems with refrigerant based fluids.

With most aqueous-based fluid ground/water source loops, the heat pump uses a small close-loop refrigerant heat exchanger to transfer heat to or from the aqueous fluid. The small heat exchanger reduces the capital cost of the heat pump and reduces the chances of refrigerant releases to the environment. In areas with ground movement, such as earthquakes zones, subsidence bowls, and deep freeze/thaw zones, the borehole thermally-conductive flowguide tube and transfer piping can develop leaks due to repeated damage over time as discussed in U.S. Pat. No. 4,993,483 to Kurolwa. The inventors design goal was to use a judicious choice of components in the aqueous base fluid; so that, the environmental impact of a large leak can be reduced to non-hazardous spill and the impact of a small leak would be reduced to addition of make up fluid to the loop.

Ground loop installations vary from trenched horizontal loops to multiple bore holes. As disclosed in U.S. Pat. No. 4,644,750 to Lockett and Thurston and in U.S. Pat. No. 4,325,228 to Wolf, a horizontal ground loop's performance is affected by fluctuation in atmospheric surface temperature and soil moisture content, whereas, the ground loop based on multiple bore holes has a stable fluid temperature and heat transfer coefficient for both heating and cooling thermal loads. For heat and cooling loads located on small land surfaces or arid land, the ground loop heat exchanger based on multiple bore holes can provide a heat pump with a stable heat sink or source as described in U.S. Pat. No. 4,392,531 to Ippolito.

The first major improvements to ground loop fluid heat transfer using metal tubing and refrigerant based fluids were disclosed in U.S. Pat. No. 5,816,314 to Wiggs et. al, U.S. Pat. No. 5,623,986 to Wiggs, U.S. Pat. No. 5,461,876 to Dressler, U.S. Pat. No. 4,867,229 to Mogensen, and U.S. Pat. No. 4,741,388 by Kurolwa where metal tubing was bent into a helix shape to increase heat transfer between the refrigerant and the ground. The five patents show that the 'vertical spiral heat exchanger' or the 'bore-hole spiral heat exchanger' provides the heat pump with a stable heat sink or source for heating and cooling. The shortcoming of these designs is the increased capital cost of spiral bending of the tubing and the increased installation cost of trying to run spiral bent tubing in a deviated well.

Another popular technique used in prior art heat pumps involves insulating the metal, fluid-return tube from the bottom of the bore hole so to prevent heat transfer from incoming fluid, which significantly improves the heat exchanger performance. The deficiency of prior art insulating methods has caused a significant increase in installation costs and a significant increase in capital cost associated with insulating materials. Notably, as the return line was far enough away from the loop to not cause any significant thermal interference, insulating the fluid return tube was not required for earlier horizontal ground loop heat exchangers.

U.S. Pat. No. 4,741,388 to Kurolwa discloses using a spirally-corrugated outer tube to create the spiral flow shape for increased heat transfer of the fluid, which is similar to the spiral channeled tubes used in a steam boiler.

U.S. Pat. No. 5,623,986 to Wiggs discloses that external spirally shape fins can be used to drill short vertical heat exchangers into sand-loam soils or mud bottoms, but field experience has shown that there is to much fin damage for hard rock/ground surface. U.S. Pat. No. 5,937,665 to Kiessel et al., discloses other improvements to refrigerant based groundloops, wherein an air heat exchanger is used to the system to reduce the load on the ground loop.

U.S. Pat. No. 6,138,744 by Coffee discloses using a large storage tank of water to a horizontal ground loop that is continuously replenished by an external water source such as water well. This technique involves combining an open water loop and a lose ground loop.

U.S. Pat. No. 6,615,601 by Wiggs discloses combining a solar heating loop and a water evaporative cooling loop to the ground loop so as to supplement the heating and cooling load.

U.S. Pat. No. 6,212,896 to Genung discloses a ground loop with large well bores to make room for a vertical thermal siphon to enhance the heat transfer in the large well bore. The short coming of this idea is that the heat is transfer to the thermally-conductive flowguide tube wall with a laminar flow of fluid.

U.S. Pat. No. 6,672,371 to Amerman et al. created a ground loop by drilling multiple well bores from one pad and using plastic U-tubes for the heat exchanger. By using many plastic U-tubes with low heat transfer in series, an equivalent metal heat exchanger performance can be achieved in the ground loop.

U.S. Pat. No. 6,789,608 to Wiggs discloses a technique for extending the performance of the U-tube heat exchanger by installing an insulating plate between the tubes to make two close separate half wells with minimal thermal interference between each well.

Thus, while various advances have been made in heat pump system design and implementation, there is still a great need in the art for an improved method of and apparatus for transferring heat from above or below the Earth's surface using a sealed fluid circulation system which may or may not incorporate the use of a refrigeration system, while overcoming the shortcomings and drawbacks of prior art methodologies and equipment.

SUMMARY AND OBJECTS OF THE PRESENT INVENTION

Accordingly, it is a primary object of the present invention to provide a method of and apparatus for transferring heat from above or below the Earths surface using a sealed fluid circulation system employed a spiral-like heat transfer structure, while overcoming the shortcomings and drawbacks of prior art methodologies.

Another object of the present invention is to provide an axial flow a coaxial-flow heat exchanging structure having a proximal end and a distal end for exchanging heat between a source of fluid at a first temperature and the environment (e.g. ground, water, slurry) at a second temperature.

Another object of the present invention is to provide such a coaxial-flow heat exchanging structure which comprises an outer thermally-conductive flowguide tube having a hollow conduit extending from said proximal end and distal end, and spiral-finned tube disposed within the hollow conduit of the outer thermally-conductive flowguide tube, and has a central conduit for conducting a heat exchanging fluid, from the proximal end, along the central conduct towards the distal end, and returning back to the proximal end along a spiral annular flow channel formed between the thermally-conductive flowguide tube and the spiral-finned tube.

Another object of the present invention is to provide such a coaxial-flow heat exchanging structure which further comprises an insulating center tube disposed within the central conduit, for conducting the heat exchanging fluid from the proximal end, along the central conduct towards the distal end, and returning back to the proximal end along the spiral annular flow channel.

Another object of the present invention is to provide such a coaxial-flow heat exchanging structure which further comprises a cap installed on the proximal end and having fluid inlet and outlet ports (e.g. a fluid manifold) for injecting the heat exchanging fluid into the axial flow coaxial-flow heat exchanging structure at a third temperature, and withdrawing the heat exchanging fluid out of the axial flow coaxial-flow heat exchanging structure at a fourth temperature.

Another object of the present invention is to provide such a coaxial-flow heat exchanging structure which can be used for sinking heat into the ground during cooling operations, or sourcing heat from the ground during heating operations.

Another object of the present invention is to provide a heat pump system employing the coaxial-flow heat exchanging structure of the present invention, wherein the heat transfer performance of aqueous based fluid heat transfer is substantially improved, and wherein the ground, a lake, a river, or sea water can be used as the primary or secondary heat sink or heat source.

Another object of the present invention is to provide such a heat pump system which may or may not incorporate the use of a refrigeration subsystem.

Another object of the present invention is to provide such a heat pump system, wherein the heat transfer performance of aqueous based fluids is substantially improved by using heat-pump heating/cooling heat exchangers where the ground is used as the primary or secondary heat sink/source in a closed loop.

Another object of the present invention is to provide such a heat pump system, wherein capital/installation cost of the total heat pump system is substantially reduced.

Another object of the present invention is to provide a heat pump system employing a coaxial-flow heat exchanging structure which is installed into the earth, a lake, a river, sea water or other heat sink or heat source to absorb heat or dissipate heat into or from the heat transfer fluid by isolating the heat transfer fluid entering the center insulating tube, from the helically flowing fluid exiting the assembly. The interior surface of the well thermally-conductive flowguide tube is the primary heat transfer surface of the axial flow heat exchanger assembly.

Another object of the present invention is to provide a coaxial-flow heat exchanging structure that cab be used in diverse kinds of heat pump systems, wherein the coaxial-flow heat exchanging structure can be manufactured as a primary system, a system sub-component, or a sub-component kit.

Another object of the present invention is to provide a coaxial-flow heat exchanging structure for ruse in a heat pump system, wherein the heat exchanging surface area of the structure is increased by fluting the plastic surface of the outer thermally-conductive flowguide tube and by increasing the length of the bore into the ground (bore length) as a result of drilling deviated-type wells in aquifer zones of the Earth.

Another object of the present invention is to provide a axial flow coaxial-flow heat exchanging structure for ruse in a heat pump system, wherein as the heat transfer surface area and the contact volume of the ground/water source loop increase, the circulating fluid temperature will approach the average ground temperature through out the full duration of the heating and cooling seasons.

Another object of the present invention is to provide a heat pump system, wherein a uniform bore hole is drilled into an aquifer zone and a smooth metal pipe or a fluted plastic pipe is installed within the bore hole so that the coaxial-flow heat exchanging structure of the present invention can be installed in most geologic ground types without major changes in installation procedures.

Another object of the present invention is to provide a method of and apparatus for enhancing the heat transfer in aqueous based fluid ground/water source loop systems so that a low differential temperature, high mass-rate heat pump can be used to cool or heat a thermal load from a building or industrial process.

Another object of the present invention is to provide a ground/water source heat-pump system that has a SEER rating that exceeds air-source heat pump systems and ground-source heat-pump systems using a refrigerant based heat-transfer fluid.

Another object of the present invention is to provide an improved heat pump system, wherein the aqueous based fluid contains a biodegradable anti-freeze and dye to minimize the environmental impact of leaks in the ground loop and improve leak detection in the ground loop multi-well grid.

Another object of the present invention is to provide an improved heat pump system, wherein for small leaks, make up fluid is injected into the system to maintain system pressure and prevent vapor locking the circulation pump, and for large leaks, the system is systematically checked with a mass flow meter and an ultrasonic leak detector to identify the location of the leak.

Another object of the present invention is to provide apparatus for manufacturing the helically-finned tubing employed within the axial-flow heat transfer (exchanging) structure of the present invention.

These and other objects of the present invention will become apparent hereinafter and in the Claims to Invention.

BRIEF DESCRIPTION OF DRAWINGS

For a more complete understanding of how to practice the Objects of the Present Invention, the following Detailed Description of the Illustrative Embodiments can be read in conjunction with the accompanying Drawings, briefly described below, in which visual descriptions are provided showing the installation of the present invention in the ground, water, or mud line environments.

FIGS. 35 and 36 show front and top views of fluted thermally-conductive flowguide tube with single spiral flow tubing installed, wherein that the pitch of the helix and the fluted thermally-conductive flowguide tube should be practically close for maintaining the spiral flow pattern in the channel.

FIGS. 39, 40, 41 and 42 show cross-sectional views of the tangential flow directions for the fluted control volume shape of the coaxial-flow heat exchanging structure of the illustrative embodiment of the present invention, wherein a square-like shape control volume of the coaxial-flow heat exchanging structure usually has one vortex for flow rates of interest, wherein a rectangle-like shaped control volume of the coaxial-flow heat exchanging structure with an aspect ratio near 2 to 1 usually has two vortexes for flow rates of interest, and wherein for rectangle-like shapes with an aspect ratio greater than 4 to 1, there can be vortex near each fin with a laminar slot flow region in the center of the control volume.

FIGS. 43, 44, 45 and 46 show cross-sectional views of the tangential flow directions for a smooth rectangular control volume shape of the coaxial-flow heat exchanging structure of the illustrative embodiment of the present invention, wherein a square-like shape control volume of the coaxial-flow heat exchanging structure usually has one vortex for flow rates of interest, wherein a rectangle-like shaped control volume with an aspect ratio near 2 to 1 usually has two vortexes for flow rates of interest, and wherein for rectangle-like shapes with an aspect ratio greater than 4 to 1, there can be a vortex near each fin with a laminar slot flow region in the center of the control volume.

FIG. 92 is a front view of a rotating extrusion die used to manufacture the helically-finned tubing within the coaxial-flow heat exchanging structure of the present invention, wherein the die is fabricated from a material compatible with the material being extruded and with a melting point temperature above that of the material being extruded.

FIG. 93 is a right side view of the rotatable extrusion die showing how the center mold core is held in position by support arms.

FIG. 94 is a front view of a rotatable extrusion die with the opening to form the first flow guide and an additional flow guide opening.

FIG. 95 is a right side view of the rotatable extrusion die illustrating how the distance between the surface of the mold core determines the desired wall thickness of the flow guide tube as it is extruded through the rotatable extrusion die.

DETAILED DESCRIPTION OF THE ILLUSTRATIVE EMBODIMENTS OF THE PRESENT INVENTION

Figure 1:
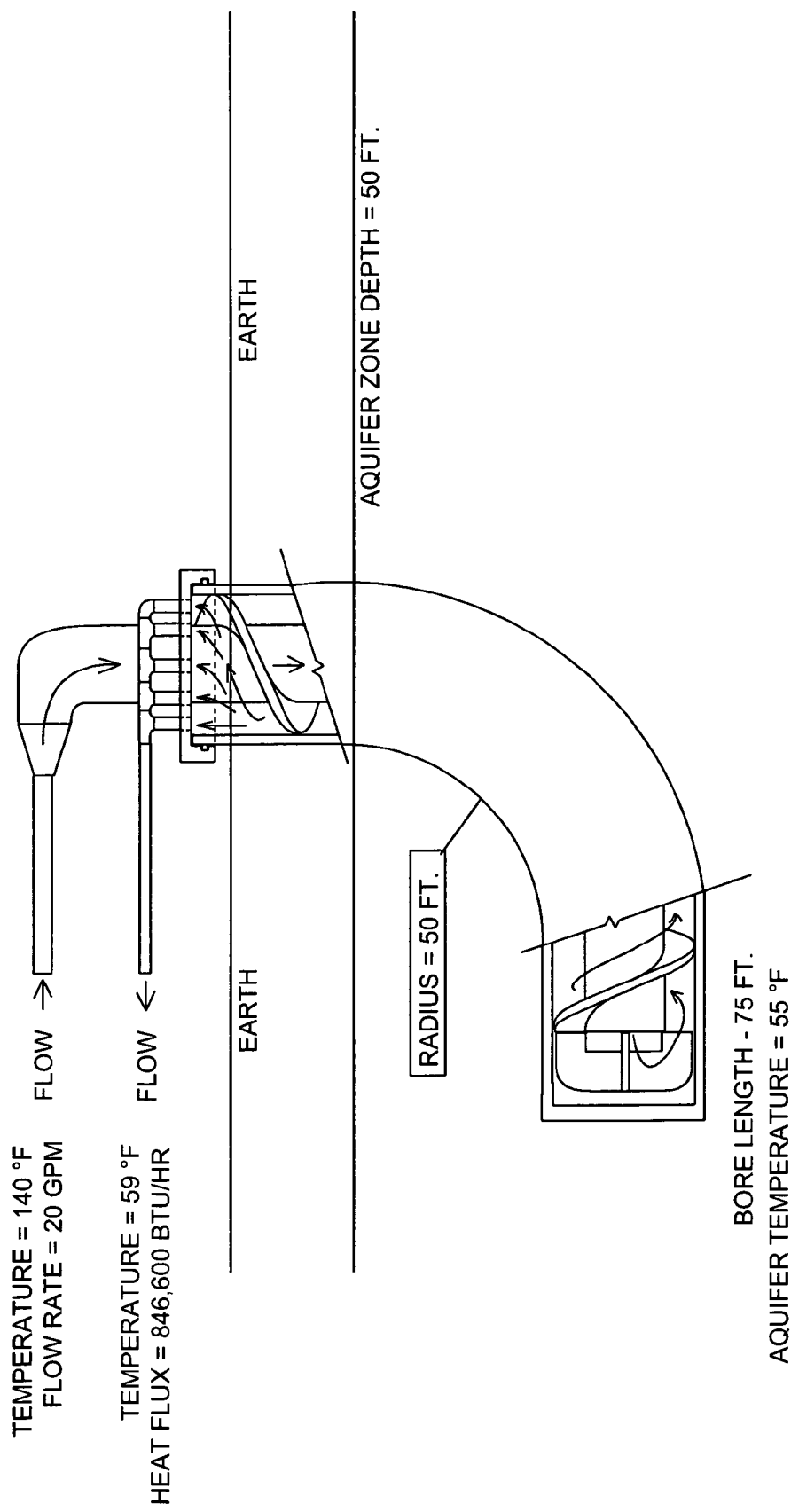
FIG. 1 shows the coaxial-flow heat exchanging structure of the present invention shown installed in a deviated well bore with smooth metal thermally-conductive flowguide tube, wherein the deviated well bore is drilled nearly horizontal in the aquifer zone to maximize heat transfer to the ground, wherein the deviated well bore uses a short turning radius to deviate from vertical to near horizontal and the metal thermally-conductive flowguide tube is grouted to surface to prevent aquifer contamination.
Figure 91:
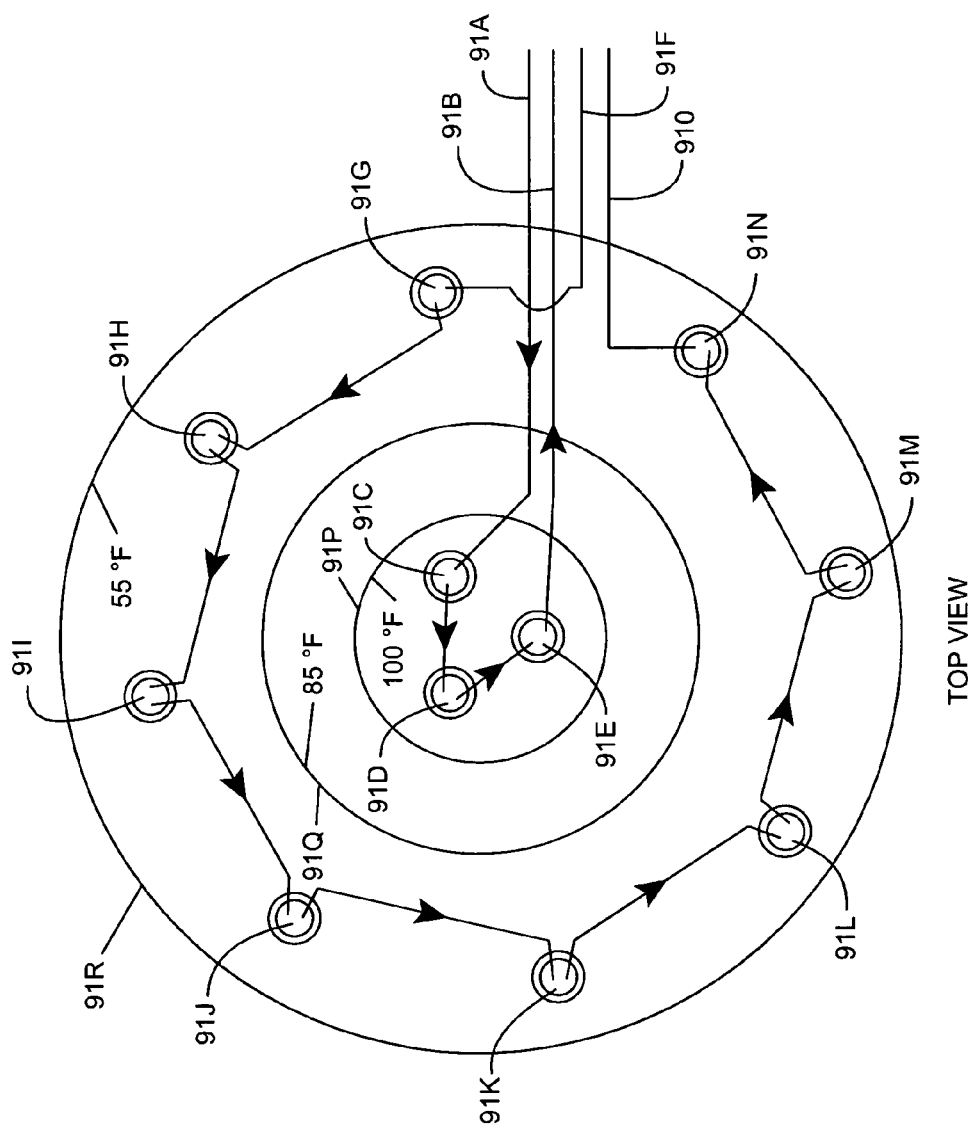
FIG. 91 shows system of eleven deviated wells connected together in a heat pumping network.

Referring to FIGS. 1 through 91, the various illustrative embodiments of the axial flow coaxial-flow heat exchanging structure of the present invention will be now described in detail.

As shown in FIG. 1, a horizontal/deviated well is drilled into an aquifer for installation of the ground loop heat exchanger of the present invention, which is referred to herein as "a coaxial-flow heat exchanging structure". As will be described in greater detail hereinafter, the coaxial-flow heat exchanging structure has a proximal end and a distal end for exchanging heat between a source of fluid at a first temperature and the environment (e.g. ground, water, slurry) at a second temperature. The coaxial-flow heat exchanging structure comprises an outer thermally-conductive flowguide tube having a hollow conduit extending from the proximal end and distal end, and helically-finned tube disposed within the hollow conduit of the outer thermally-conductive flowguide tube, and has a central conduit for conducting a heat exchanging fluid, from the proximal end, along the central conduct towards the distal end, and returning back to the proximal end along a spiral annular flow channel formed between the thermally-conductive flowguide tube and the helically-finned tube. The coaxial-flow heat exchanging structure may also comprise an insulating center tube disposed within the central conduit, for conducting the heat exchanging fluid from the proximal end, along the central conduct towards the distal end, and returning back to the proximal end along the spiral annular flow channel.

A cap is installed on the proximal end and is provided with fluid inlet and outlet ports to facilitate (i) the injection of the heat exchanging fluid into the coaxial-flow heat exchanging structure at a third temperature, and (ii) the withdrawal of the heat exchanging fluid out of the coaxial-flow heat exchanging structure at a fourth temperature. The coaxial-flow heat exchanging structure of the present invention can be used a component within a heat pump system to substantially improve the heat transfer performance of aqueous based fluid heat transfer therein, wherein the ground, a lake, a river, or sea water can be used as the primary or secondary heat sink or heat source. Heat pump systems employing the coaxial-flow heat exchanging structure of the present invention may or may not incorporate the use of a refrigeration subsystem.

As shown in FIG. 1, the deviated well bore, with the coaxial-flow heat exchanging structure installed therein, is used as a heat exchanger with the aquifer in the ground. The well is drilled with a short radius turn (less than 50 ft. radius) into the middle of the aquifer zone. The metal thermally-conductive flowguide tube (component of the axial-flow heat exchanging structure) is cemented with sanded grout to surface to prevent aquifer contamination and increase the heat transfer coefficient to the ground. After cementing operations, the thermally-conductive flowguide tube is cleaned with a mild acid solution with surfactant to remove mud, mill scale and grout tailings. The spiral pitch and number of fins on the helically-finned tubing component are selected to rotate the fluid at the desired heat-pump circulation rate. Once these parameters have been determined, the helically-finned (insulated) tubing is run to the bottom of the flowguide tube shoe and sealed off at the thermally-conductive flowguide tube cap with fusion welding. The array of wells can be connected to the gathering lines (using insulated plastic surface piping) for series or parallel operation with the heat-pump heat exchanger formed by an arrangement of installed coaxial-flow heat exchanging structures. Finally, the ground loop is filled with an aqueous heat transfer fluid and the air is bled out of the high spots in the system to achieve optimum performance. By using the coaxial-flow heat exchanging structure of the present invention, this deviated well design reduces installation cost and material cost.

As shown in FIG. 1, the design goal for the ground/water source loop of the heat pump system of the illustrative embodiment of the present invention has been to provide enough heat-transfer surface area and ground/water volume to insure the circulating fluid temperature of the ground/water source loop does not go above/below the average ground temperature by 7° F. or 3° C., under continuous load during peak of the heating/cooling season. By maintaining a return fluid temperature within 7° F. or 3° C. of the ground/water source temperature, the SEER rating of the heat pump system will be maximized for the whole heating/cooling season. A commercial objective of the design has been to use a combination of metal and plastic tubing to increase heat transfer to/from the ground while reducing the life-time cost of the ground loop which includes the capital, maintenance and operational cost averaged over the life-time of the system.

If the time averaged thermal seasonal heat and cooling loads are nearly equivalent, then the core volume of the ground loop can be designed to store heat during the cooling season and, subsequently, the heat can be extracted from the core volume during the heating season. If the time averaged thermal load is mostly heating or cooling, then ground loop is designed to transfer heat without significant storage in the ground volume.

For small spikes over base load, larger well bore diameter or the iron mass in the foundation can be used for thermal storage to average out the operational temperature of the fluid. With a helical fin design and the slot aspect ratio ranging from a 1 to 1 square to a 1 to 2.5 rectangle, tubing diameters can exceed 36 inches or 1 meter without significantly reducing heat transfer coefficient to the ground/water source. For large spikes over base load, a larger tank volume is added to the ground loop for additional thermal storage.

For an estimated yearly thermal load, a thermal simulator can be used to determine the number wells used in the ground loop array, the amount of thermal storage needed to average out the daily peak loads and the amount of core volume needed in the array to store heat from the cooling season to use in the heating season. For large thermal projects, the simulator can be used to optimize capital cost of drilling (horizontal well bore length versus number of wells in array), material cost of the thermally-conductive flowguide tube (thermally-conductive flowguide tube diameter versus metal or plastic), the approach temperature of the ground loop and refrigerant used by the heat-pump system. However, the actual heat transfer rate and time coefficient of the ground-loop array of wells should be determined with a transient temperature test of the ground loop and the actual heat storage of the ground loop should be determined with a complete year of history of circulating fluid temperature and load.

The well design parameters such as grout thickness, thermally-conductive flowguide tube material, spiral pitch, number of helical fins, insulated wall thickness of inner tube, and fluid composition can be optimized using analytical equations for steady state operation. Most of the well array design parameters such as well depth, well length, well spacing should be optimized for the given aquifer properties with a thermal simulator over a multi-year load to account for the thermal storage of earth and the seasonal transients. Most of thermal storage parameters for the insulated volume of fluid in a tank or in the array of well bores, or the insulated volume of concrete in the foundation can be empirically fit with simple equations so that the peak loads can be averaged over the daily operation of the heat pump. The design goal is to install a ground loop with thermal storage so that it can transfer the daily thermal load from the heat pump for the minimum capital cost and operational cost.

Figure 2:
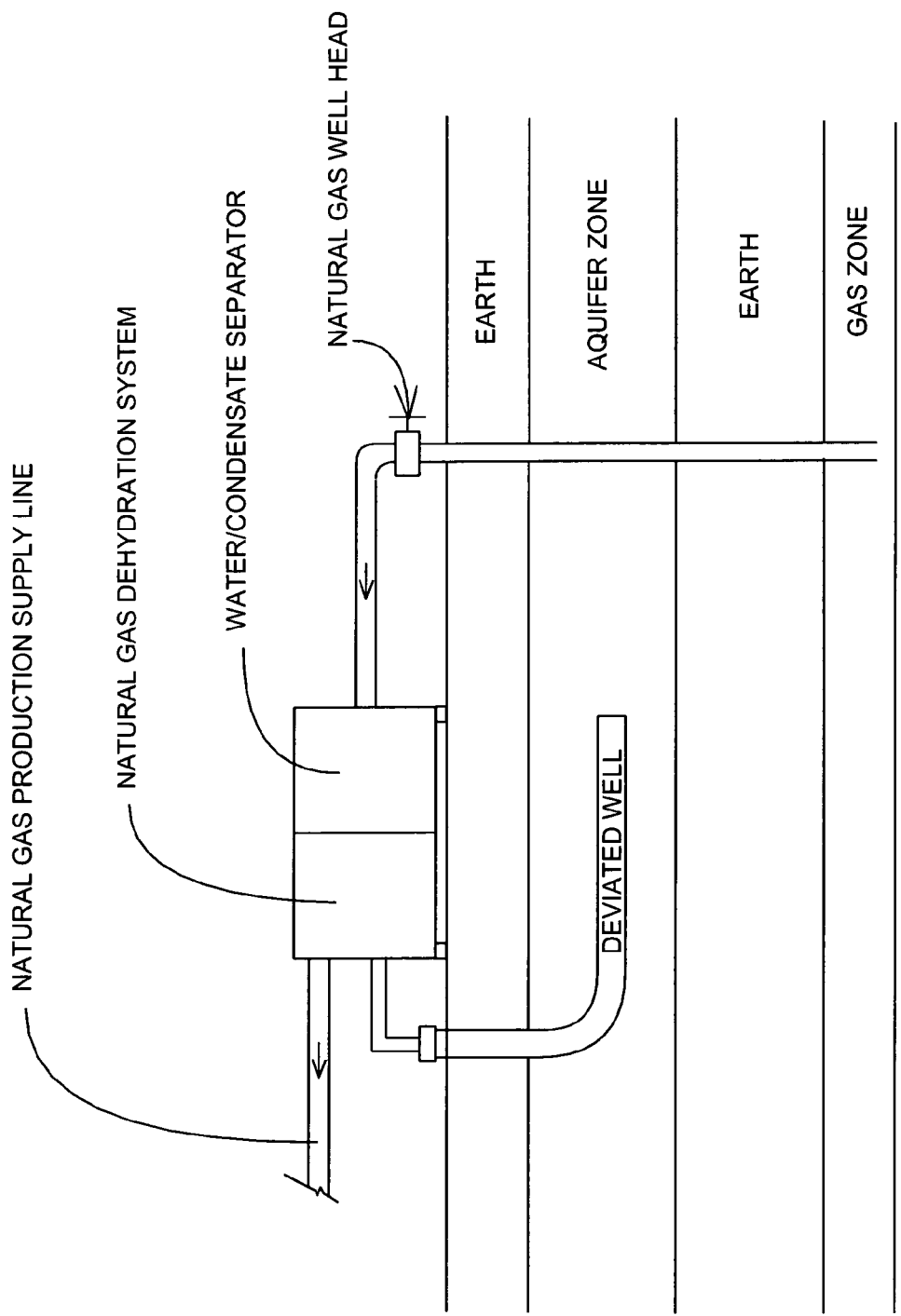
FIG. 2 shows a natural gas dehydration system using a heat pump system of the present invention shown in FIG. 1, with a deviated well drilled in an aquifer for the ground loop, wherein the natural gas and other liquids are produced from the well that is completed in the gas zone.

FIG. 2 shows a natural gas dehydration system using a heat pump system of the present invention as shown in FIG. 1, with a deviated well drilled in an aquifer for the ground loop. In this system, the natural gas and other liquids are produced from the well that is completed in the gas zone. The natural gas moves through the separator where brackish water and hydrocarbon liquids are separated form the gas. The natural gas then moves through the heat pump dehydrator where the temperature is reduced to condense the water vapor and heavier hydrocarbon vapors from the natural gas. Finally, the natural gas is then polished with a small glycol unit to remove the last traces of water vapor for shipment in the natural gas production supply lines. Notably, in the natural gas dehydration system shown in FIG. 1, the deviated well provides ground loop cooling to dehydrate natural gas in a natural gas production environment. However, for other oil field cooling applications, additional large surface thermally-conductive flowguide tube holes can be drilled and cemented in the ground for the external metal-pipe, ground-loop heat exchanger. For commercial and residential heating and cooling applications, smaller plastic pipe can be used to make the multi-well ground-loop heat exchanger. Due to the actual drilling cost versus heat transfer area, it is better to drill a slanted group of small diameter holes from a pad than to drill one large diameter hole.

For cooling applications, the addition soluble gases to the aqueous based fluid improve the heat transfer to ground/water source. As the pressure increases with depth of fluid column, the soluble gases are adsorbed by the aqueous fluid; the gases release their stored heat to the fluid, and in turn raise the temperature of the fluid which in turn increases the temperature differential between the fluid and the ground/water source. Carbon dioxide ($CO_2$) and ammonia ($NH_3$) gases foamed with surfactants create stable aqueous based fluids used in this absorption process. The return line requires insulation to prevent the absorption of heat as the gases come out of solution as the fluid returns to the surface.

The absorption and desorption process acts like a low differential temperature refrigerant cycle, but it can be quite effective in increasing the heat transfer in the ground/water source loop.

For heating applications, the addition of solid particles can increase the heat capacity of the aqueous based fluid. Micron sized heavy metal or metal oxide particles can be mixed with the aqueous based fluid and suspended with a shear thinning polymer such as xanthan gum or borate cross-linked polymer. The fluid must be kept in motion or the particles with eventually settle out and plug the bottom of the well bore. Micron-sized glass spheres containing a low melting point salt can also be used to increase the heat capacity of the fluid while maintaining a particle specific gravity close to 1. Particle specific gravities near to 1 will prevent settling of the particles in the aqueous fluid, thus allowing a ground loop section to be shut down with out the danger of plugging the well with settled particles. Field experience has shown that the composition of the aqueous-based fluid should remain simple to reduce capital cost and that increasing fluid flow rate is a better solution to increase heat capacity of the system, except where very high heat transfer rates are required.

Having given an overview of the coaxial-flow heat exchanging structure of the present invention, shown used in a typical heat pump system application, it is appropriate at this juncture to now describe the individual components of the ground-loop heat pump system in greater detail.

Figure 3:
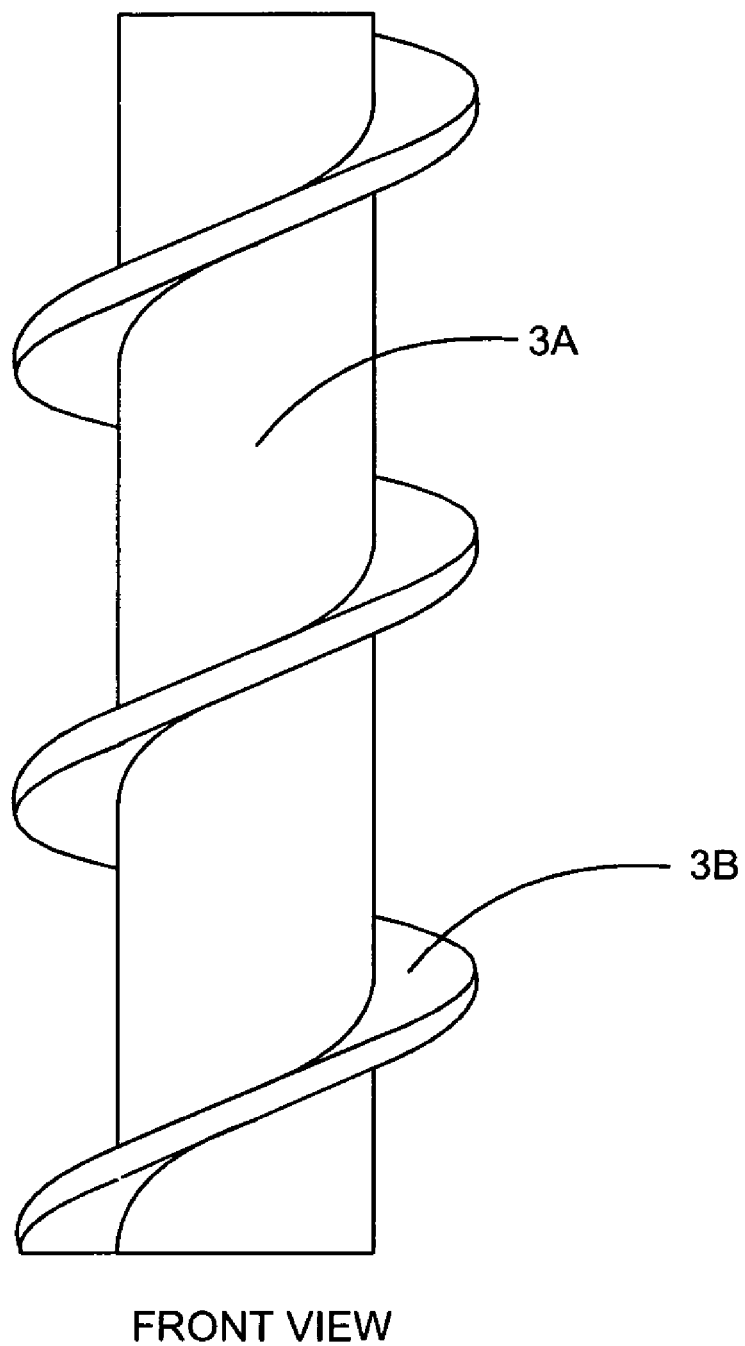
FIGS. 3 and 4 show the front and back views of a section of single spiral or helical finned tubing used to create an annular spiral or helical flow channel within the axial heat exchanging structure of the present invention, for the aqueous based heat exchanger fluid, and wherein this small-diameter, spiral finned tubing can be delivered rolled on a large spool to install in the thermally-conductive flowguide tube, the tubing is cut to size and the well cap is fused on as shown in FIG. 48.
Figure 4:
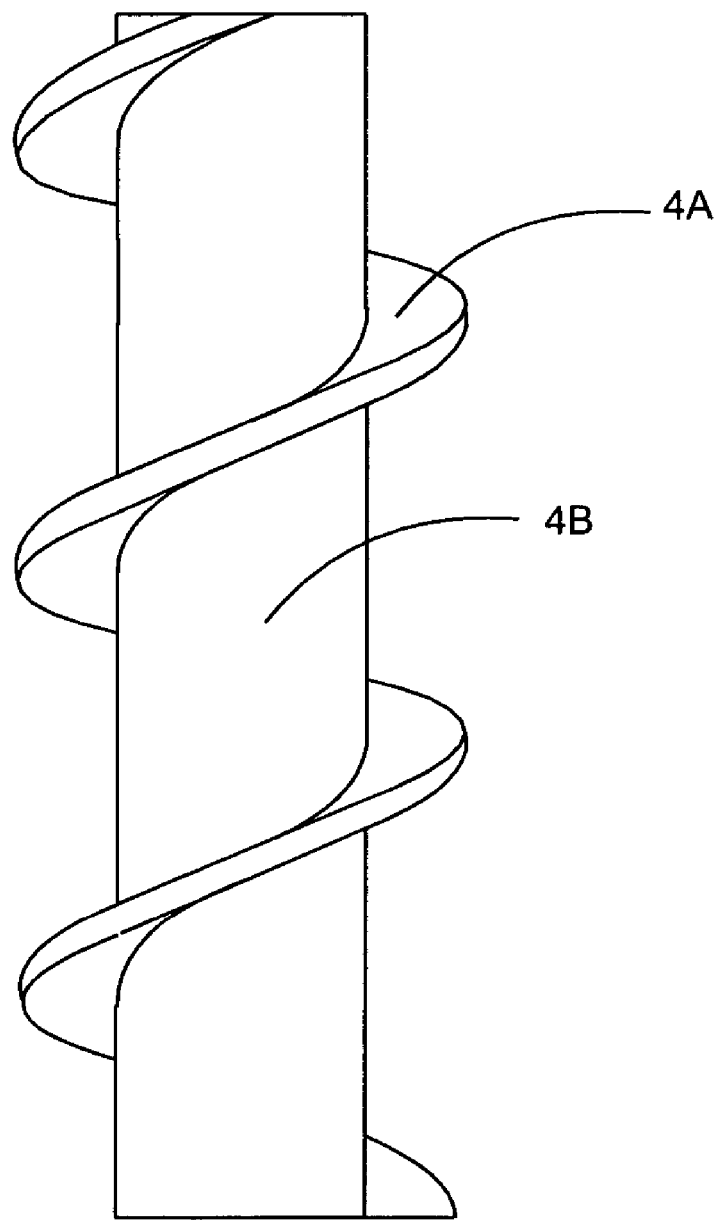
Figure 48:
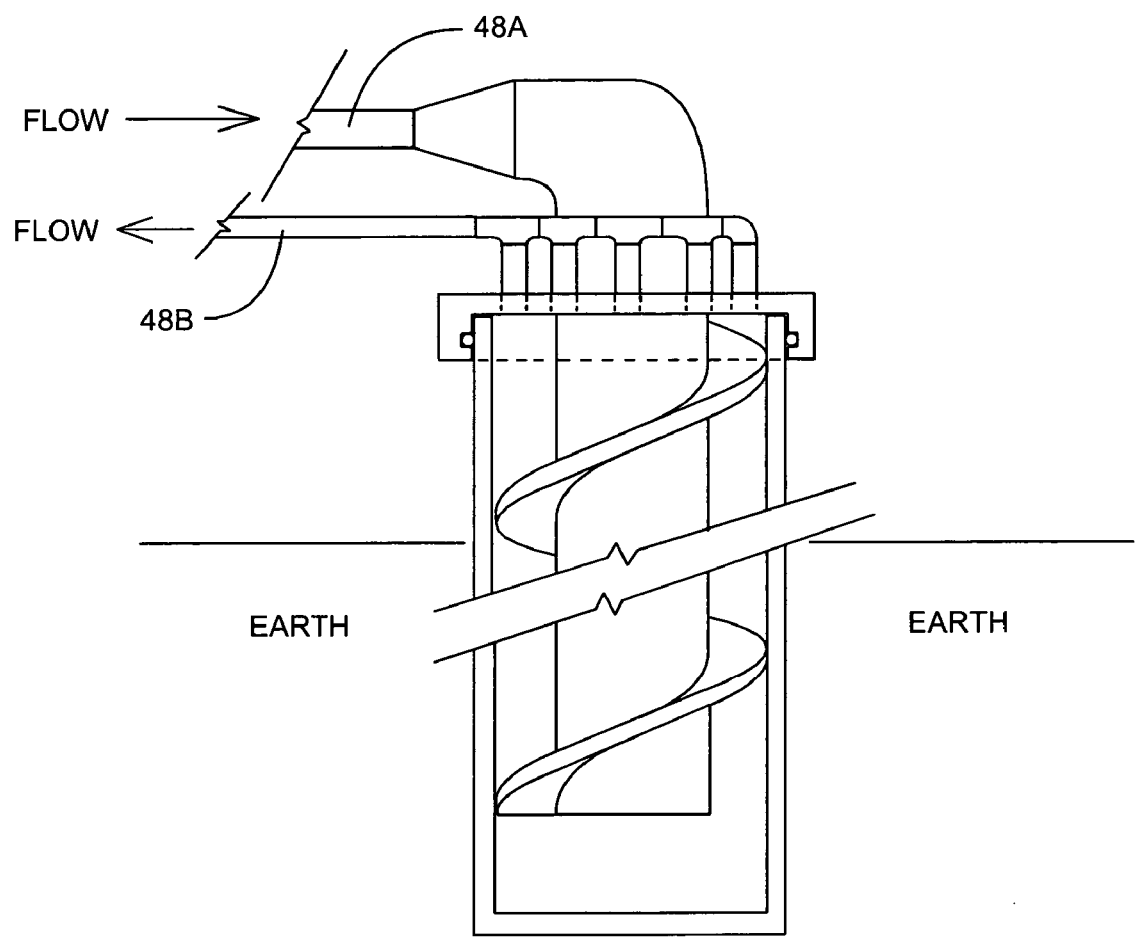
FIG. 48 shows a coaxial-flow heat exchanging structure of the present invention installed with a well cap, wherein the well cap holds the helically-finned tubing off the bottom of the thermally-conductive flowguide tube so as to prevent buckling of the plastic helically-finned tubing and seals the thermally-conductive flowguide tube annulus from fluid leaks.

As shown in FIGS. 3 and 4, single spiral or helical finned insulated tubing is used to create an annular spiral or helical flow channel within the axial heat exchanging structure of the present invention, for the aqueous based heat exchanger fluid. As shown, this small-diameter, helically-finned tubing can be delivered rolled on a large spool to install in the thermally-conductive flowguide tube, and the tubing can be cut to size and the well cap fused on as shown in FIG. 48.

Figure 5:
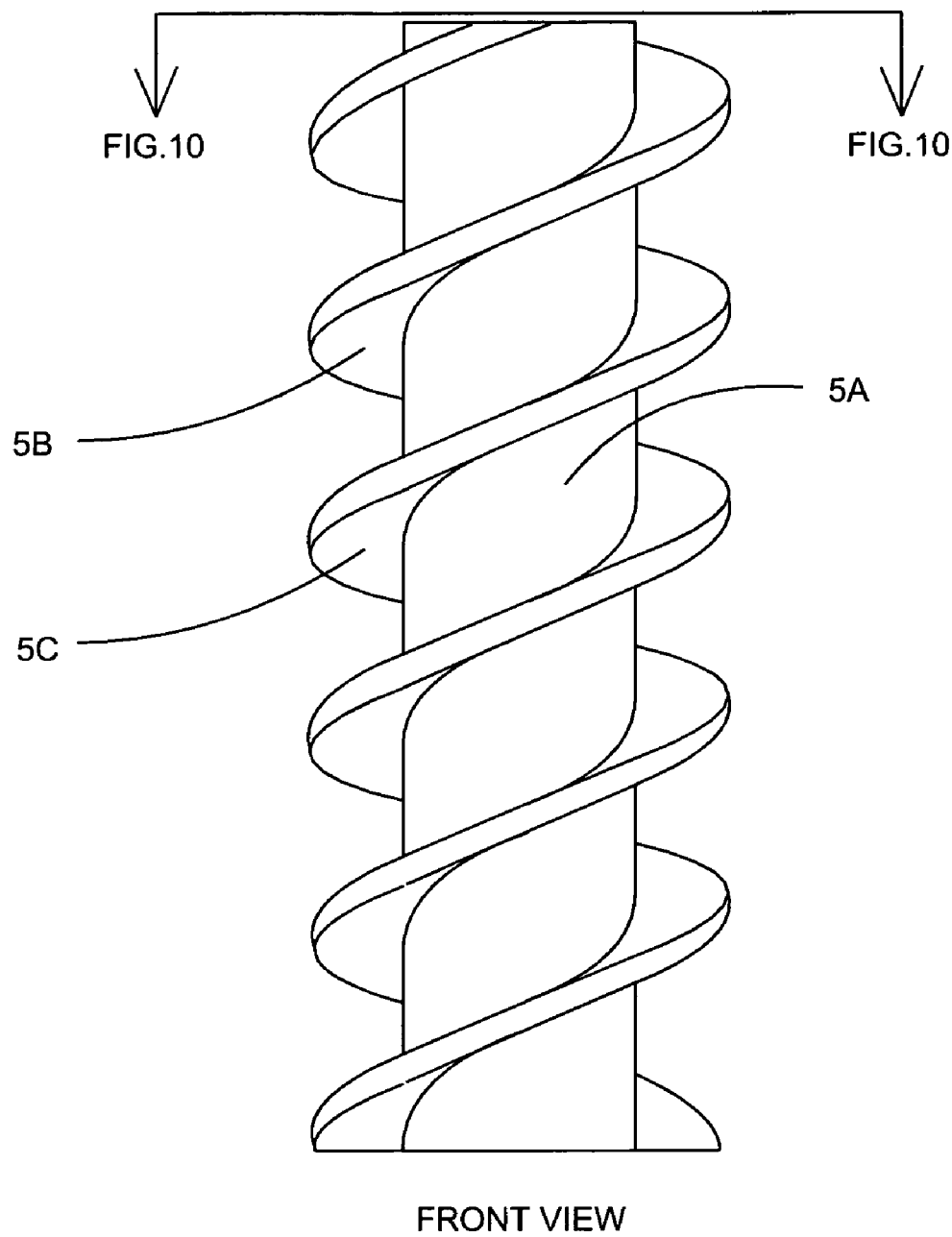
FIGS. 5 and 10 show the front and top views of a double spiral/helical fin set used to create spiral or helical flow in large bore thermally-conductive flowguide tube.

In FIGS. 3 and 4, reference numeral 3B and 4A indicate to the flow guide for a single helical or spiral fin. The flow guide can be made out of plastic or metal depending on the static load on the fin. Reference numerals 3A and 4B indicate the thermally-conductive flow guide tube. The outer wall of the flow guide tube can be made out of metal or plastic depending on the buckling or tensile load of the tubing laying or hanging in the well bore. FIG. 5 shows the front view of double helically-finned insulated tubing. 5A points to the insulated flow guide tube. Reference numeral 5B indicates the first flow guide while 5C points to the second flow guide. The number of flow guides used in any particular application is determined by the cross-sectional shape of the flow channel and this topic is discussed in detail with reference to FIGS. 39 through 46.

Figure 10:
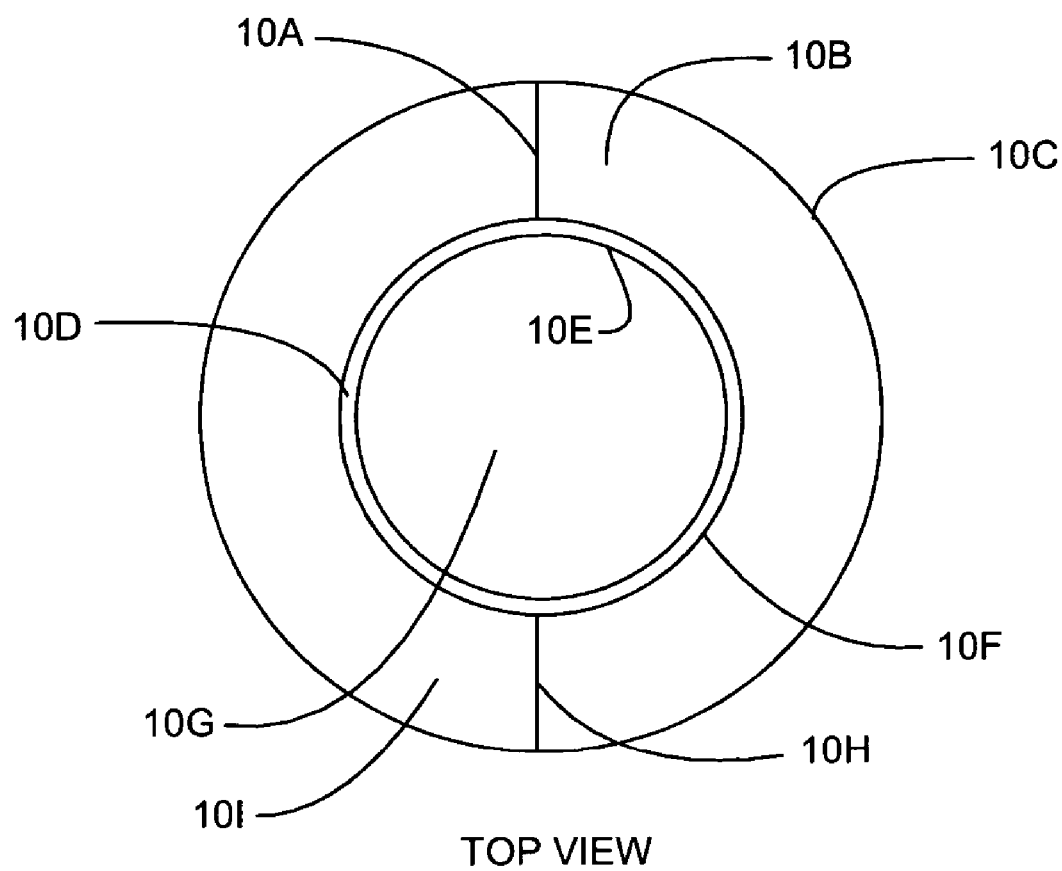

As shown in FIGS. 5 and 10, a double spiral/helical fin set is shown used to create spiral or helical flow in large bore thermally-conductive flowguide tube. In this design, the friction pressure drop in the ground loop can be reduced, and the number of fin sets can be increased to reduce the flow path length in the well bore. Also, as the thermally-conductive flowguide tube size increases, the number of helical fins can be increased to keep the aspect ratio of the flow channel shape close to 2 to 1 as shown in FIGS. 39 and 43.

Figure 6:
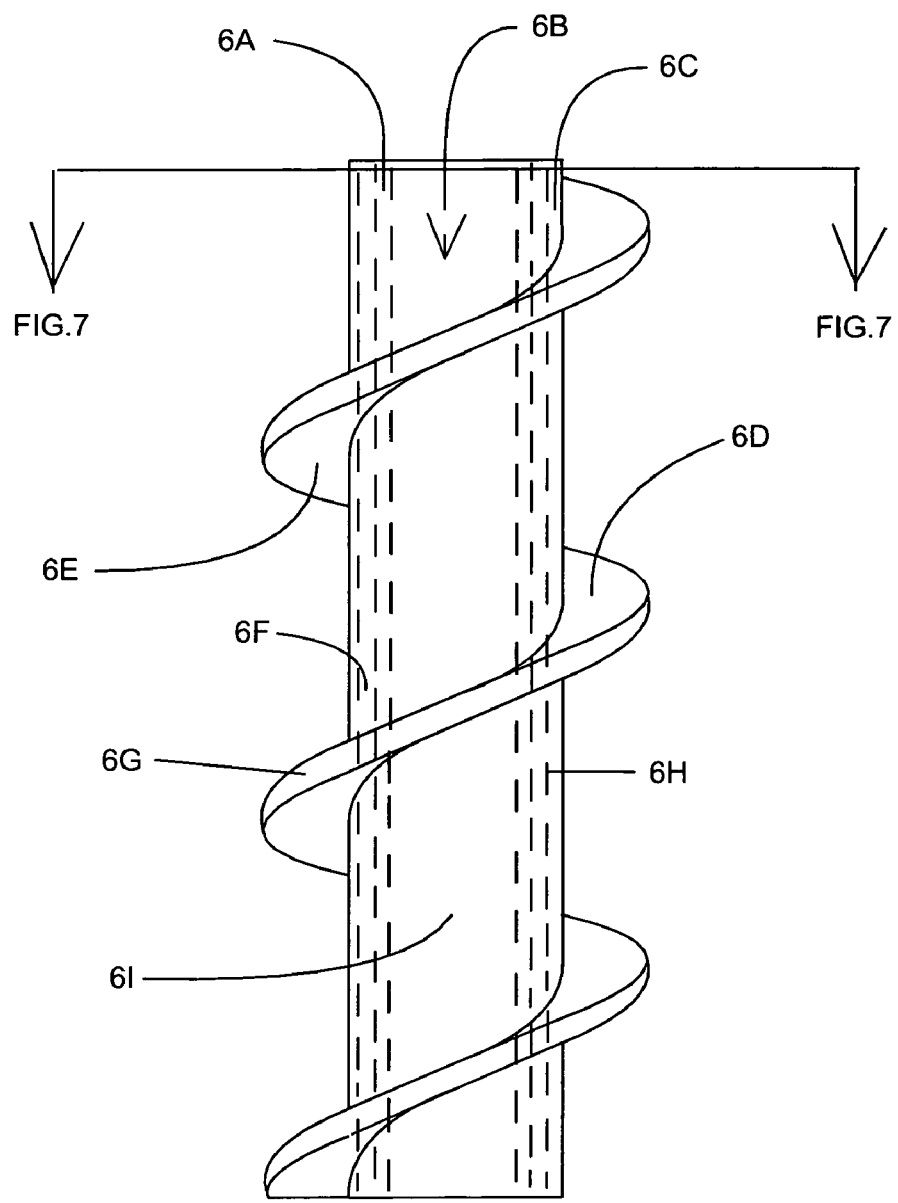
FIGS. 6 and 7 show the front and top views of a single helically-finned tubing with the insulated inner tube installed in the thermally-conductive flowguide tube shown in FIG. 1, wherein the gas gap between the central insulated inner tube and the helically-finned outer tube provides insulation, and the gap distance between the walls remains uniform due to the 3 standoffs on the inner insulation tube.
Figure 7:
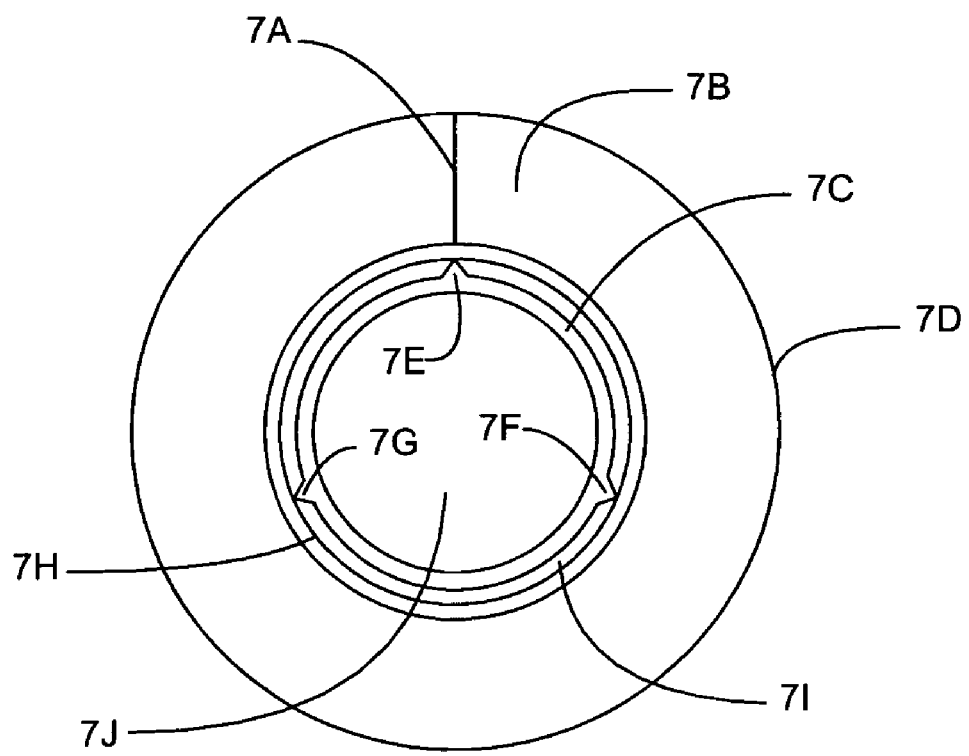

As shown in FIGS. 6 and 7, a single helical-finned tubing with the insulated inner tube is shown installed in the thermally-conductive flowguide tube of FIG. 1. In this design, the gas gap between the central insulated inner tube and the spiral-finned outer tube provides insulation, and the gap distance between the walls remains uniform due to the 3 standoffs on the inner insulation tube. Reference numerals 6A and 7C indicate the wall thickness of the center tube in spiral-finned insulated tubing. The center tube wall thickness is calculated from the material strength, from the buckling load of setting the tubing down on the thermally-conductive flowguide tube shoe and from tensile load of supporting the tubing from the thermally-conductive flowguide tube cap. Reference numerals 6B and 7J indicate the center tube flow channel. The channel diameter is determined from the amount of thermal storage need in the ground loop or from the friction pressure drop. Reference numeral 6C indicates the outer flow guide tube wall thickness which must support the tensile load of the tubing and flow guides hanging from the thermally-conductive flowguide tube cap and it must support the shear stress of installing the tubing in the thermally-conductive flowguide tube. Reference numerals 6D and 7B indicate the top side surface of the flow guide. The surface should be smooth to reduce the friction pressure drop of the flowing fluid. 6E points out the bottom side surface of the flow guide. Reference numerals 6F, 7E, 7F, and 7G indicate the stand offs on the center tube used to create the static or dead gas space between the center tube and the outer flow guide tube. The standoffs can have a triangular shape for installation at the factory, but field experience shows that the standoffs should have a half cylinder shape for center tube installation in the field. The number of standoffs used is determined by the center tube diameter and center tube material. Reference numerals 6G and 7D show the edge of the flow guide. For small flow guide outside diameters, the edge can be flat, but for large diameters the edge should be radius to prevent flow guide damage by hanging up on an edge in thermally-conductive flowguide tube collar. Reference numerals 6H and 7I indicate the static or dead gas space used for insulation between the center tube and the outer flow guide tube. The space could also be filled with a ceramic fiber or ceramic paper. The gas space can be pressurized with an inert, non-condensable gas such as argon, nitrogen, refrigerant gases, methane, or ethane. The charge gas pressure should be equivalent to half the hydrostatic pressure in the well bore. Reference numeral 6I indicates the outer flow guide tube exterior surface. The surface should be smooth to reduce friction pressure lost and could be curved to promote tangential rotation of the circulated fluid. Reference numeral 7A indicates the start of the clock wise spiral turn of the flow guide. Reference numeral 7H indicates shows the interior surface of the outer flow tube. To reduce the heat transfer between the center tube and outer tube, the surface could be coated with a reflective metal such as aluminum, silver or gold or coated with a reflective ceramic powder such as titanium dioxide.

Figure 8:
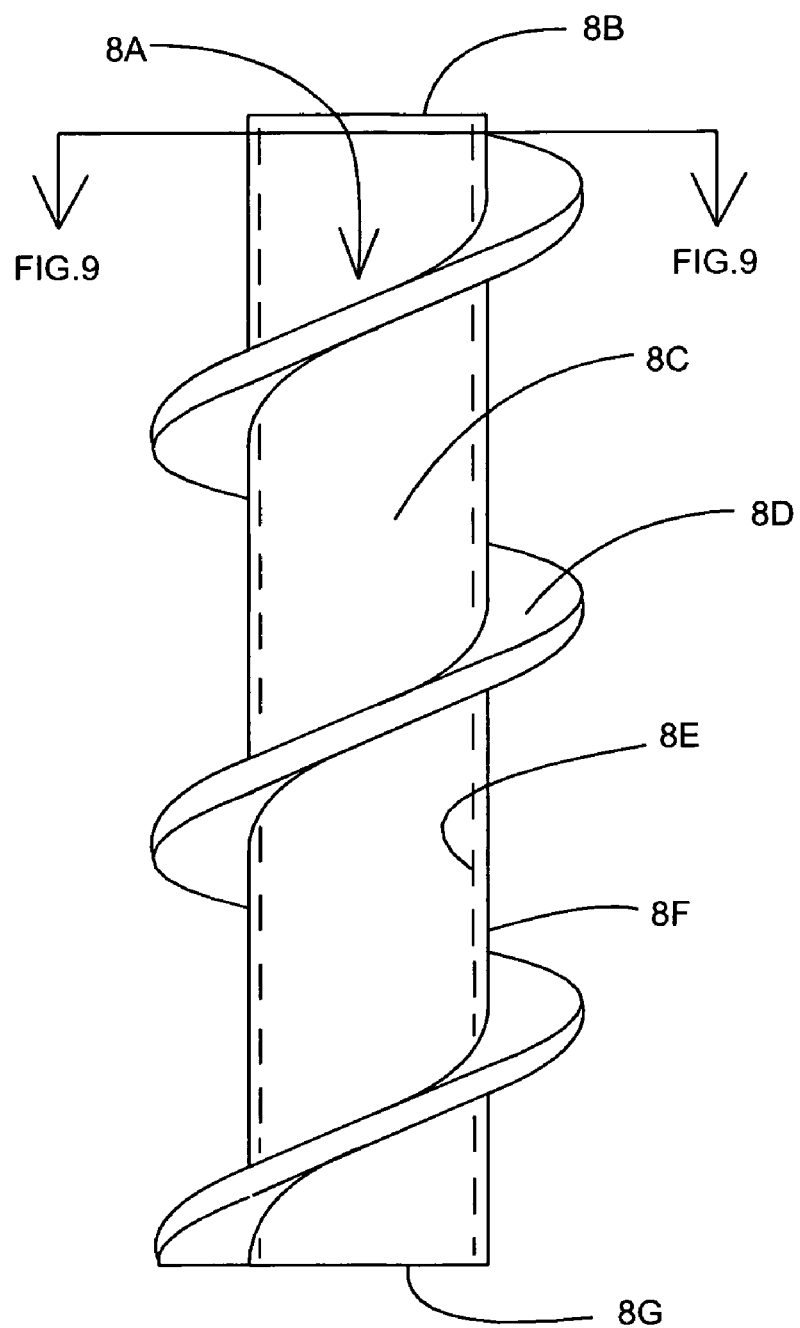
FIGS. 8 and 9 show the front and top views of the single-helical finned tubing without the inner insulation tube installed, and wherein the fins can be extruded with the tubing for small diameters or extruded over a joint of larger diameter tubing, and wherein for diameters exceeding 18 inches or 0.5 meters, the fins can be rolled from flat stock and welded on the tubing joint.
Figure 9:
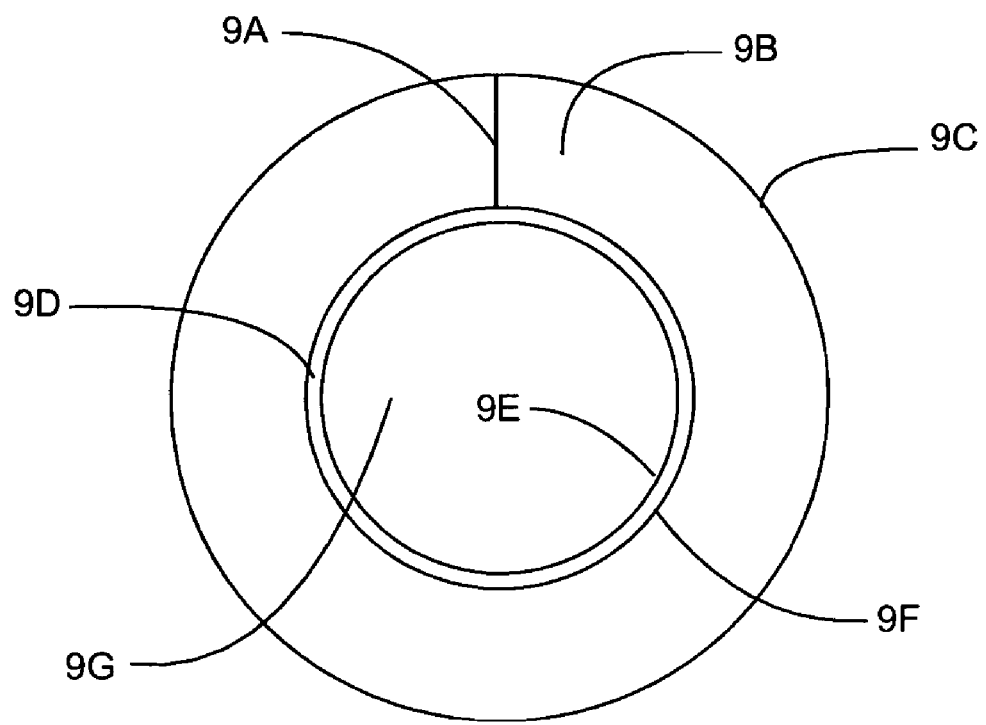

In FIGS. 8 and 9, the single-helix finned tubing shown in FIGS. 6 and 7 is shown without the inner/central insulation tube installed. In this design, the fins can be extruded with the tubing for small diameters or extruded over a joint of larger diameter tubing. For diameters exceeding 18 inches or 0.5 meters, the fins can be rolled from flat stock and welded on the tubing joint. Reference numerals 8A and 9G indicate the inner diameter of the flow guide tube where in the center tube will be assembled. Reference numerals 8B and 8G indicate the beginning and the end of the flow guide tube cut to the desired length to install in the well bore. Reference numeral 8C indicates the exterior diameter of the flow guide tube. Reference numerals 8D and 9B indicate the top side of the flow guide. Not shown in these figures is the fact that both the top and bottom surfaces of the flow guide can be curved to promote tangential rotation of the fluid and to prevent slow flowing areas in the corners of the spiral flow channel. Reference 8E and 9E show the interior surface of the flow guide tube. This surface could be coated with a reflective metal such as aluminum, silver or gold or coated with a reflective ceramic powder such as titanium dioxide. Reference numerals 8F and 9F show the exterior surface of the flow guide tube. This surface should be smooth to reduce the friction pressure of the circulating fluid. The surface could also be fluted to promote the tangential rotation of the circulating fluid. Reference numeral 9A indicates the start of the clock-wise rotation of the spiral flow guide. Reference numeral 9C indicates the edge of the flow guide. For small flow guide outside diameters, the edge should be flat to increase the friction pressure drop of the slot flow so the circulating fluid follows the flow guide instead of trying to bypass it. But for large diameters, the edge should be radius with additional thickness to prevent flow guide damage by hanging up on an edge in thermally-conductive flowguide tube collar. Reference numeral 9D indicates the wall thickness of the flow guide tube. The wall thickness is determined by the material used and the compressive, tensile and shears loads the tubing wall will be exposed to during installation and operation.

Figure 11:
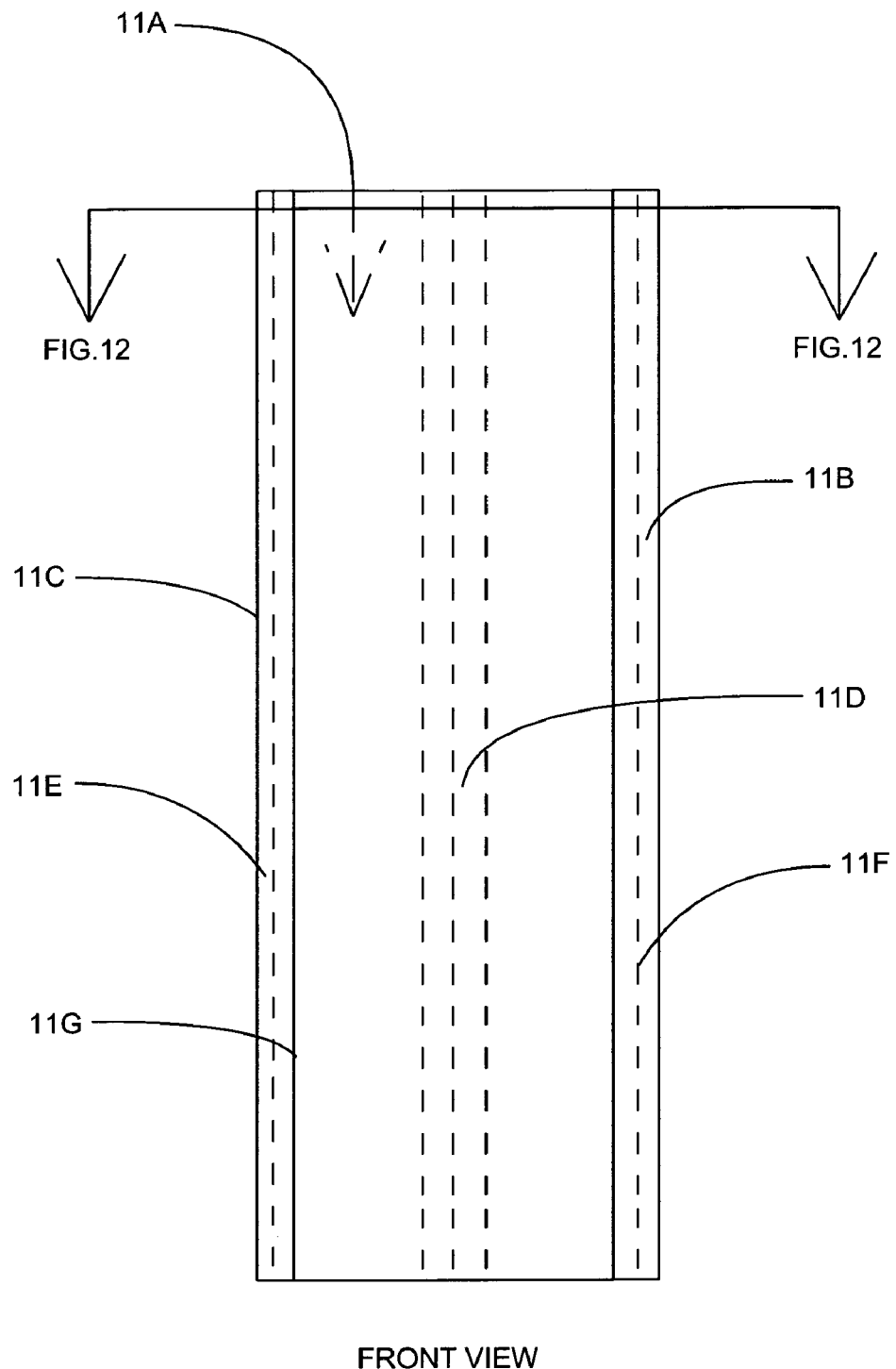
FIGS. 11 and 12 show the front and top view of the insulated inner tubing, wherein the standoffs provide the gas gap needed for insulation between the inner insulation tube and outer helically-finned tube, wherein the fill gas can be argon, nitrogen, or even ethane, however argon is a better insulation gas and is readily available in the field.
Figure 12:
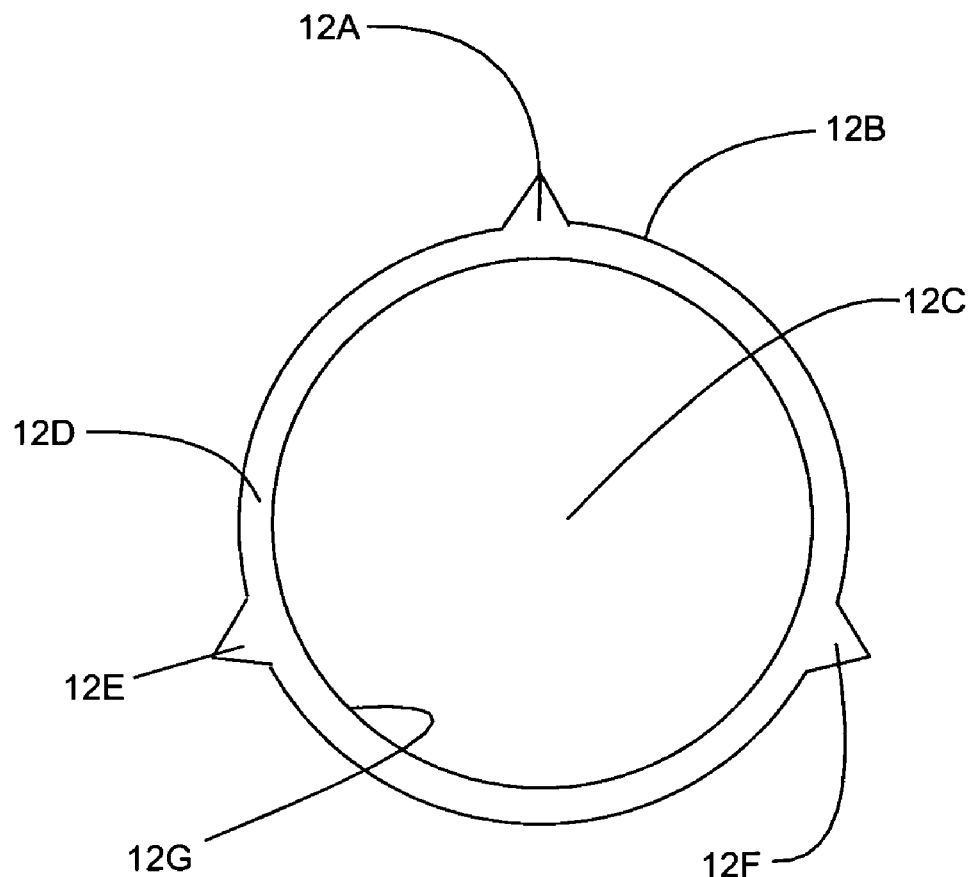

As shown in FIGS. 11 and 12, the standoffs on the insulated inner tubing provide the gas gap needed for insulation between the inner/central insulation tube and outer helically-finned tube, wherein the fill gas can be argon, nitrogen, or even ethane, however argon is a better insulation gas and is readily available in the field. In this design, a vacuum is established in the field to check for leaks, then the gap is filled with gas to half of the bottom hole pressure. Notably, the standoffs can have a cross-sectional rounded shape instead of the triangular shape, shown in FIG. 12, for easier installation in the field and to prevent damage to the edge during installation in the field.

Figure 13:
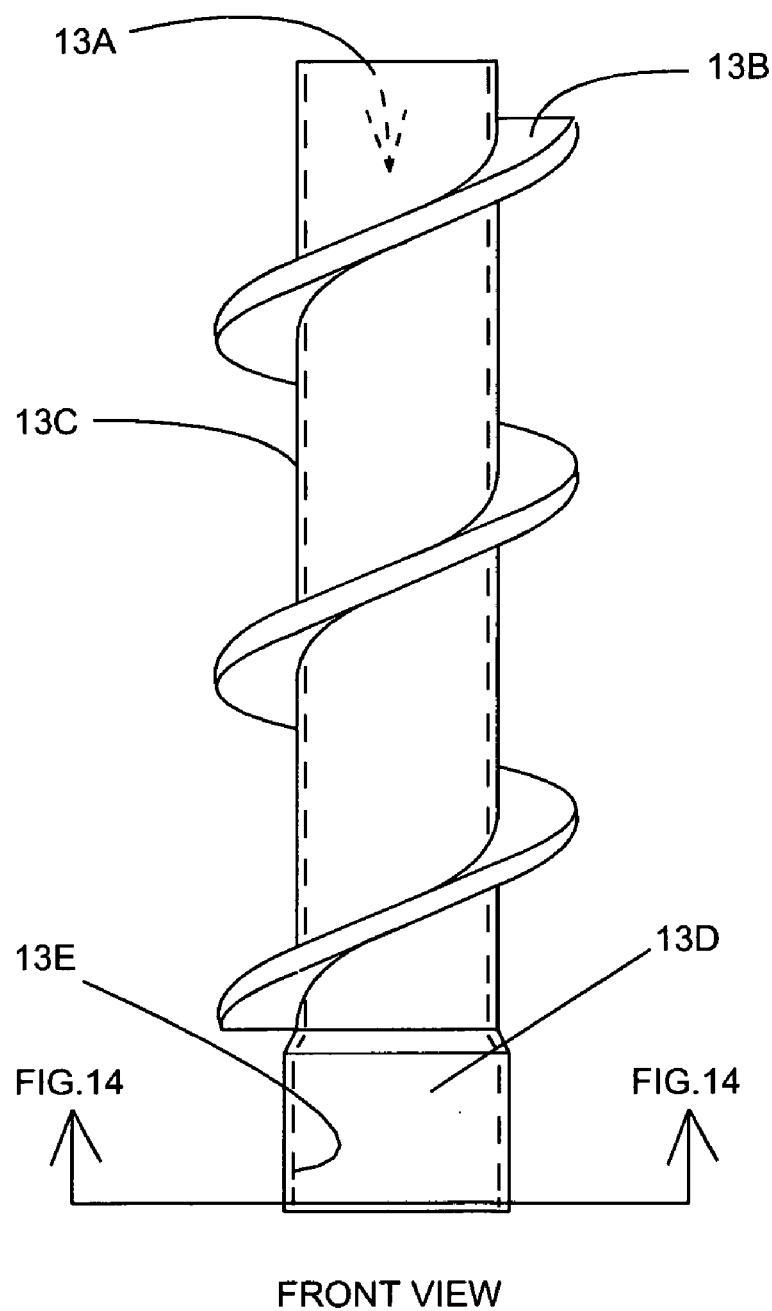
FIGS. 13, 14 and 15 show the front, bottom and cross-section views of insulated helically-finned tubing joint with collar for large diameter spiral finned helically-finned tubing that cannot be rolled on spool.
Figure 14:
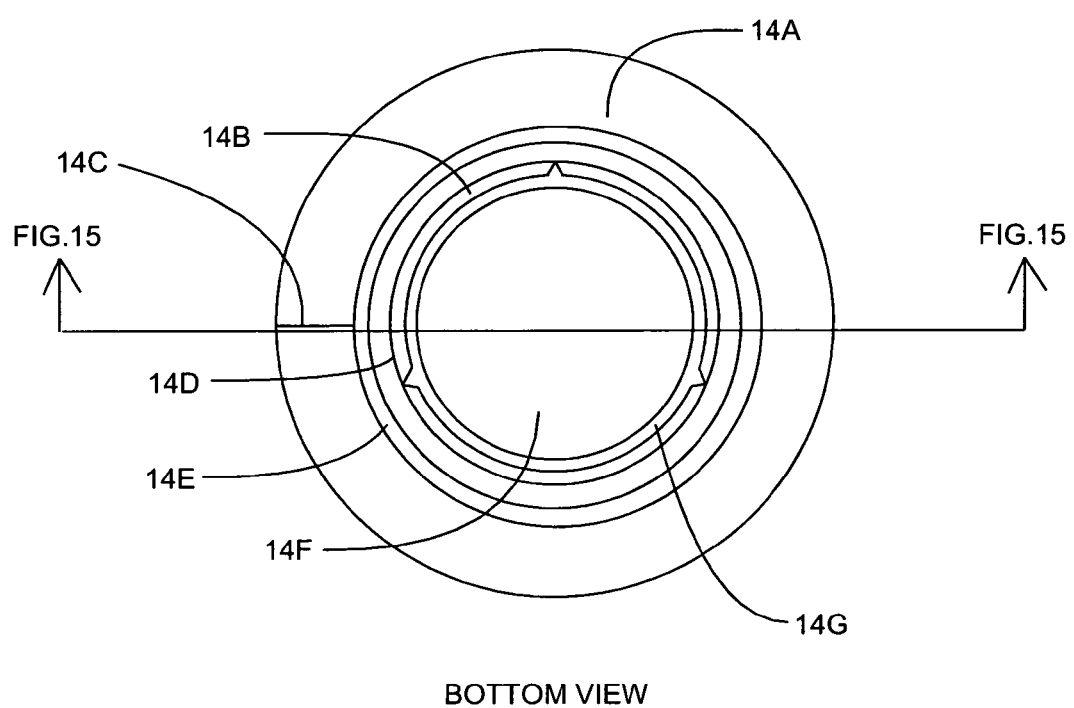
Figure 15:
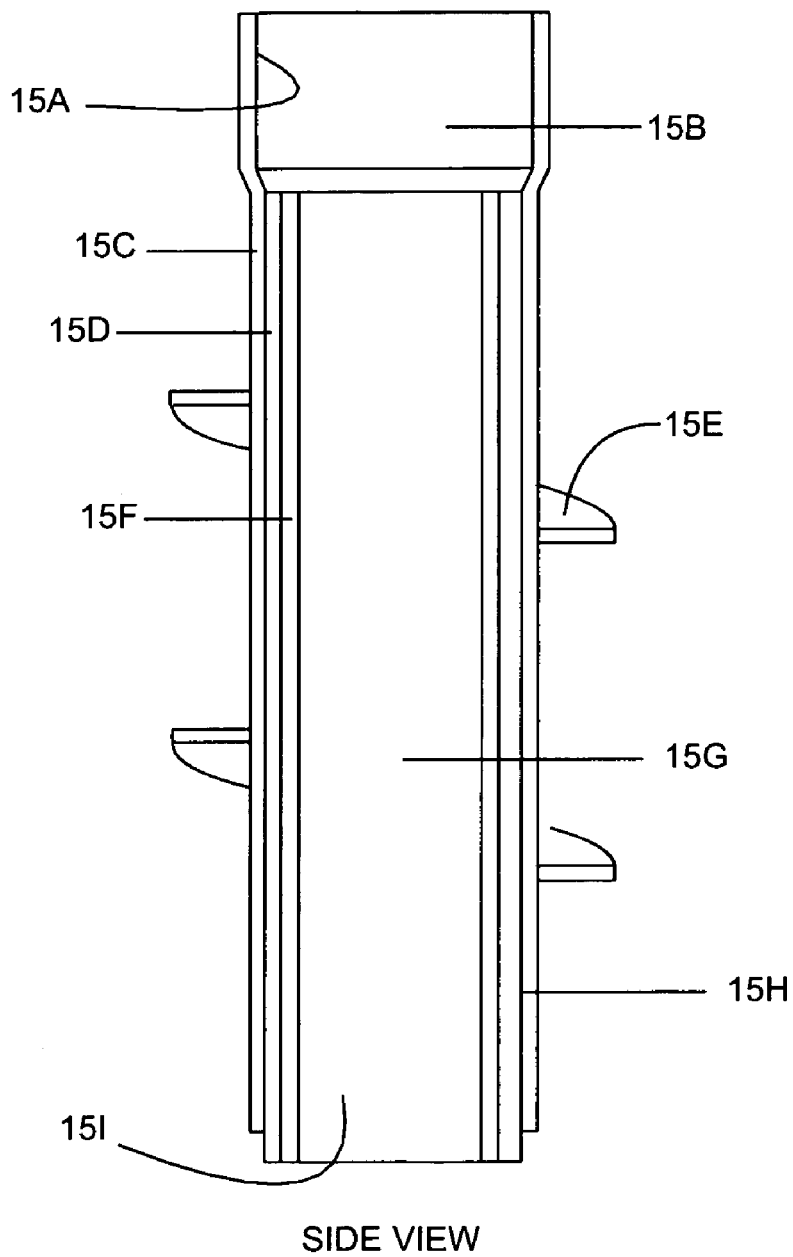

In FIGS. 13, 14 and 15, insulated helically-finned tubing is joined with a collar for large diameter helically-finned tubing that cannot be rolled on spool. In this application, the collar can be fusion welded or threaded to the next joint in the field to make a continuous piece of tubing for installation in the thermally-conductive flowguide tube. Preferably, the inner tube is fuse welded at the factory on both ends of the outer tube to provide the seal for the gas gap.

Figure 16:
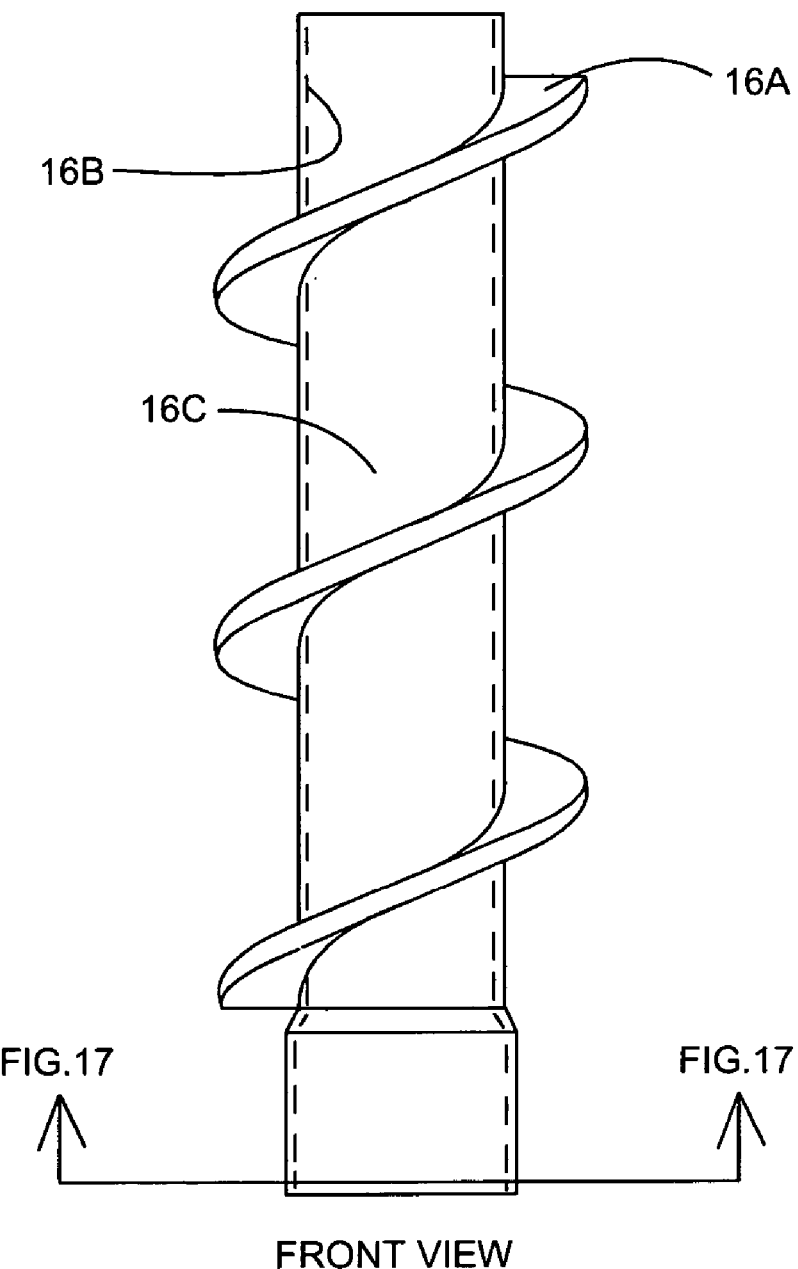
FIGS. 16, 17, and 18 show the front, bottom and cross-section views of the helically-finned tubing with collar without the inner insulated tube installed.
Figure 17:
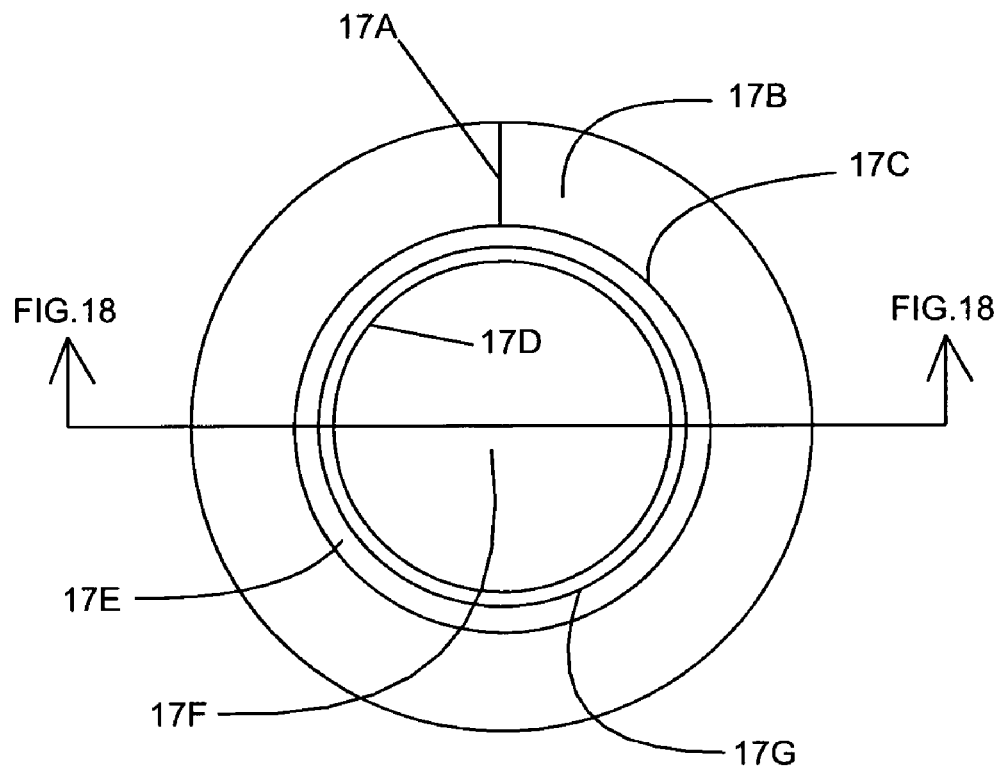
Figure 18:
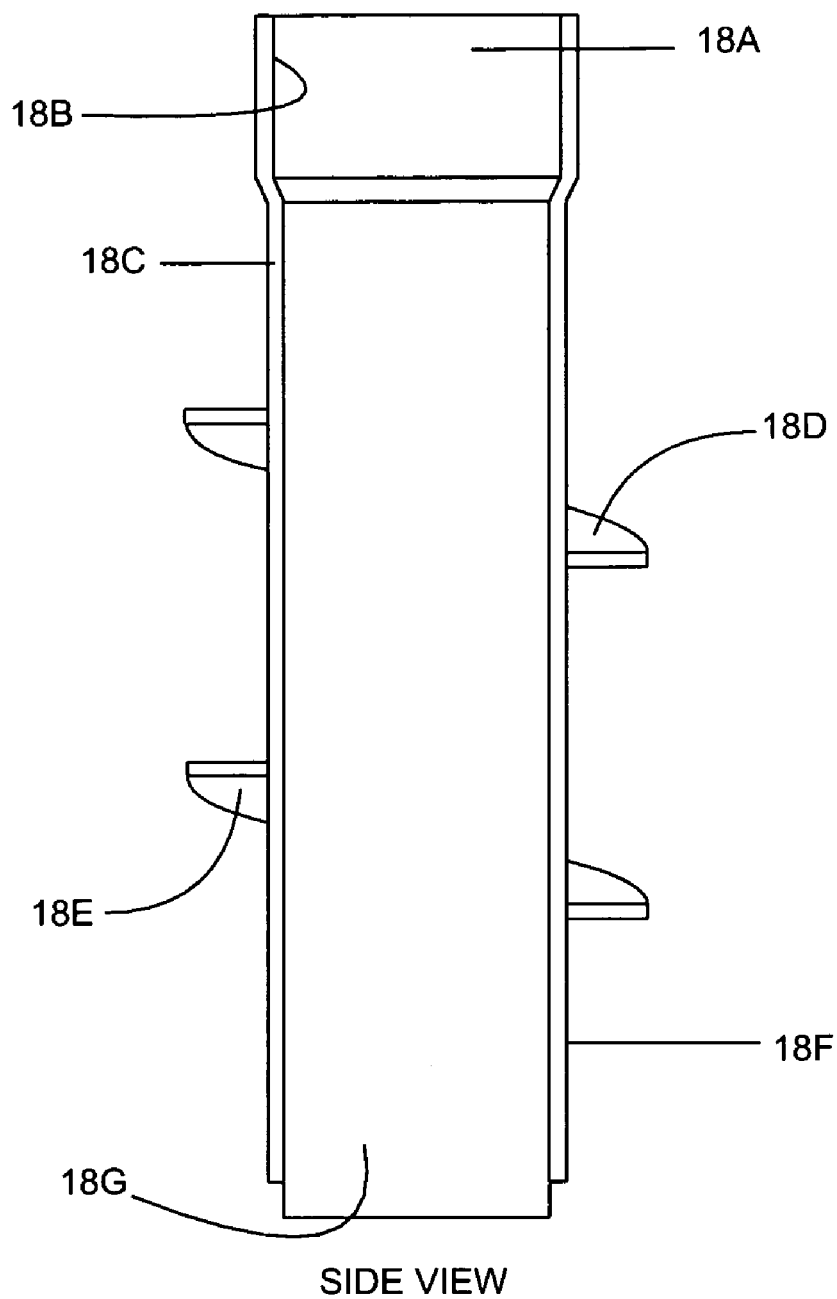

In FIGS. 16, 17, and 18, the helically-finned tubing is joined with collar without the inner insulated tube installed. In this application, the collar is usually threaded for metal tubing, slip for short lengths of plastic tubing or even twisted lock with O-ring seal for long lengths of plastic tubing. Preferably, the wire coil in the collar can be used to fusion weld plastic tubing in the field during installation.

Figure 19:
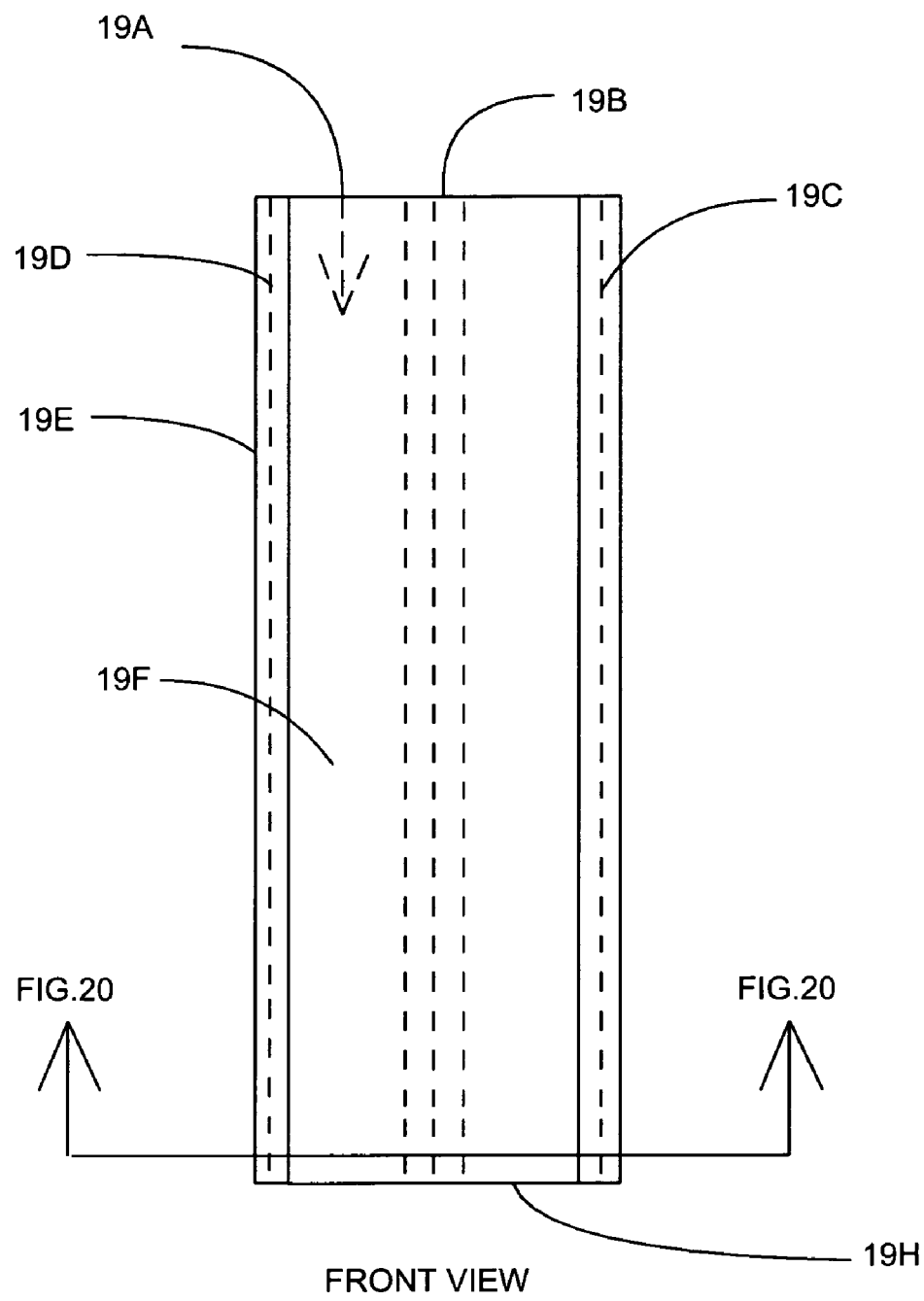
FIGS. 19, 20, and 21 show the front, bottom and cross-section views of the insulated inner sleeve that is fusion welded on both ends inside the helically-finned tubing to provide the gas gap, wherein high pressure argon or other gas can be used to fill the gas gap before the fusion process, and wherein the inner insulation tube can be made of high density, foamed plastic to reduce heat transfer and friction pressure drop.
Figure 20:
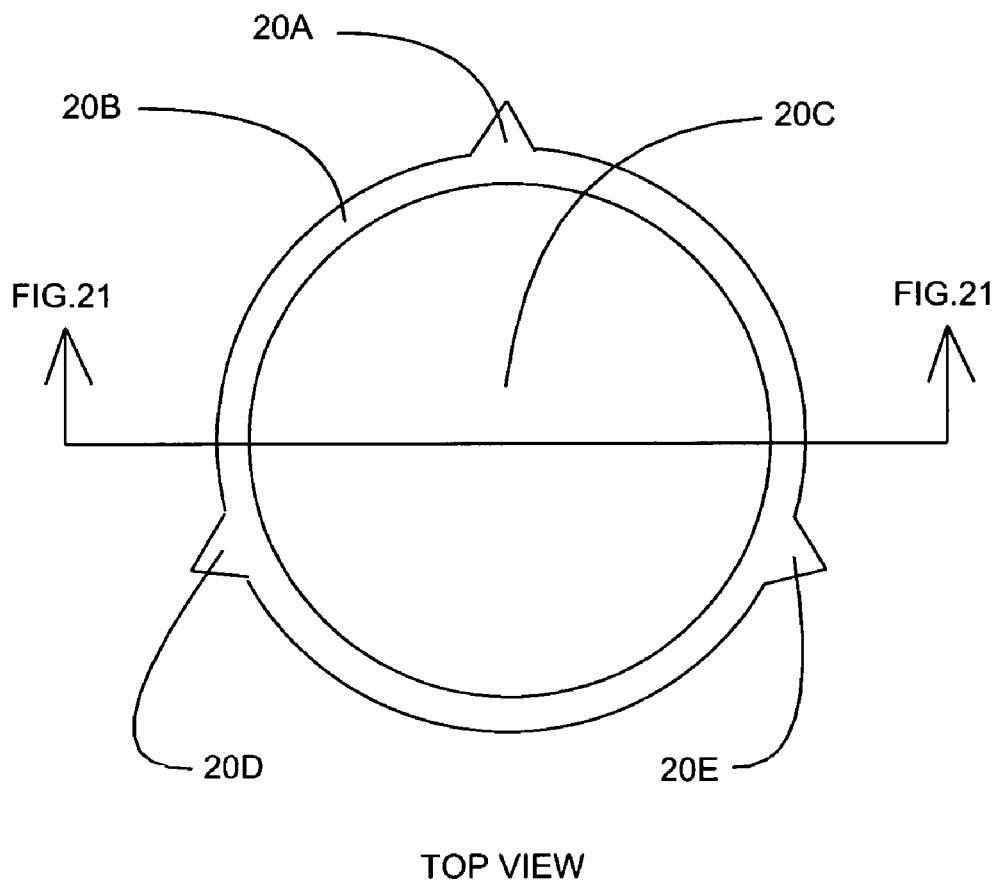
Figure 21:
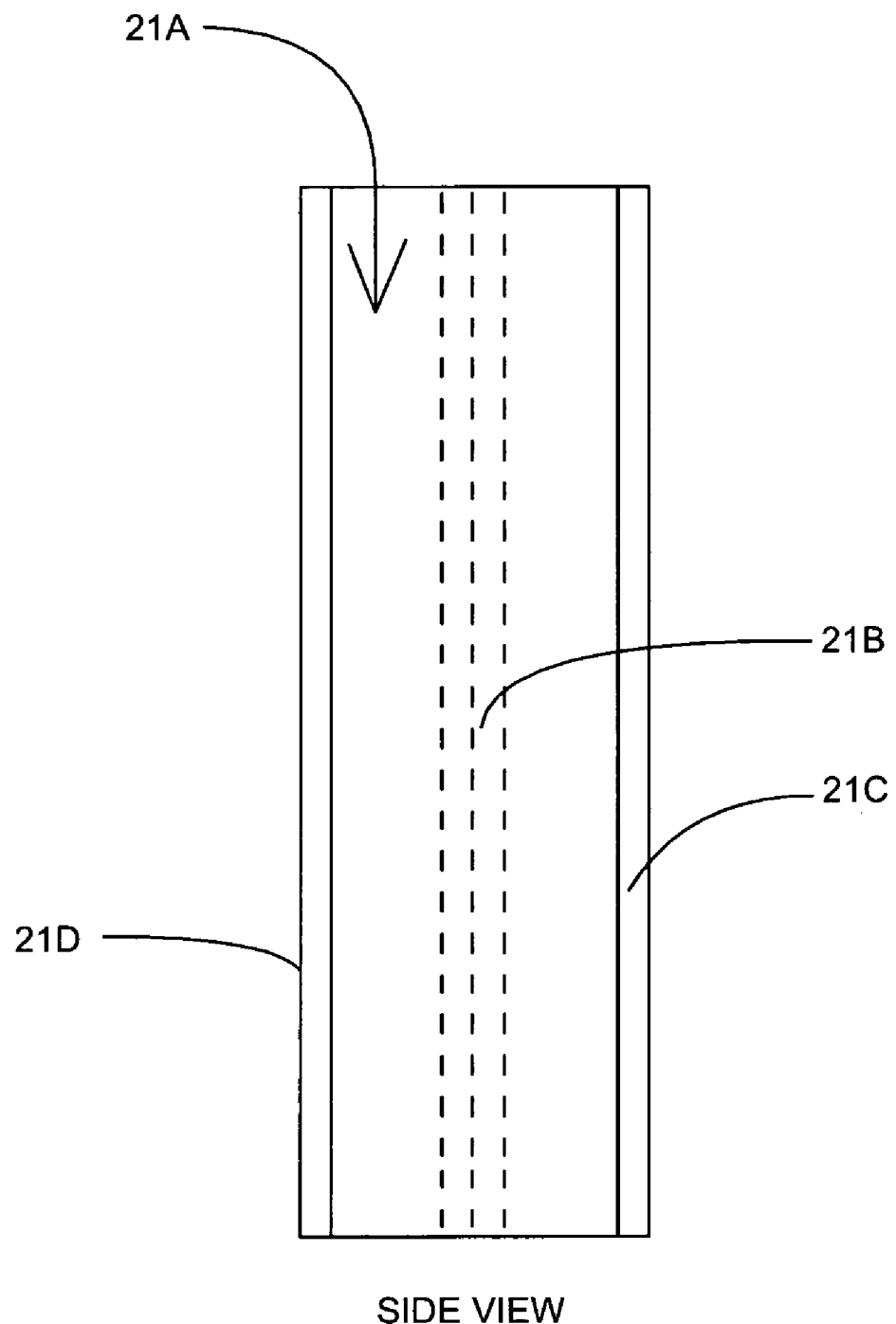

In FIGS. 19, 20, and 21, the insulated inner sleeve is fusion welded on both ends inside the spiral-finned tubing to provide the gas gap. In this application, high pressure argon or other gas can be used to fill the gas gap before the fusion process. Also, the inner insulation tube can be made of high density, foamed plastic to reduce heat transfer and friction pressure drop.

Figure 22:
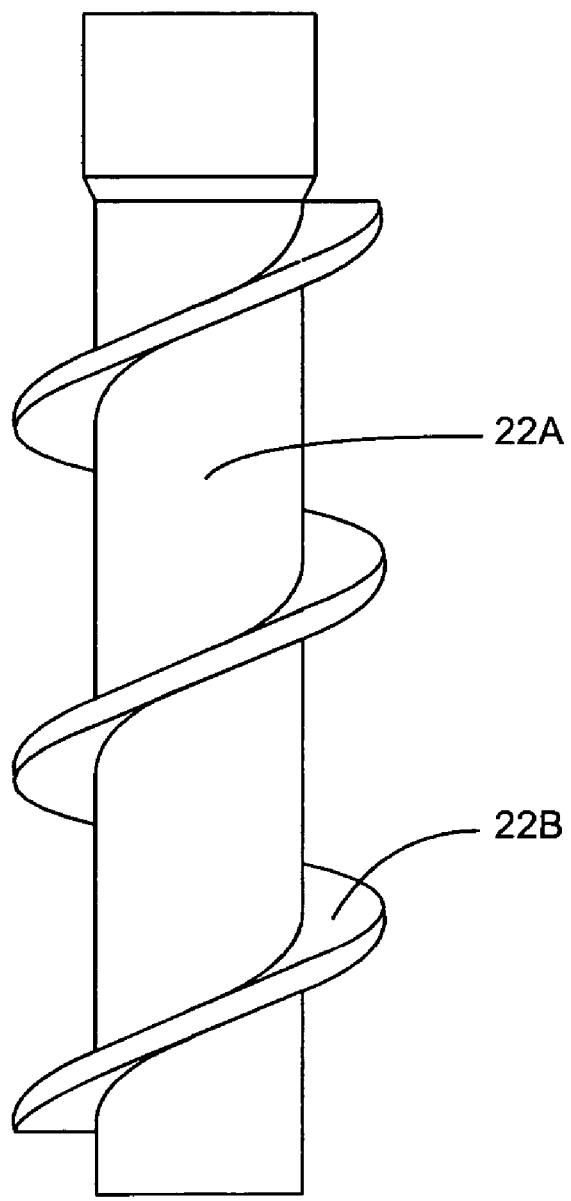
FIGS. 22 and 23 show the front views of tubing joints with a single helical fin and a double helical fin.
Figure 23:
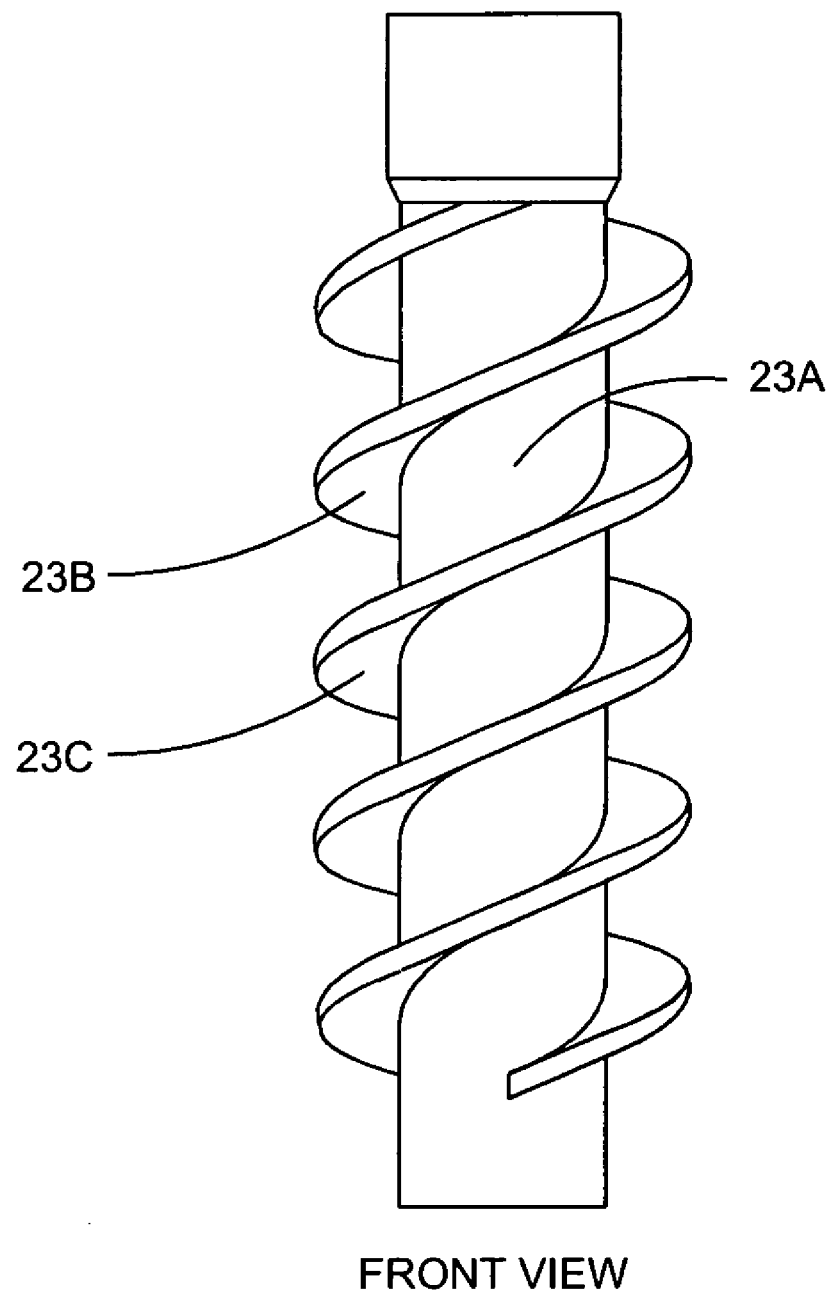

In FIGS. 22 and 23, tubing joints are shown with a single helix fin and a double helix fin. The number of helical/spiral fins increases as the diameter of the thermally-conductive flowguide tube increases to maintain the 1 to 1 or 2 to 1 aspect ratio of the helical flow channel.

Figure 24:
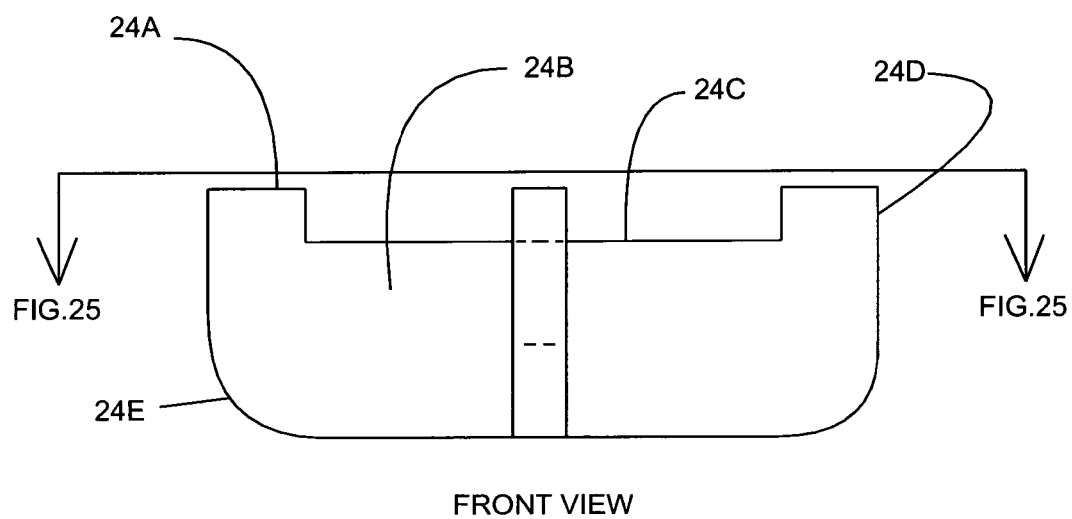
FIGS. 24 and 25 show the front and top views of the helically-finned tubing shoe that is fusion welded to the bottom of the helically-finned tubing so as to protect the helical fins during the installation process.
Figure 25:
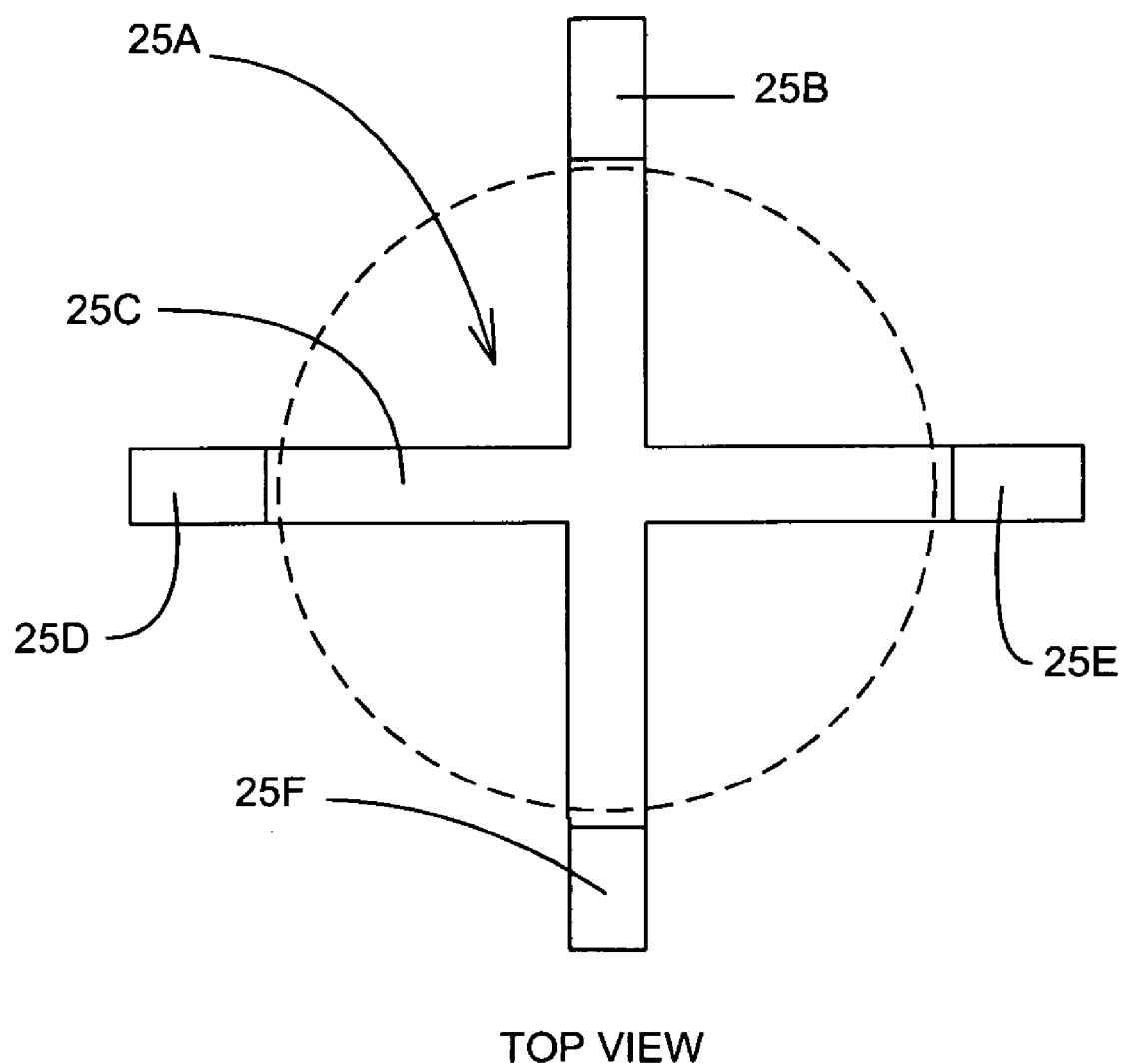

In FIGS. 24 and 25, a shoe structure is shown fusion welded to the bottom (distal end) of the spiral-finned tubing so as to protect the spiral fins during the installation process. During this process, the leading edge of the helically-finned tubing is shown with a radius, however, it can be shaped like a truncated cone. Also while there are four fins shown, notably however, the number of fins can range from 3 to 6, depending on the number of helical fins used on the tubing.

Figure 28:
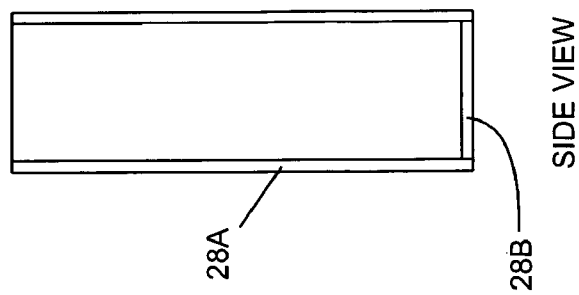
FIGS. 26, 27 and 28 show the front, bottom and cross-section views of the smooth thermally-conductive flowguide tube that is grouted in the earth, wherein the smooth thermally-conductive flowguide tube is usually metal due to its high heat transfer coefficient, wherein the threaded collars are used to attach the joints together.
Figure 27:
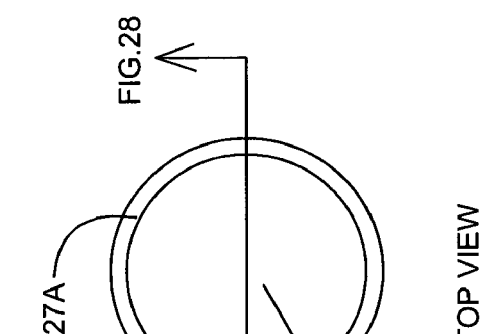
Figure 26:
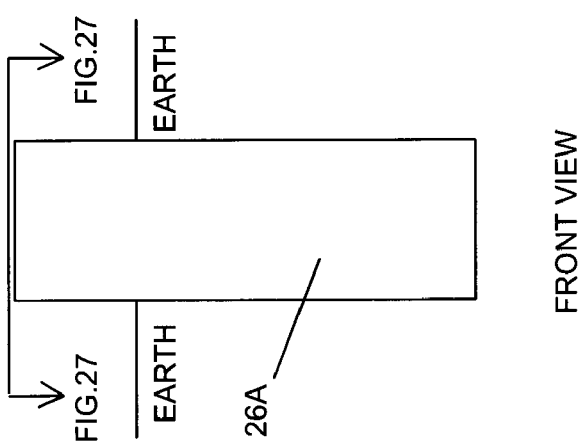

In FIGS. 26, 27 and 28, the smooth thermally-conductive flowguide tube is shown from various views. During the installation process, this tube structure in grouted in the Earth. Preferably, the smooth thermally-conductive flowguide tube is usually metal due to its high heat transfer coefficient. Threaded collars are used to attach the joints together, and the thermally-conductive flowguide tube shoe shown in FIG. 26 usually contains a cement valve and a plug catcher. Small diameter tubing is used inside the thermally-conductive flowguide tube to prevent grout contamination therewithin and to flush the mud out of the flowguide tube after grout placement. Such precautions should be taken because hardened grout inside the flowguide tube can damage the plastic spiral edges during insulation and reduce the heat transfer coefficient of the metal wall. To ensure this, a small diameter coiled tubing is run in the annulus of flowguide tube, and grout is pumped to fill the annulus at substantially the same rate as the small diameter tubing is pulled to the surface.

Figure 31:
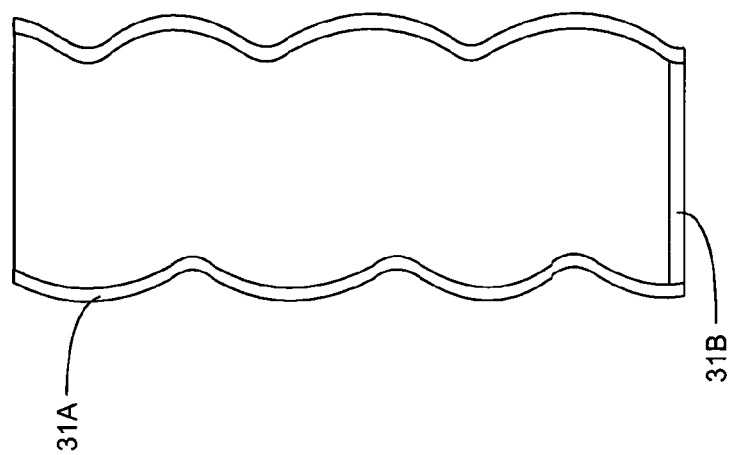
FIGS. 29, 30 and 31 show the front, bottom and cross-section views of the fluted thermally-conductive flowguide tube that is grouted in the earth, wherein the flutes on the plastic thermally-conductive flowguide tube give it additional surface area to counteract the low heat transfer coefficient of the plastic, wherein the flutes also give the plastic thermally-conductive flowguide tube additional strength.
Figure 30:
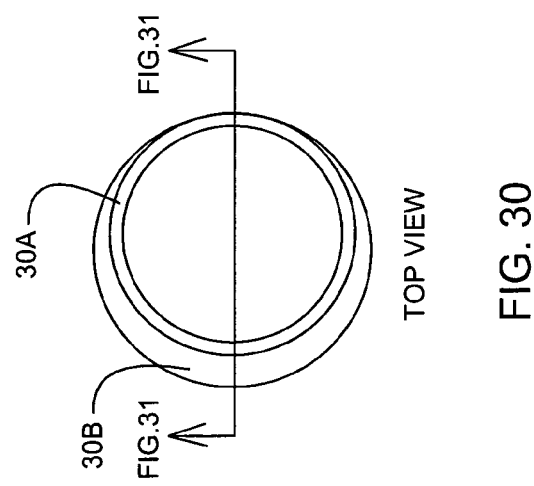
Figure 29:
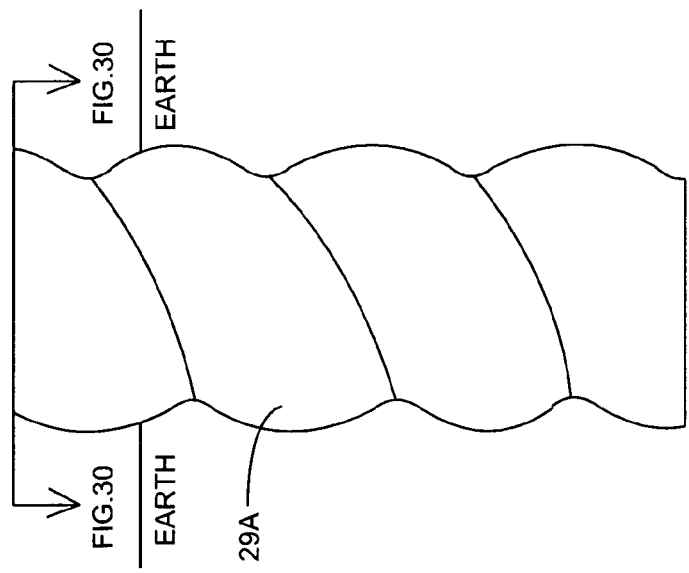

In FIGS. 29, 30 and 31, a fluted thermally-conductive flowguide tube is shown. In this design, the flutes on a plastic thermally-conductive flowguide tube give it additional surface area to counteract the low heat transfer coefficient of the plastic. The flutes also give the plastic thermally-conductive flowguide tube additional strength. The thermally-conductive flowguide tube shoe in FIG. 29 usually has a cement valve and a plug catcher to complete the grouting process. The thermally-conductive flowguide tube shoe will also have metal forks to dig into the wall of the hole to prevent the plastic thermally-conductive flowguide tube from floating when the grout is pumped to surface. An option to prevent the thermally-conductive flowguide tube from floating off the bottom of the hole is to flash set a small volume of grout in the bottom of the hole to hold the thermally-conductive flowguide tube down while the rest of the grout is pumped to the surface with a small diameter coiled tubing in the annulus of the hole. The small diameter tubing is pulled to the surface at substantially the same rate as the grout fills the annulus of the hole.

Figure 32:
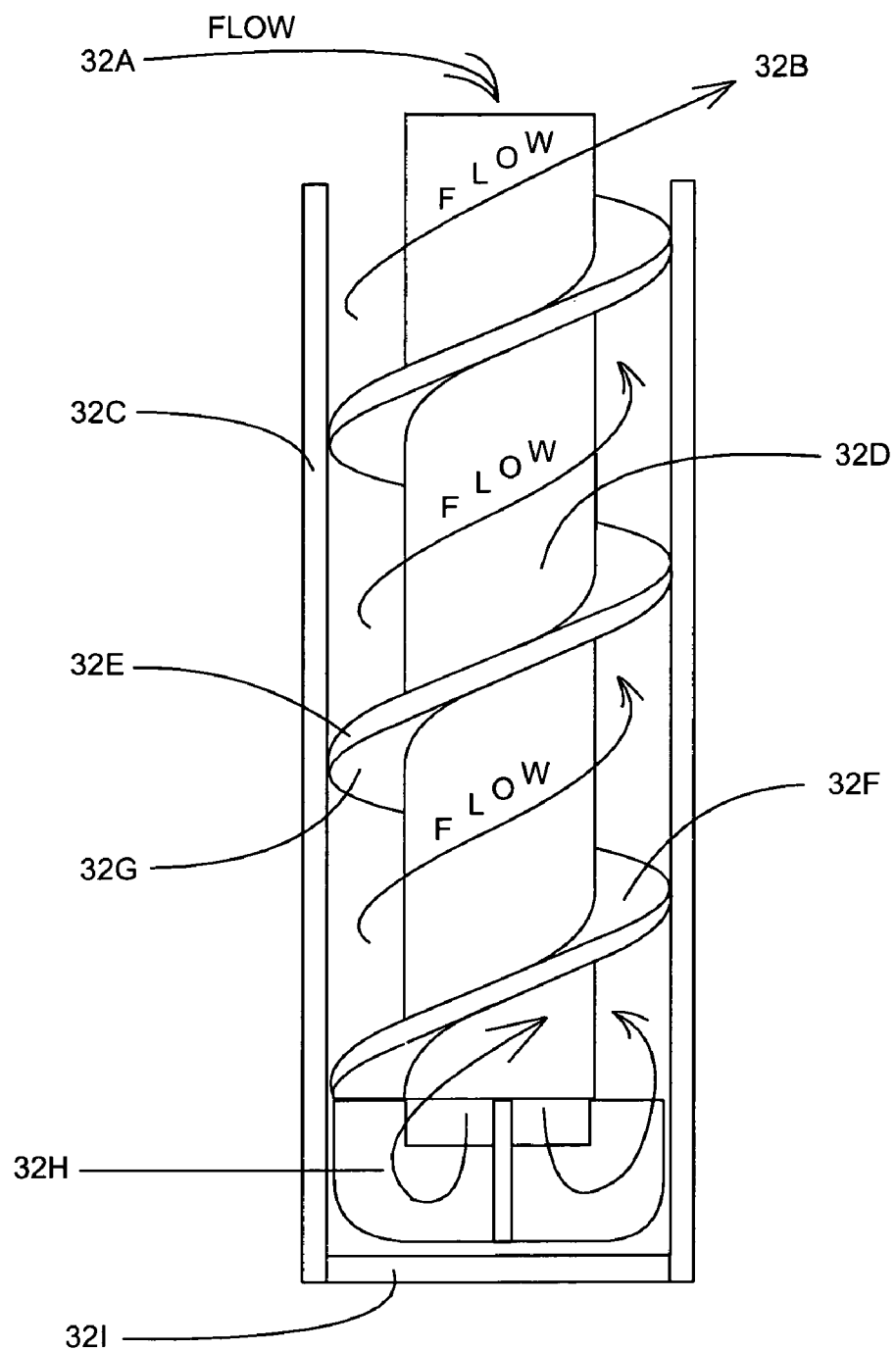
FIGS. 32 and 33 show the forward and reverse flow patterns in smooth thermally-conductive flowguide tube with helically-finned tube, wherein during the cooling season, pumping down the annulus gives the best approximation to a cross flow heat exchanger for liquid-gas mixtures where the liquid adsorbs the gas phase when the pressure increases as the mixture is pump down the thermally-conductive flowguide tube annulus.
Figure 33:
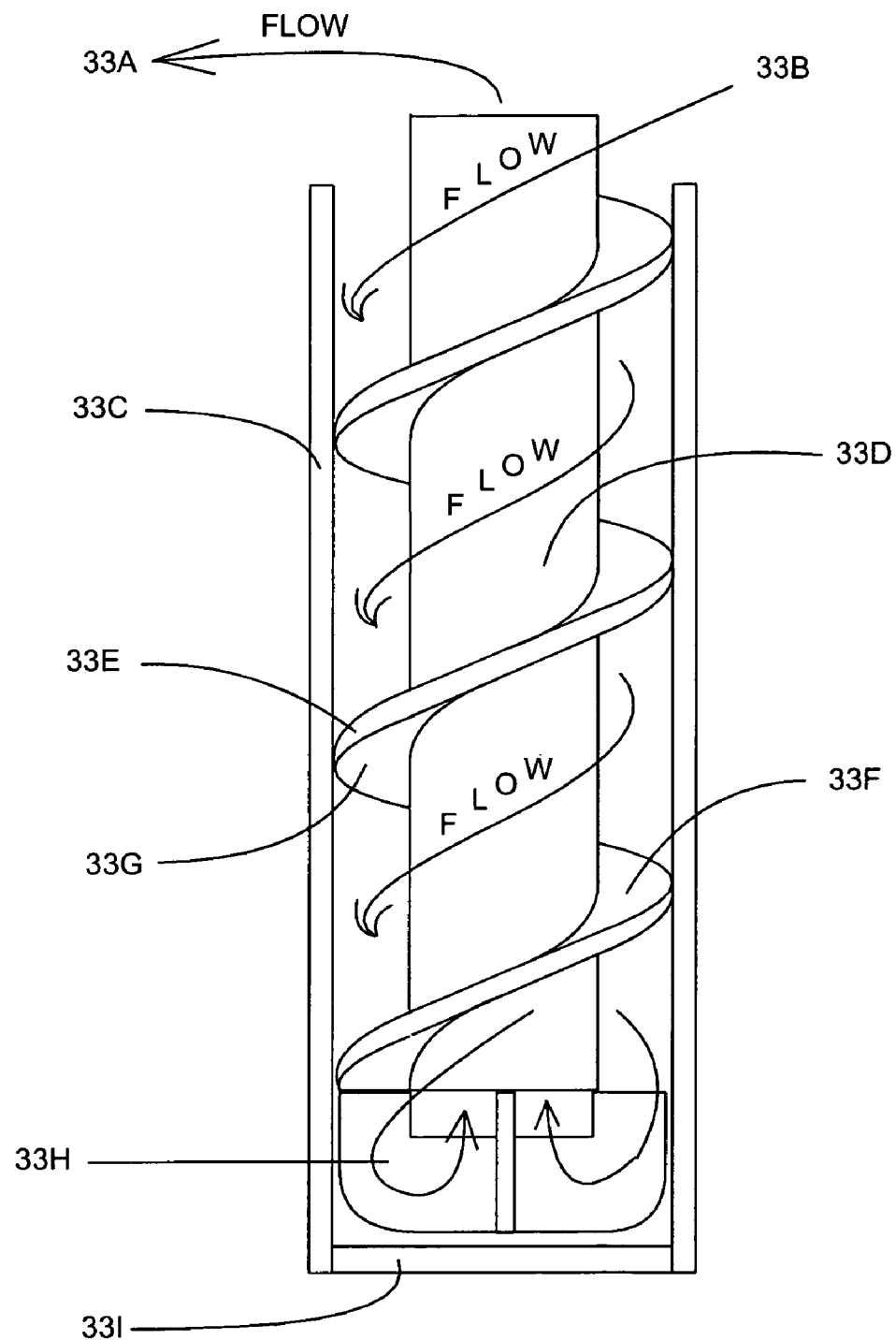

In FIGS. 32 and 33, the forward and reverse flow patterns are shown in smooth thermally-conductive flowguide tube with single helically-finned tube. During the cooling season, pumping down the annulus gives the best approximation to a cross flow heat exchanger for liquid-gas mixtures where the liquid adsorbs the gas phase when the pressure increases as the mixture is pump down the thermally-conductive flowguide tube annulus. As the gas phase is absorbed, the fluid temperature increases with depth which in turn increases the heat transfer to the ground or water. During heating season or winter operation, pumping down the annulus with a cold aqueous fluid gives the best approximation to a cross flow heat exchanger due to the ground temperature increasing with depth. For horizontal or deviated wells, it is better to pump down the inner tube to maximize heat transfer at the end of the well.

Figure 34:
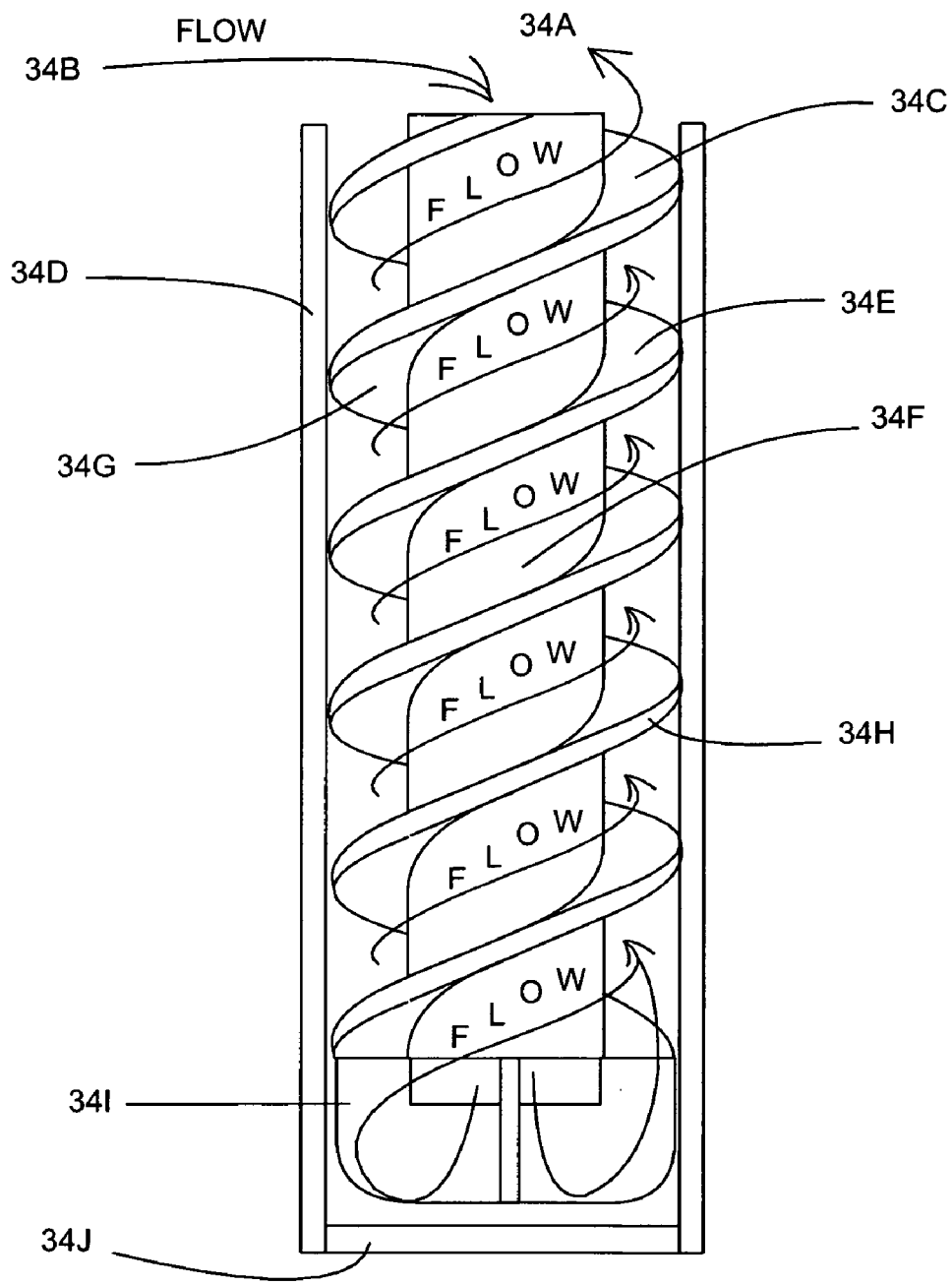
FIG. 34 shows the forward flow pattern for a double helically-finned tube, wherein the multiple helical fins are used for large diameter thermally-conductive flowguide tube, wherein for large diameters, the helically-finned tubing joints can be pre-installed in the thermally-conductive flowguide tube joints for shipment.

FIG. 34 shows the forward flow pattern for a double helically-finned tube. In this design, the multiple helical fins are used for large diameter thermally-conductive flowguide tube. For large diameters, the helically-finned tubing joints can be pre-installed in the thermally-conductive flowguide tube joints for shipment. O-ring seals are used in the spiral finned tube collars, so when thermally-conductive flowguide tube joints are joined together, the O-ring seals the spiral finned tubing also. This helps reduce installation cost and shipping cost for large diameter ground loops.

In FIGS. 35 and 36, a fluted thermally-conductive flowguide tube is shown with single helix flow tubing installed. In this design, the pitch of the spiral and the fluted thermally-conductive flowguide tube should be practically close for maintaining the helix flow pattern in the channel. The fluid will bypass the fins around the space in the flutes. The whole assembly can be extruded together as a tubing-thermally-conductive flowguide tube joint combination, and the joint combination can be fusion welded in the field with preinstalled wire coils in the collars.

Figure 37:
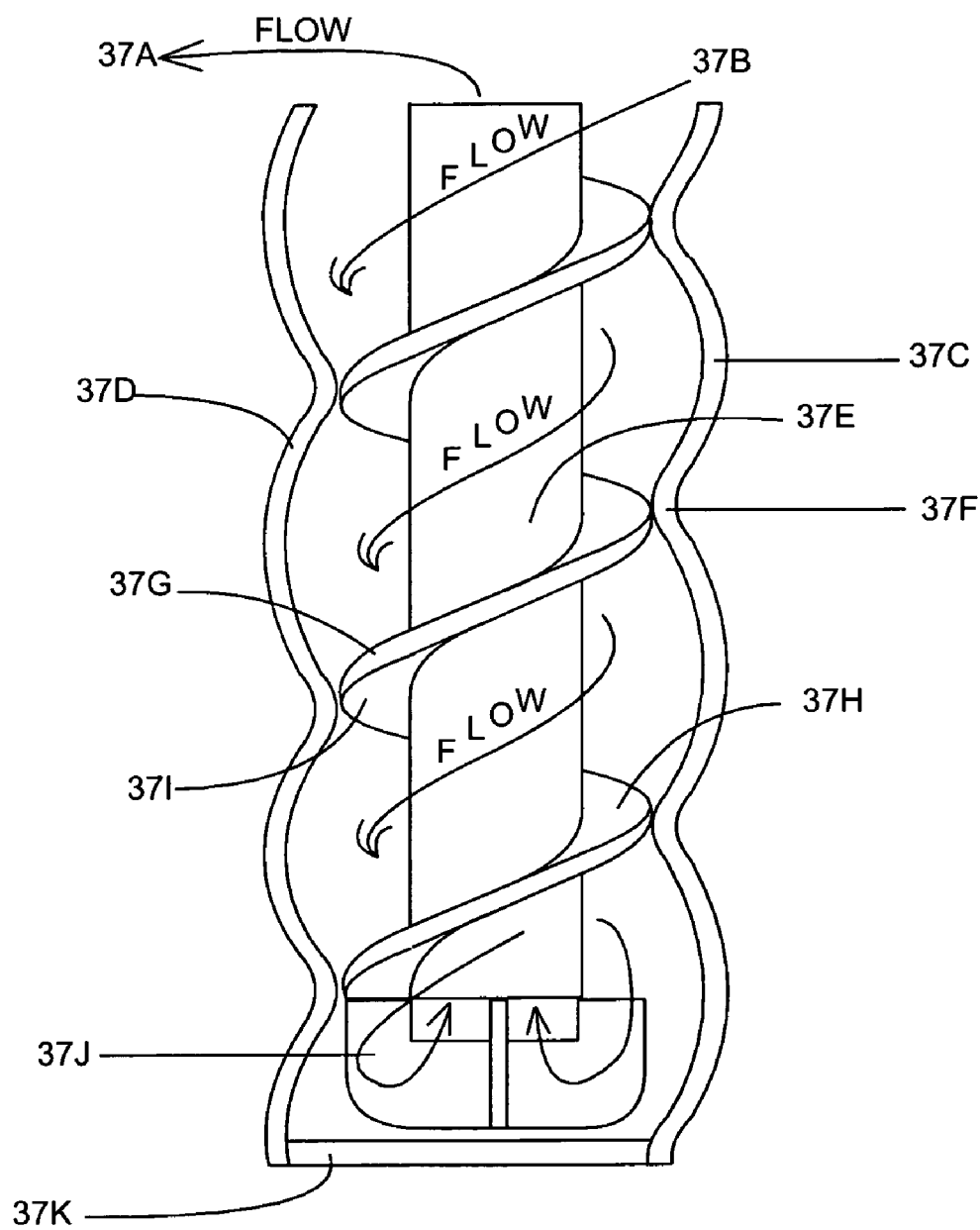
FIGS. 37 and 38 show the spiral flow pattern of fluid as it is pumped down the annulus and up the annulus of the coaxial-flow heat exchanging structure of the illustrative embodiment of the present invention.
Figure 38:
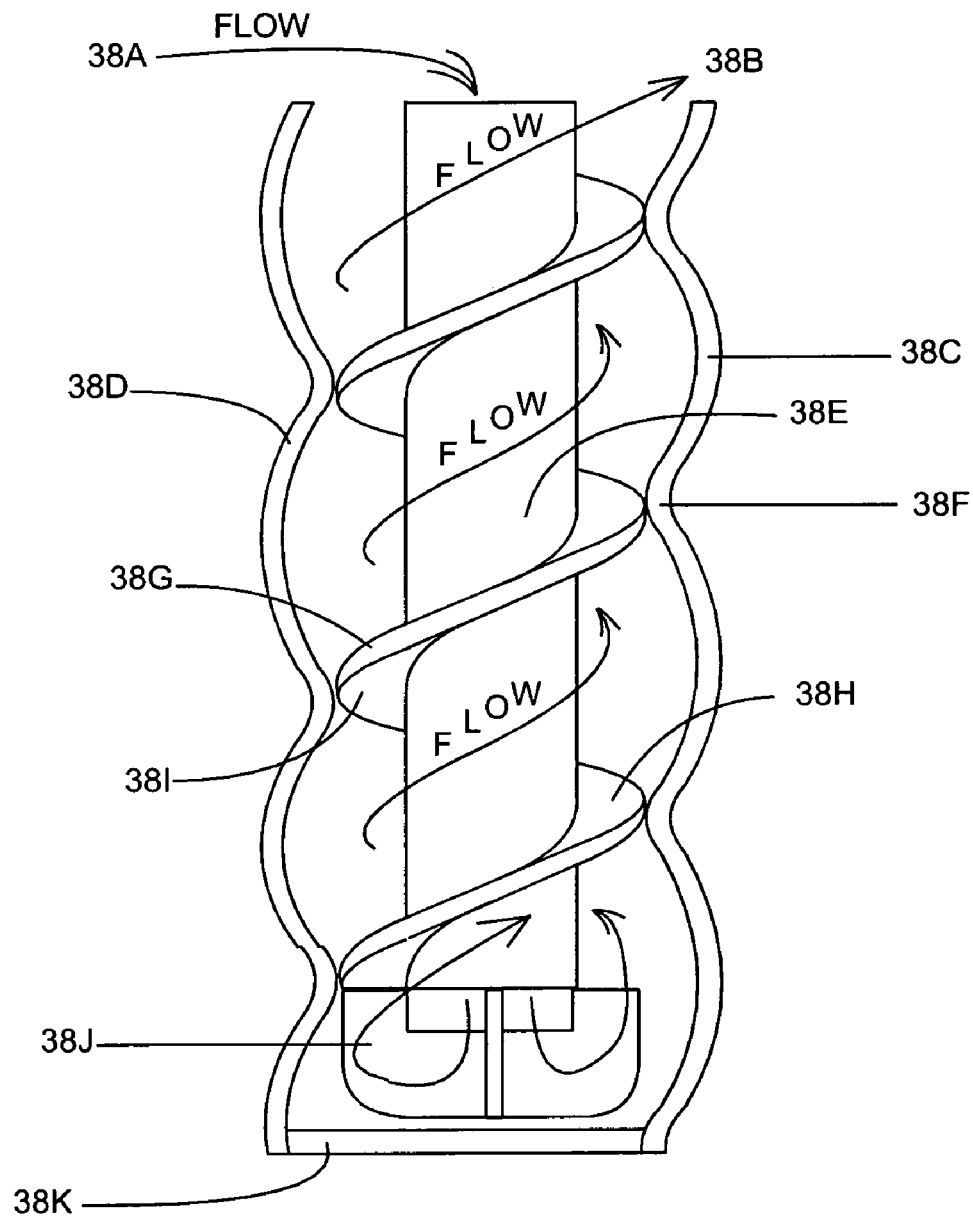

FIGS. 37 and 38 show the helical flow pattern of fluid as it is pumped down the annulus and up the annulus of the coaxial-flow heat exchanging structure of the illustrative embodiment of the present invention. Pumping down the annulus for near vertical well bores gives the best approximation to a cross flow heat exchanger for ground temperatures close the surface. For horizontal or deviated wells in aquifers, it is better to pump down the inner insulation tube to maximize the heat transfer at the end of the well.

FIGS. 39, 40, 41 and 42 show cross-sectional views of the tangential flow directions for an coaxial-flow heat exchanging structure having a fluted control volume shape. An coaxial-flow heat exchanging structure with a square-like shape control volume usually has one vortex for flow rates of interest. An coaxial-flow heat exchanging structure having a rectangle-like shaped control volume with an aspect ratio near 2 to 1 usually has two vortexes for flow rates of interest. For coaxial-flow heat exchanging structures having rectangle-like shapes with an aspect ratio greater than 4 to 1, there can be vortex near each fin with a laminar slot flow region in the center of the control volume. The laminar slot flow region of the coaxial-flow heat exchanging structure reduces the heat transfer of the fluid with the thermally-conductive flowguide tube wall and reduces the efficiency of the helical flow ground flow loop of the coaxial-flow heat exchanging structure of the illustrative embodiment of the present invention.

FIGS. 43, 44, 45 and 46 show cross-sectional views of the tangential flow directions for a coaxial-flow heat exchanging structure having a smooth rectangular control volume shape. A coaxial-flow heat exchanging structure having a square-like shape control volume usually has one vortex for flow rates of interest. A coaxial-flow heat exchanging structure having a rectangle-like shaped control volume with an aspect ratio near 2 to 1 usually has two vortexes for flow rates of interest. For a coaxial-flow heat exchanging structure having a rectangle-like control volume shape with an aspect ratio greater than 4 to 1, there can be a vortex near each fin with a laminar slot flow region in the center of the control volume. The laminar slot flow region reduces the heat transfer of the fluid with the thermally-conductive flowguide tube wall and reduces the efficiency of the spiral helical flow ground flow loop.

Figure 47:
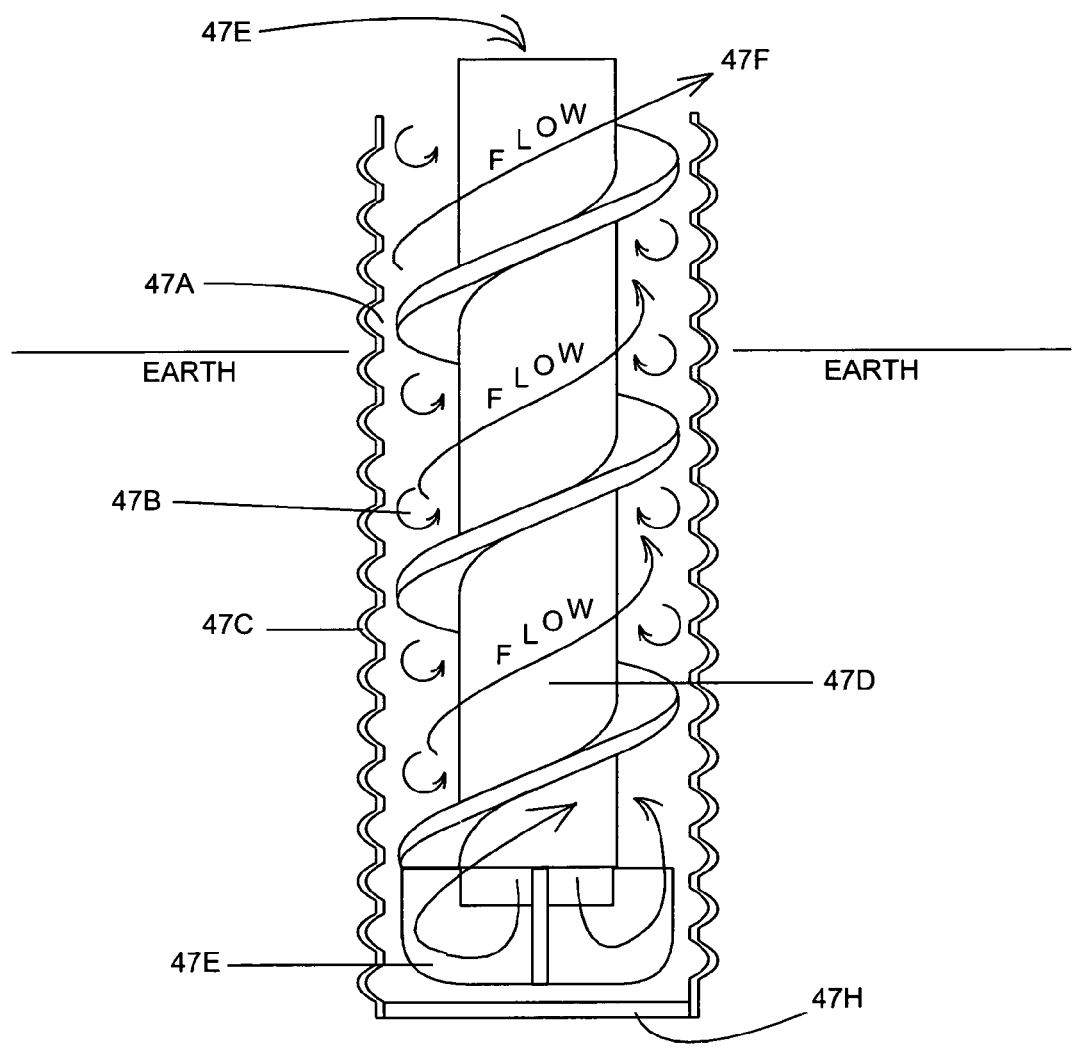
FIG. 47 shows the helically-finned tubing in a corrugated thermally-conductive flowguide tube of the coaxial-flow heat exchanging structure of the illustrative embodiment of the present invention.

FIG. 47 shows a coaxial-flow heat exchanging structure having a helically-finned tubing in a corrugated thermally-conductive flowguide tube. In this design, the corrugated flowguide tube wall increases the surface area and strength of the thin walled thermally-conductive flowguide tube. The period of the corrugation flutes is at least one quarter or less of the helical fin to prevent significant fluid bypass around the fins. The corrugations will increase the friction pressure drop in the annulus of the coaxial-flow heat exchanging structure by a factor of 10% and will increase the heat transfer rate and area thereof by a factor of 40%.

FIG. 48 shows the helically-finned tubing in the thermally-conductive flowguide tube of the coaxial-flow heat exchanging structure installed with a well cap. The well cap holds the helically-finned tubing off the bottom of the thermally-conductive flowguide tube so as to prevent buckling of the plastic helically-finned tubing and seals the thermally-conductive flowguide tube annulus from fluid leaks. In order to prevent buckling of the plastic spiral tubing, at least ⅔ of the spiral-finned tubing should be hung in tension from the well cap. Using the O-ring seal, well cap provides an easy way to remove the spiral tubing in case thermally-conductive flowguide tube fluid leak. The well cap can be attached to thermally-conductive flowguide tube with threads, with compression bolts or a compression ring.

Figure 49:
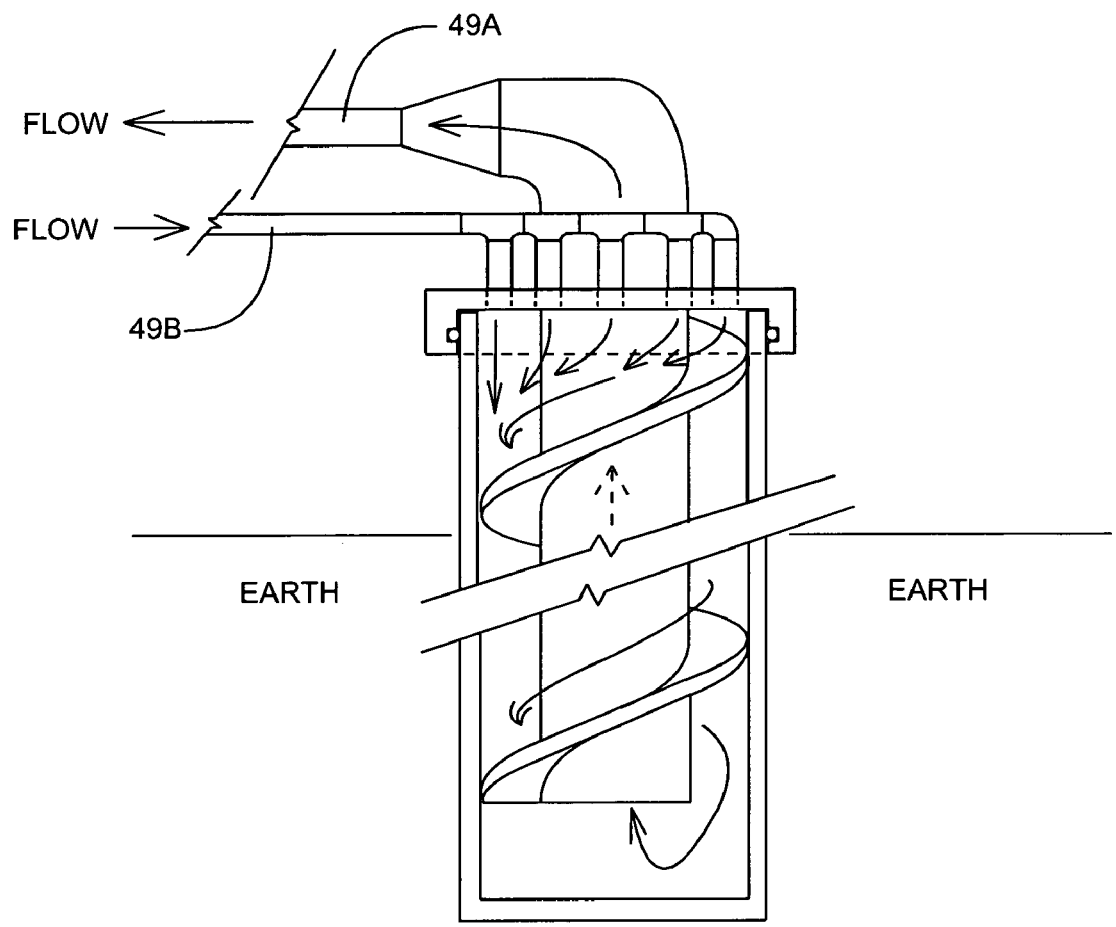
FIG. 49 shows fluid distribution around the helical annulus of the coaxial-flow heat exchanging structure shown in FIG. 50, as well as around its well cap, that is, for fluid being pumped down the spiral annulus of the coaxial-flow heat exchanging structure.
Figure 50:
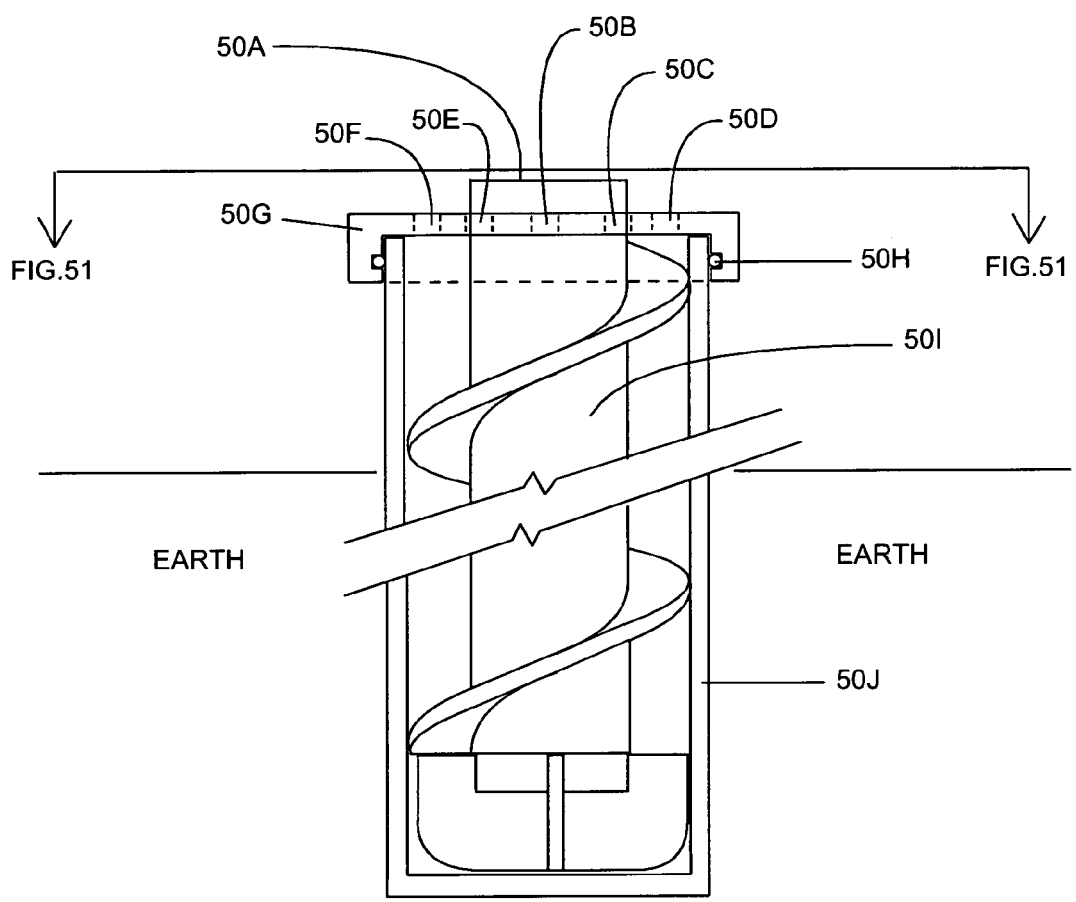
FIGS. 50 and 51 show the cross-section and top views of well thermally-conductive flowguide tube and well cap installed in the coaxial-flow heat exchanging structure of the present invention, wherein the fluid return and injection manifold have been removed for drawing clarity, and the well cap can have manifold of several small holes for a low friction pressure drop or a single medium size hole for a little higher friction pressure drop.

FIG. 49 shows fluid distribution around the spiral annulus of the coaxial-flow heat exchanging structure shown in FIG. 50, as well as around its well cap, that is, for fluid being pumped down the spiral annulus of the coaxial-flow heat exchanging structure.

Figure 51:
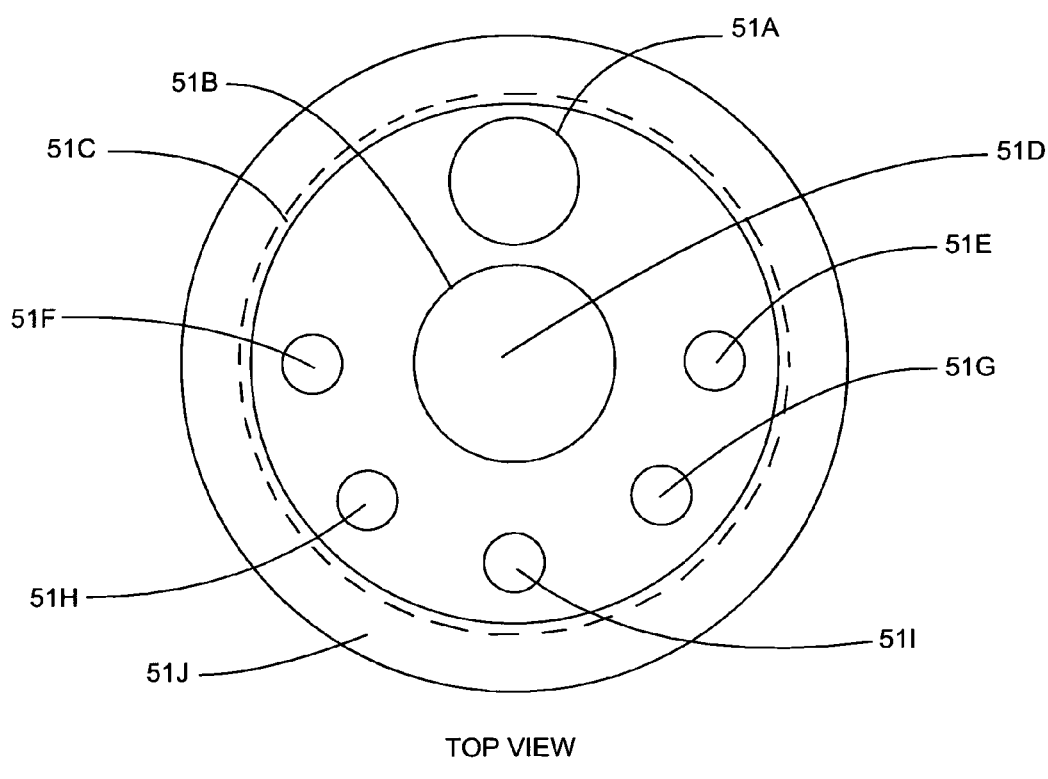

In FIGS. 50 and 51, an axial-flow heat exchanging structure of the present invention is shown as having a thermally-conductive flowguide tube and a well cap. In this application, the fluid return and injection manifold have been removed for drawing clarity. The well cap can have a manifold of several small holes for a low friction pressure drop or a single medium size hole for a little higher friction pressure drop. The single medium sized hole is usually threaded for a pipe connection, and the small holes have an O-ring sealed quick-connect to prevent fluid leaks and reduce the installation time of the pre-made manifold.

Figure 52:
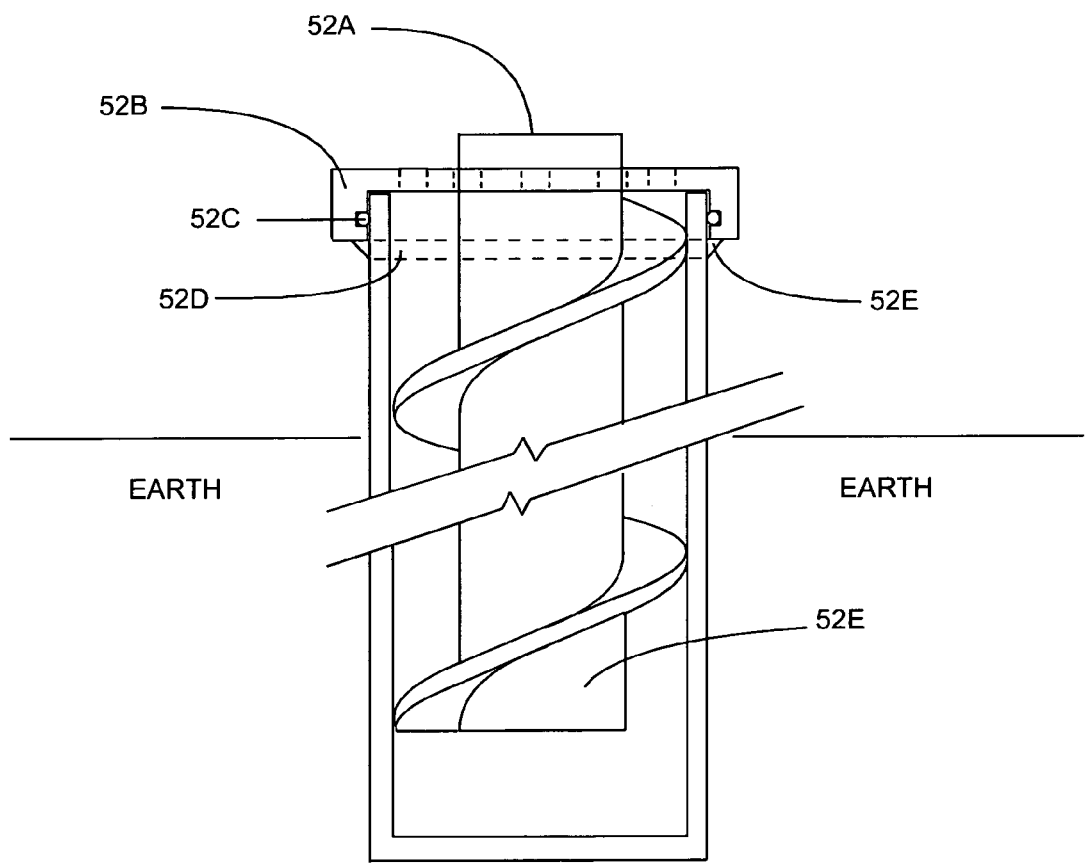
FIGS. 52, 53, and 54 show a compression ring well cap and clamped well cap installed in the coaxial-flow heat exchanging structure of the present invention, wherein either well cap has an O-ring or U-ring seal around the well thermally-conductive flowguide tube to prevent fluid leaks, wherein the clamps on the thermally-conductive flowguide tube to prevent fluid pressure from pumping well cap off the thermally-conductive flowguide tube for shallow spiral tubing depths or high fluid pressures, and wherein for permanent installations in cement structures, the well cap is fusion welded, as shown in FIG. 52, so as to reduce the risk of leaks.
Figure 53:
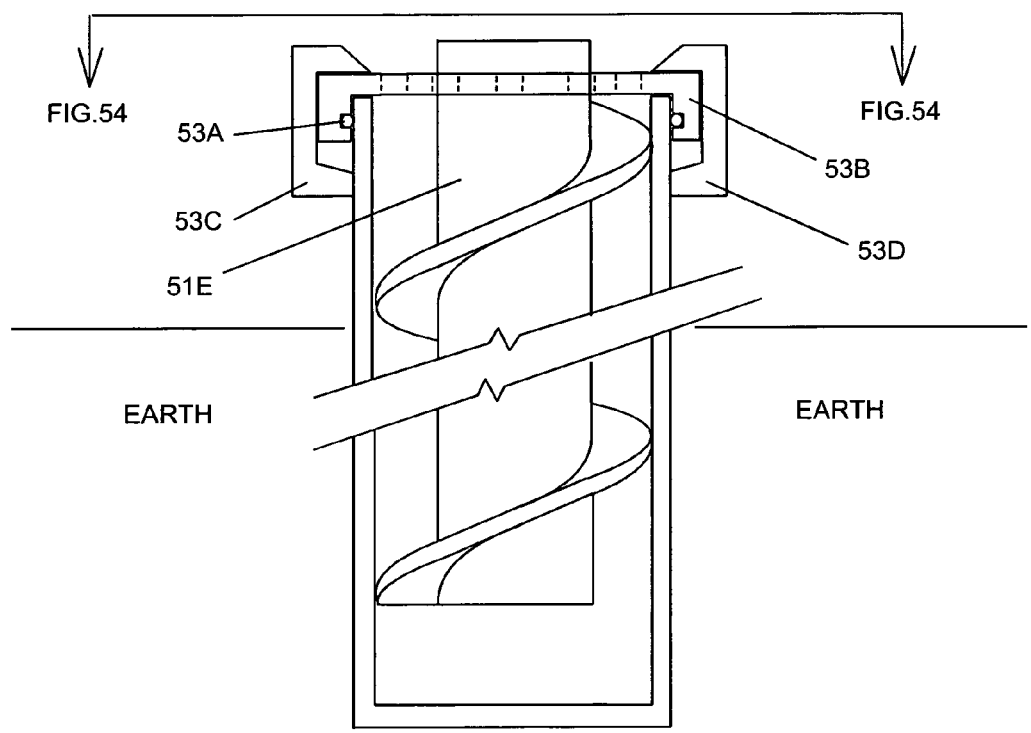
Figure 54:
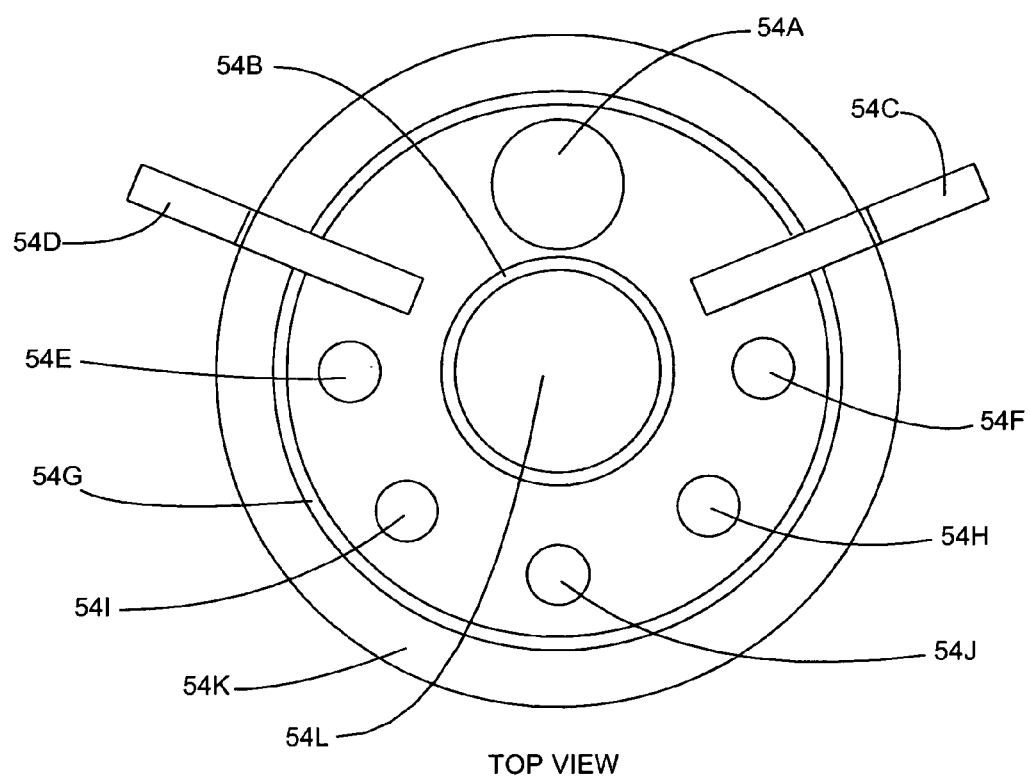
Figure 55:
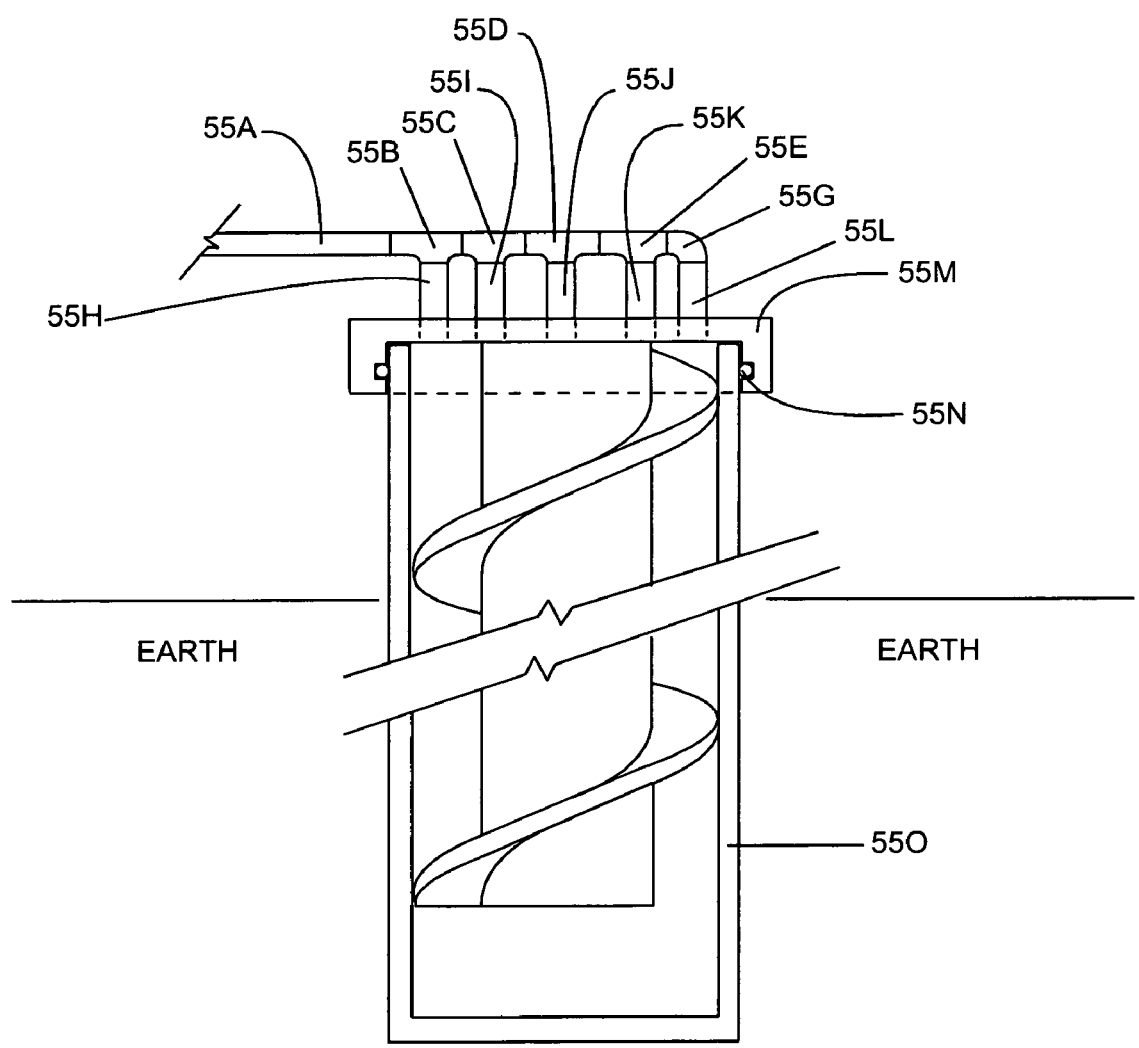
FIGS. 55, 56, 57 and 58 show three different styles of annulus fluid return for the helically-finned tubing employed within the coaxial-flow heat exchanging structure of the present invention, wherein the first style uses a connected manifold of small holes or one medium size hole drilled in the well cap with fluid exiting parallel or perpendicular to thermally-conductive flowguide tube axis, wherein the second style uses tube fittings welded/fused to the side of the thermally-conductive flowguide tube for fluid injection and return (for use in concrete piling or pier installations), wherein the third style uses a tube fitting welded to the side of the thermally-conductive flowguide tube for annular fluid return (for use in foundation installations when the tube fittings are compression), and wherein all the designs have a low friction pressure drop.
Figure 56:
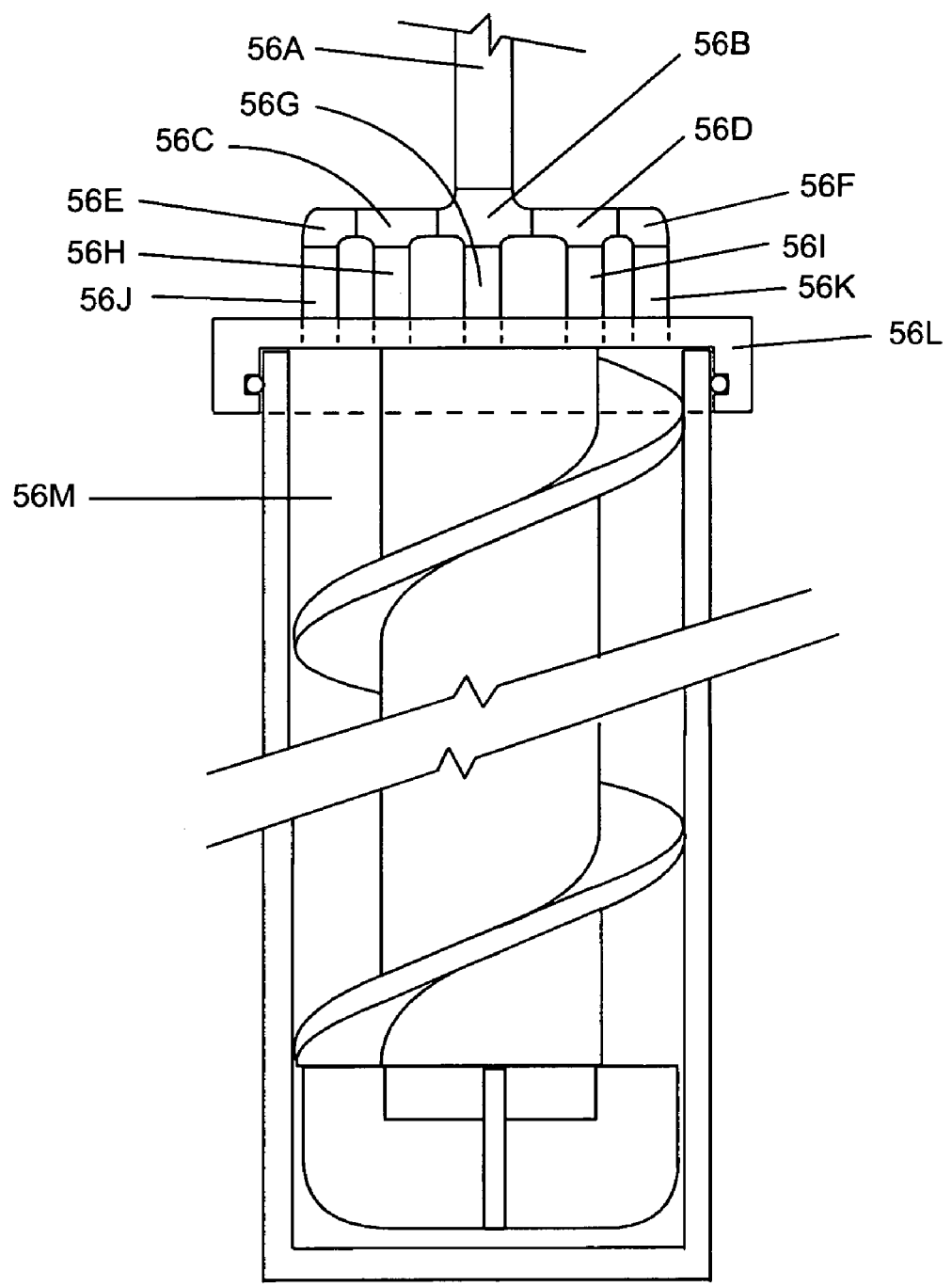
Figure 57:
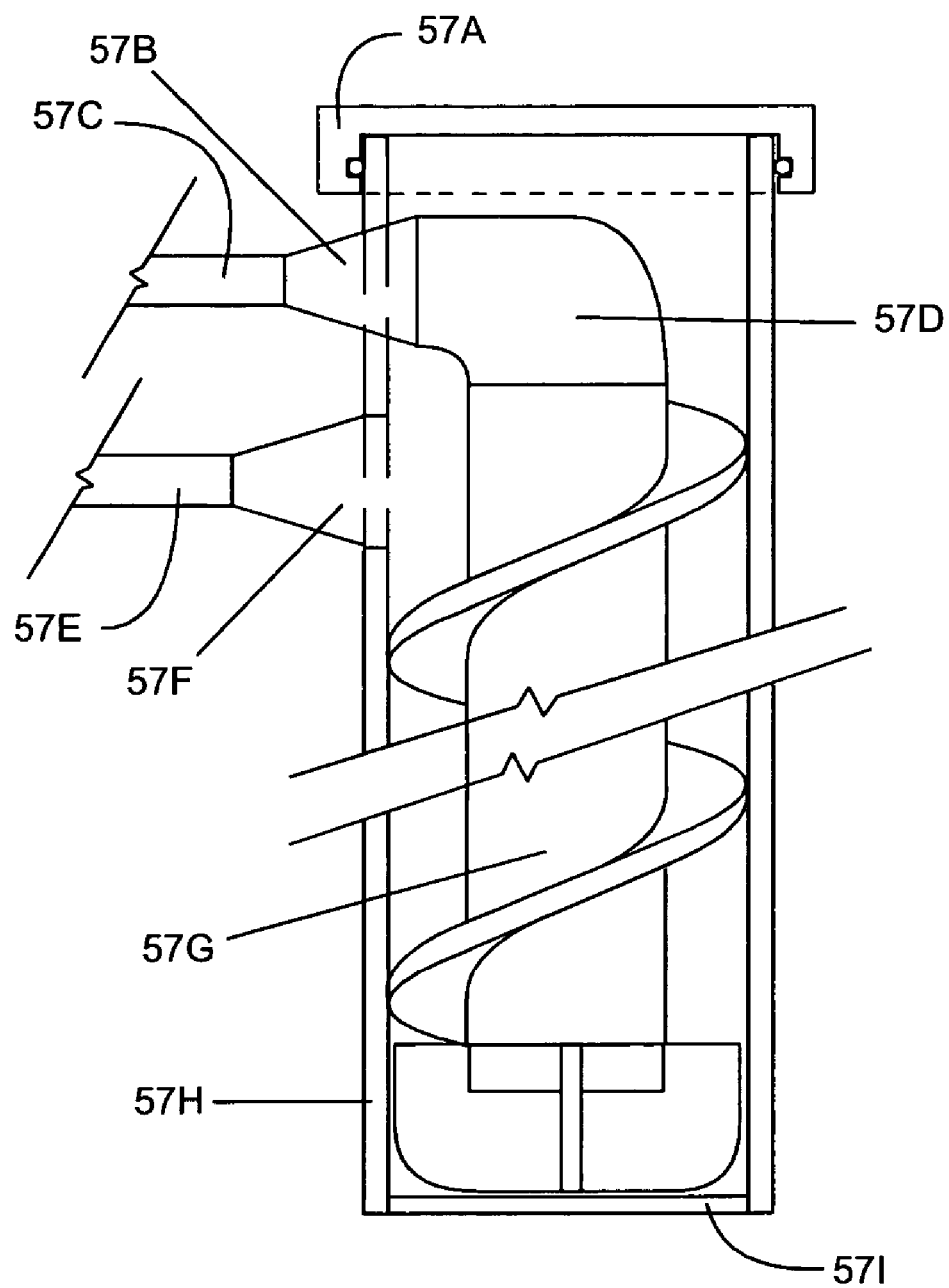
Figure 58:
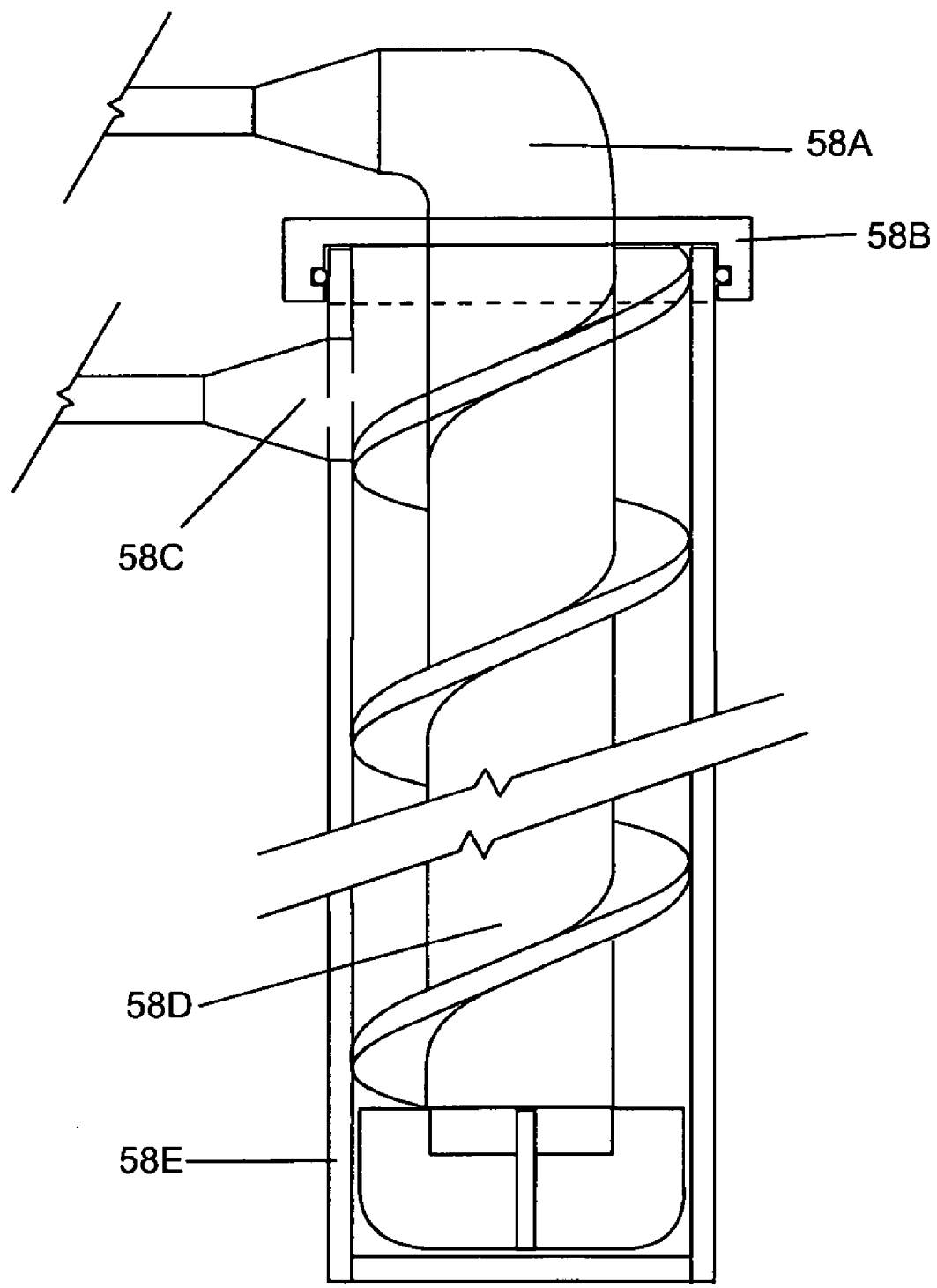

In FIGS. 52, 53, and 54, coaxial-flow heat exchanging structures of the present invention are shown having either a compression ring well cap or a clamped well cap. In this design, either type of well cap has an O-ring or U-ring seal around the well thermally-conductive flowguide tube so as to prevent fluid leaks. The clamps on the thermally-conductive flowguide tube are provided to prevent fluid pressure from pumping well cap off the thermally-conductive flowguide tube for shallow helical tubing depths or high fluid pressures. For permanent installations in cement structures, the well cap is fusion welded, as shown in FIG. 52, so as to reduce the risk of leaks.

FIGS. 55, 56, 57 and 58 show three different styles of annulus fluid return for the helically-finned tubing employed within the coaxial-flow heat exchanging structure of the present invention. In the first style, the coaxial-flow heat exchanging structure employs a connected manifold of small holes or one medium size hole drilled in the well cap with fluid exiting parallel or perpendicular to thermally-conductive flowguide tube axis. In the second style, the coaxial-flow heat exchanging structure employs tube fittings welded/fused to the side of the thermally-conductive flowguide tube for fluid injection and return (for use in concrete piling or pier installations). In the third style, the coaxial-flow heat exchanging structure uses a tube fitting welded to the side of the thermally-conductive flowguide tube for annular fluid return (for use in foundation installations when the tube fittings are compression). In all three designs, a low friction pressure drop is achieved across the cap of the coaxial-flow heat exchanging structure.

Figure 59:
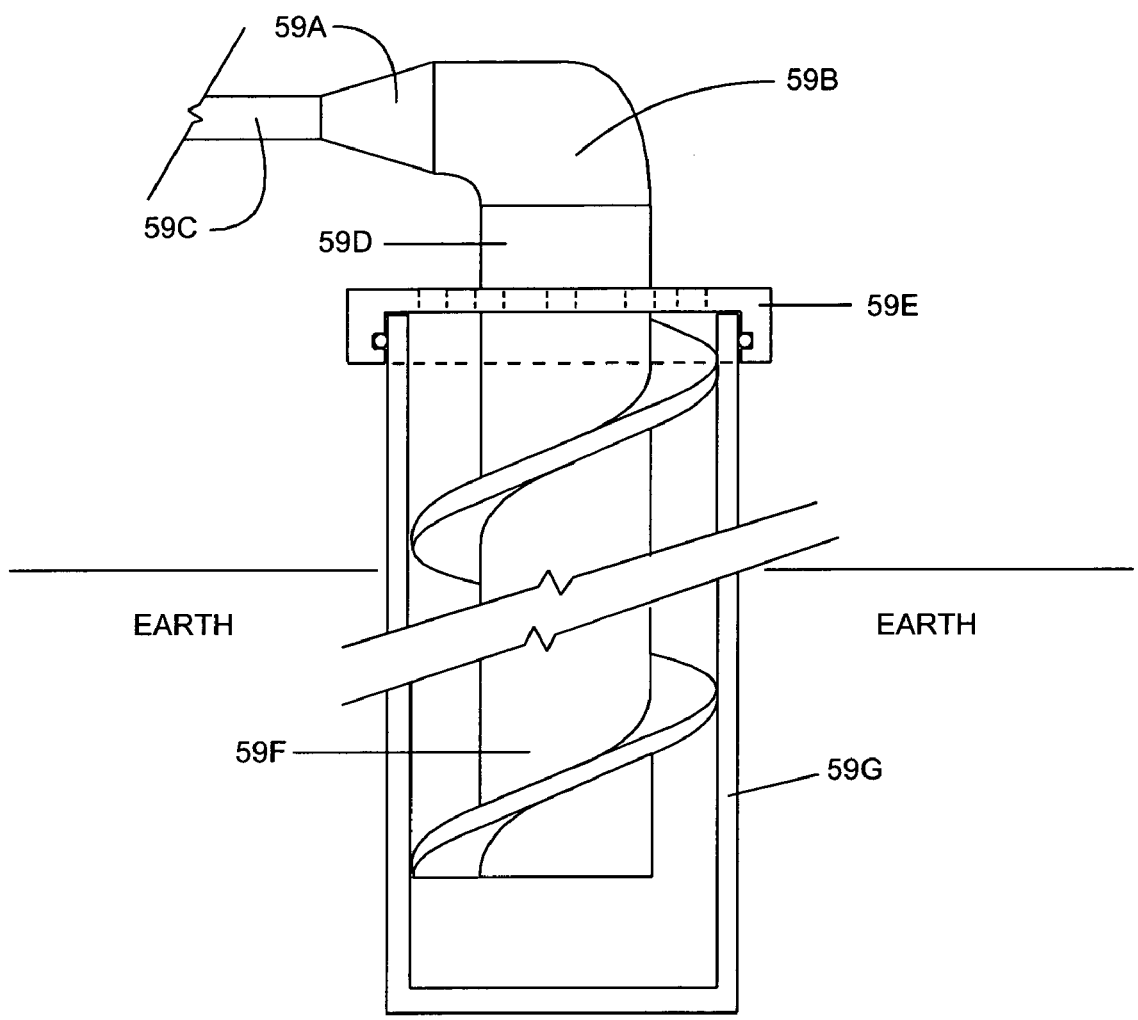
FIG. 59 shows a close up of the well cap and the insulated helical flow tubing employed within the coaxial-flow heat exchanging structure of the present invention, and wherein the drawing shows the transition from internal insulation to external insulation used in the horizontal run between wells or heat pump.

In FIG. 59, the well cap and the insulated helical flow tubing employed within the coaxial-flow heat exchanging structure of the present invention. This figures shows the transition from internal insulation to external insulation used in the horizontal run between wells or heat pump.

Figure 60:
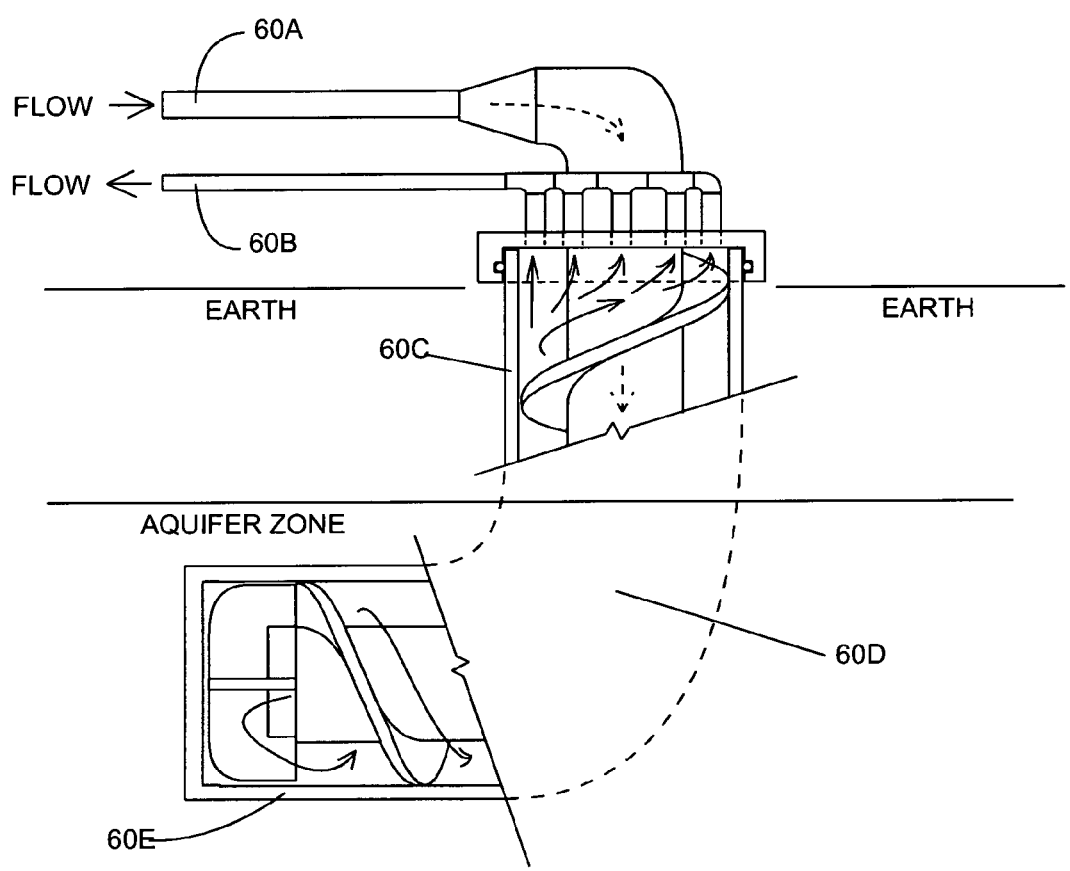
FIG. 60 shows the coaxial-flow heat exchanging structure of the present invention installed in a deviated well bore, wherein the horizontal section of the structure is drilled into an aquifer zone and the vertical section thereof connects the horizontal section back to the surface.

FIG. 60 shows the coaxial-flow heat exchanging structure of the present invention installed in a deviated well bore. The horizontal section of the structure is drilled into an aquifer zone and the vertical section thereof connects the horizontal section back to the surface. This design is used where there is a known water saturated sand, sandstone, or limestone zone with high water permeability or ground water movement to maximize heat transfer rate of each well in the ground loop, the warm water will migrate away from the well bore and create a very slow thermal siphon in the porous formation. This design is used when the ground loop will not be used to store heat from the cooling season to be extracted in the heating season. Using this design, one or two wells can be drilled for retrofitting an office building or a city block of residential houses with ground-loop heat pumps.

Figure 61:
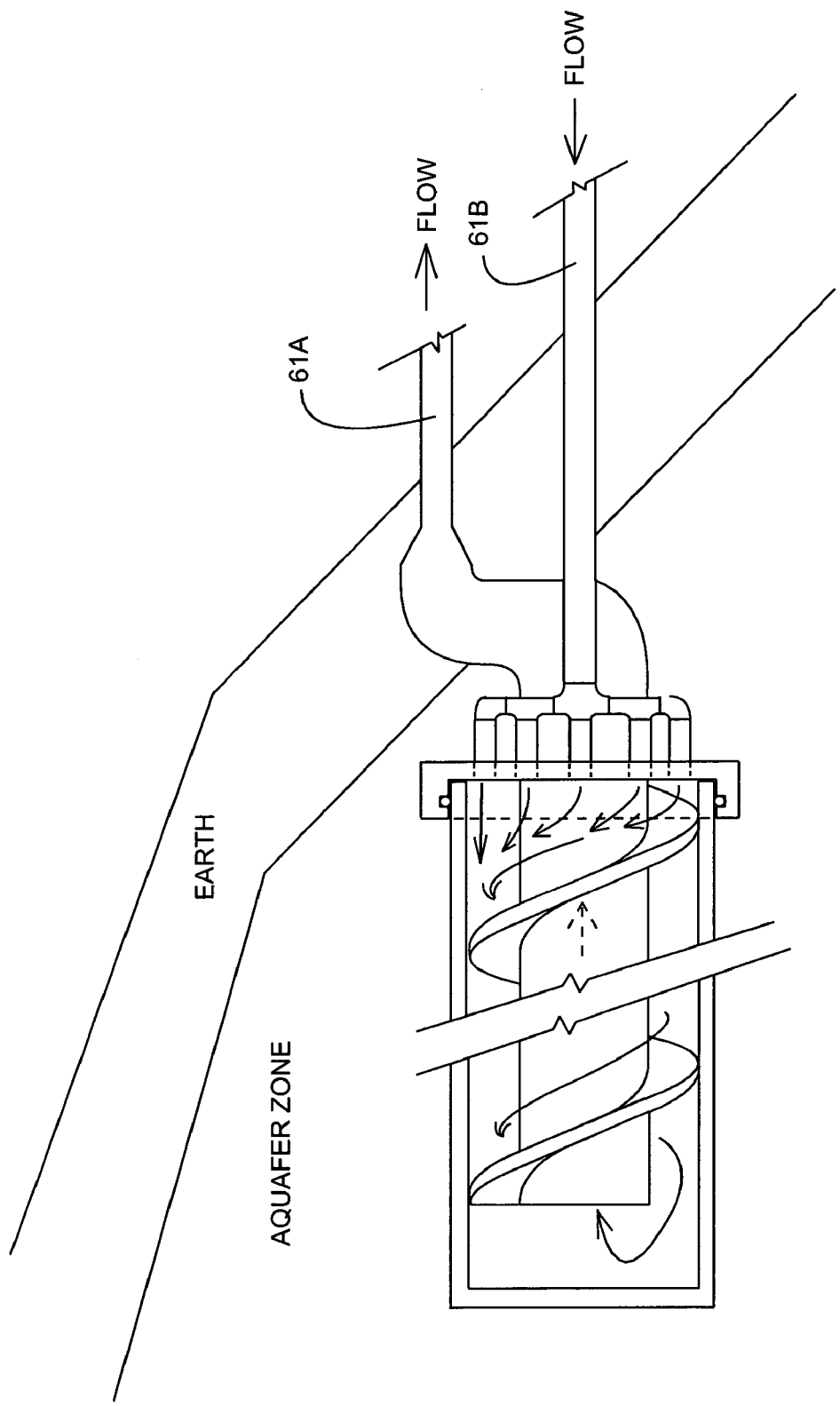
FIG. 61 shows the coaxial-flow heat exchanging structure of the present invention installed in a near horizontally bored well in the side of a mountain, mesa, or hill, wherein the well bore path is deviated to follow an aquifer zone if available at the site, and wherein for buildings with a deep basement or built on the side of a hill, the deviated well bores are drilled in the wall of the basement.

FIG. 61 shows the coaxial-flow heat exchanging structure of the present invention installed in a near horizontally bored well in the side of a mountain, mesa, or hill. In this application, the well bore path is deviated to follow an aquifer zone if available at the site. For buildings with a deep basement or built on the side of a hill, the deviated well bores are drilled in the wall of the basement.

Figure 62:
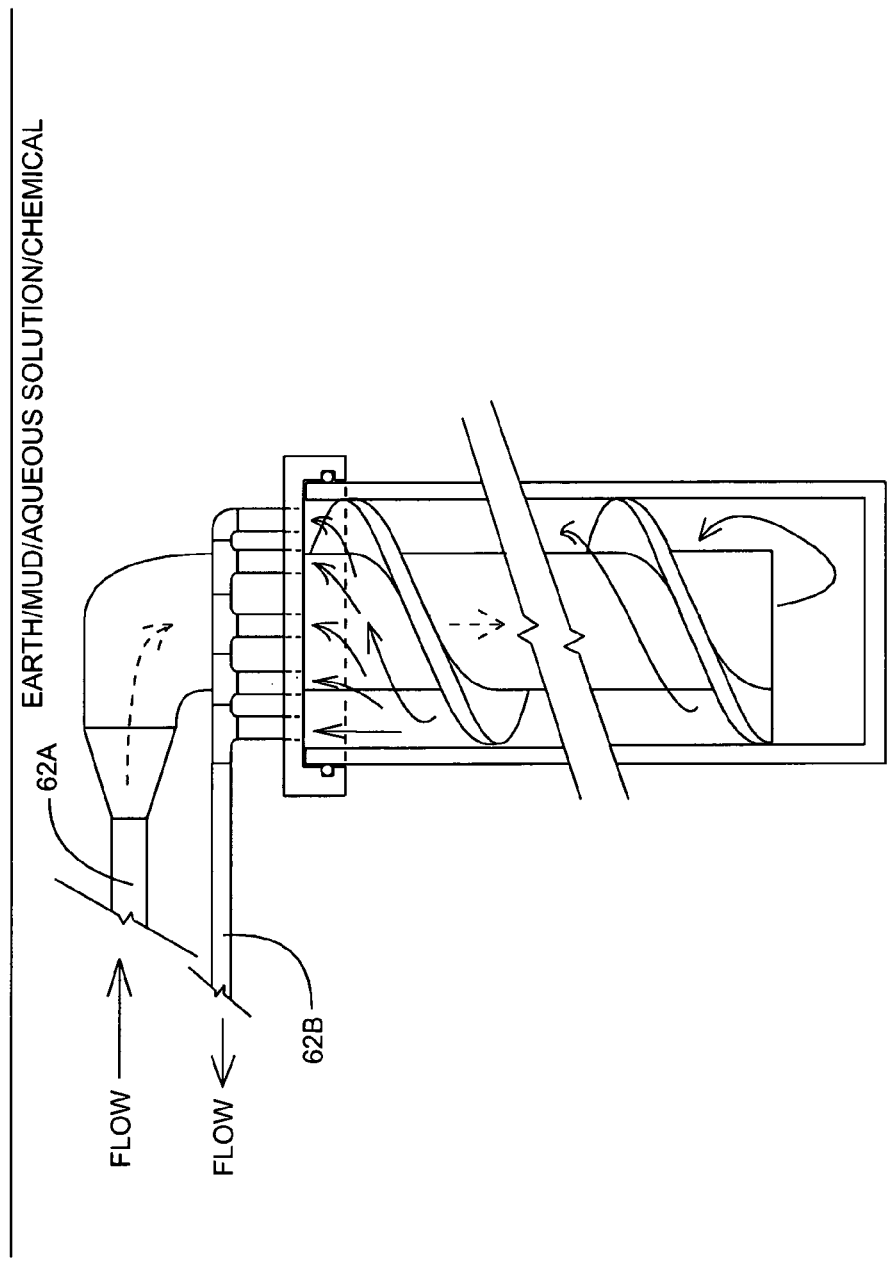
FIG. 62 shows the coaxial-flow heat exchanging structure of the present invention installed in a well bore that is cap below the surface to prevent significant heat transfer to the ground/water surface or atmosphere, and wherein for areas that have significant ice or freeze/thaw movement, the distribution pipes should be protected against damage and, if possible, the well should be capped below the frost line.

FIG. 62 shows the coaxial-flow heat exchanging structure of the present invention installed in a well bore that is cap below the surface to prevent significant heat transfer to the ground/water surface or atmosphere. For areas that have significant ice or freeze/thaw movement, the distribution pipes should be protected against damage and, if possible, the well should be capped below the frost line.

Figure 63:
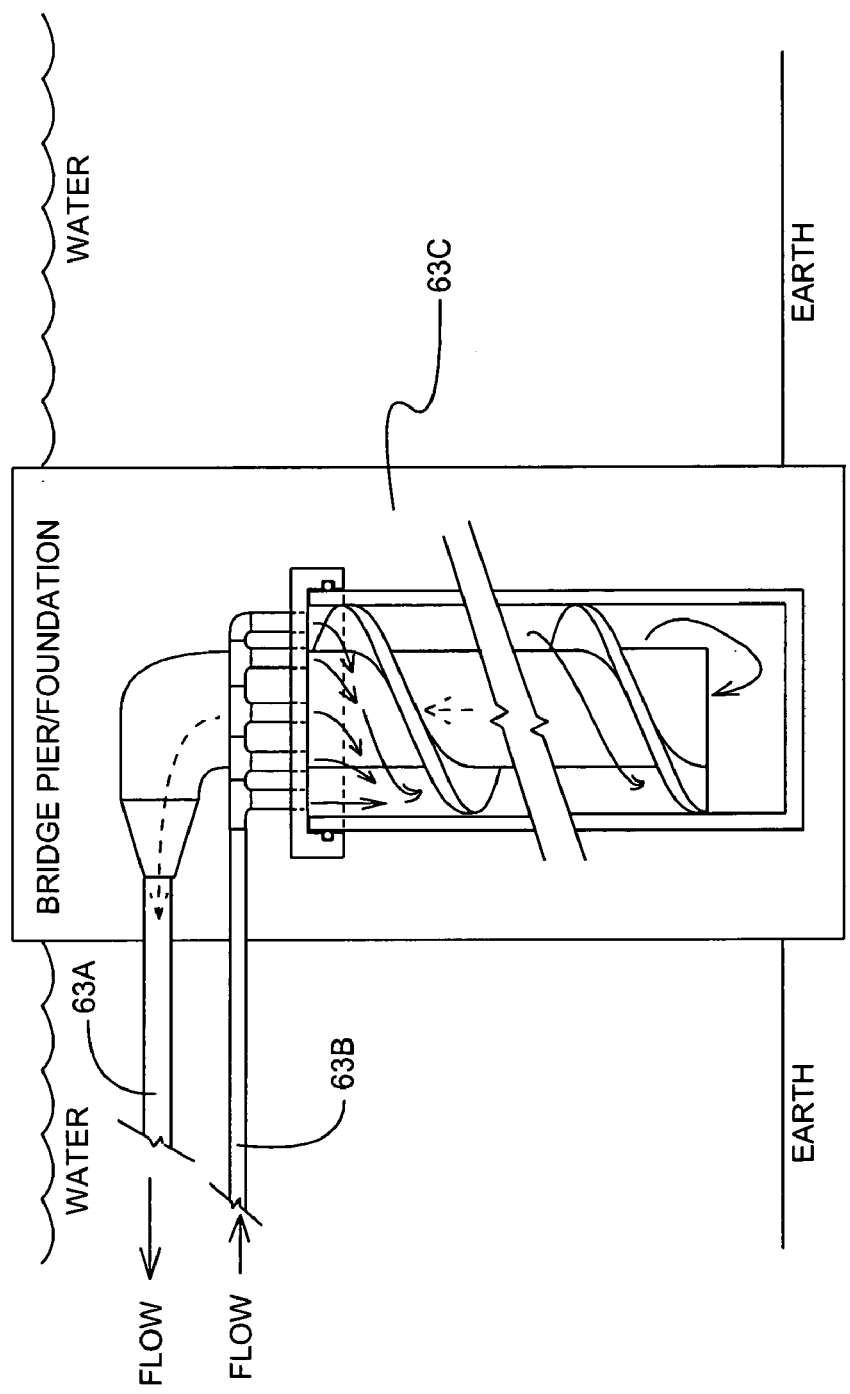
FIGS. 63, 64, and 65 show the coaxial-flow heat exchanging structure of the present invention installed vertically or horizontally in foundations or pilings of a building, bridge, or other structure.
Figure 64:
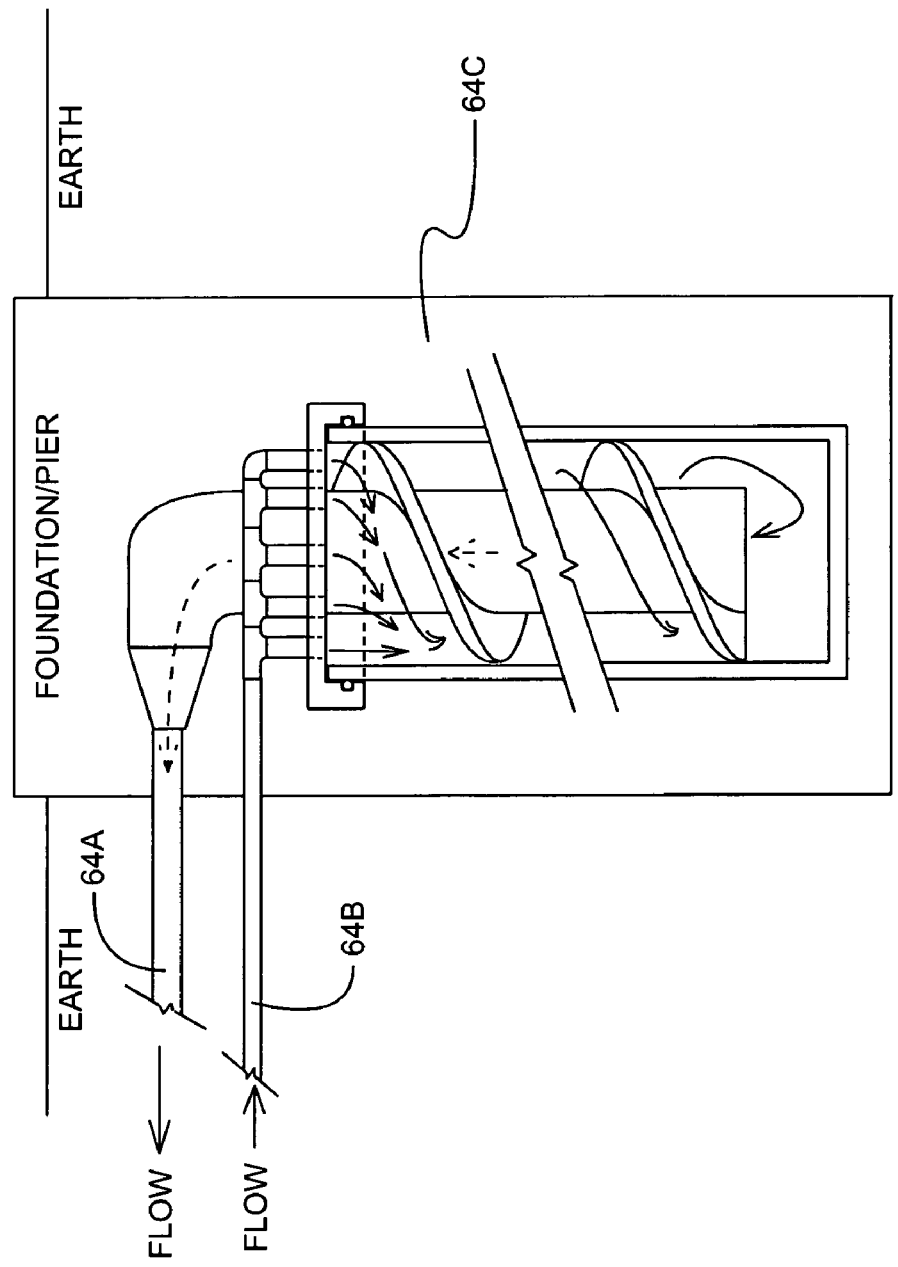
Figure 65:
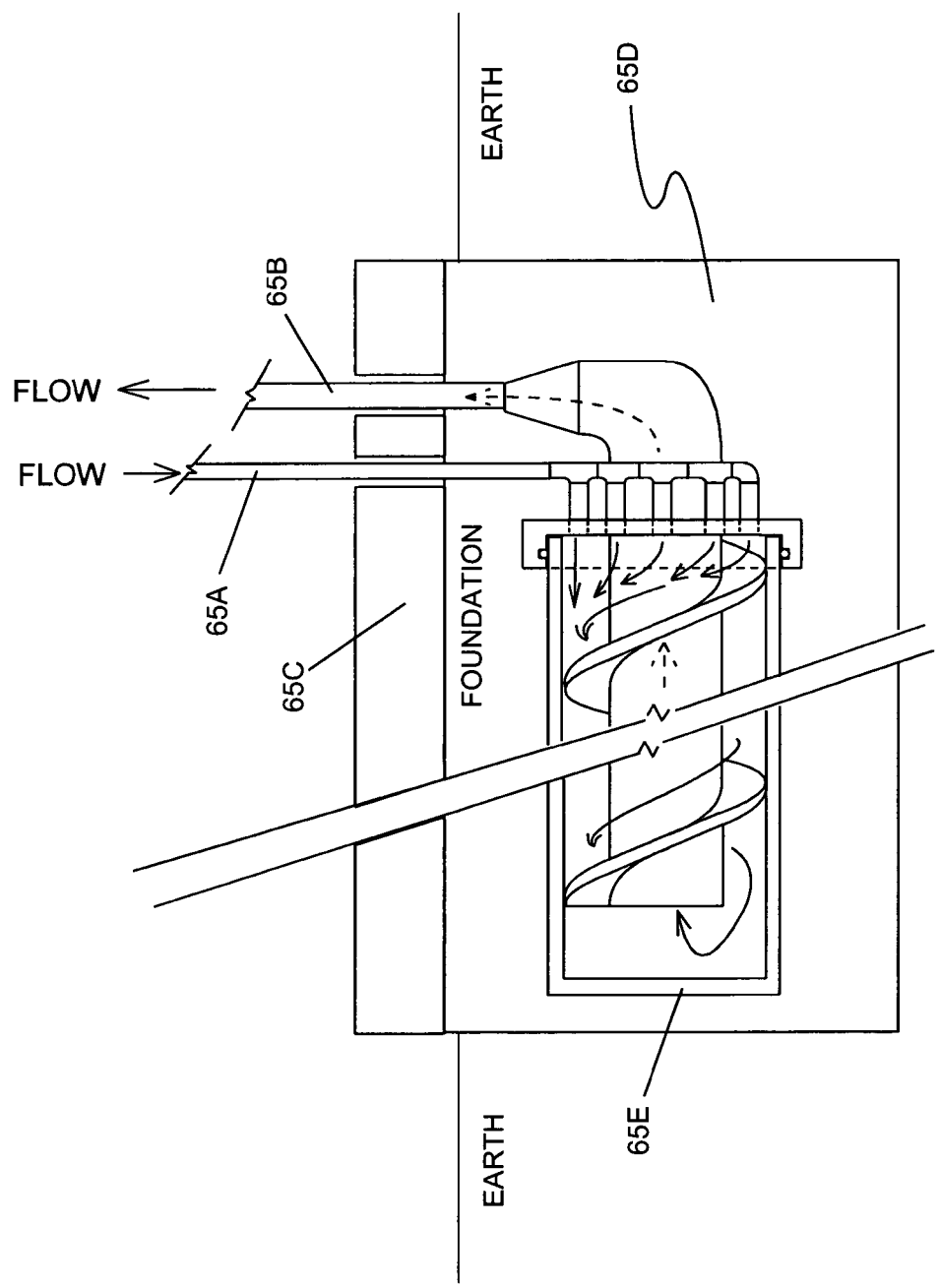

FIGS. 63, 64, and 65 show the coaxial-flow heat exchanging structure of the present invention installed vertically or horizontally in foundations or pilings of a building, bridge, or other structure, wherein the heat exchanger can take advantage of the metal rebar used in the concrete to increase the effective surface area of the outer tube. By installing the ground-loop heat exchanger in the ground or water below the structure, the cement/concrete sheath can perform two functions: structural support and heat transfer to the water or ground. If the heating load is small enough and the temperature difference large enough, then heat exchanger can be used in the thermo-siphon mode using the density difference between cold and warm aqueous solution, otherwise a heat-pump is used to increase the heat transfer rate, and as the piling spacing is very close in building foundations, the whole volume of ground contained between the pilings can be converted to a thermal bank for peak loads or even to store heat from the cooling season to be used in the heating season. Also, if the top of basement foundation is isolated with insulation, then cement structure and some surrounding ground can be converted into a thermal bank for peak load averaging during winter heating and summer cooling.

Figure 66:
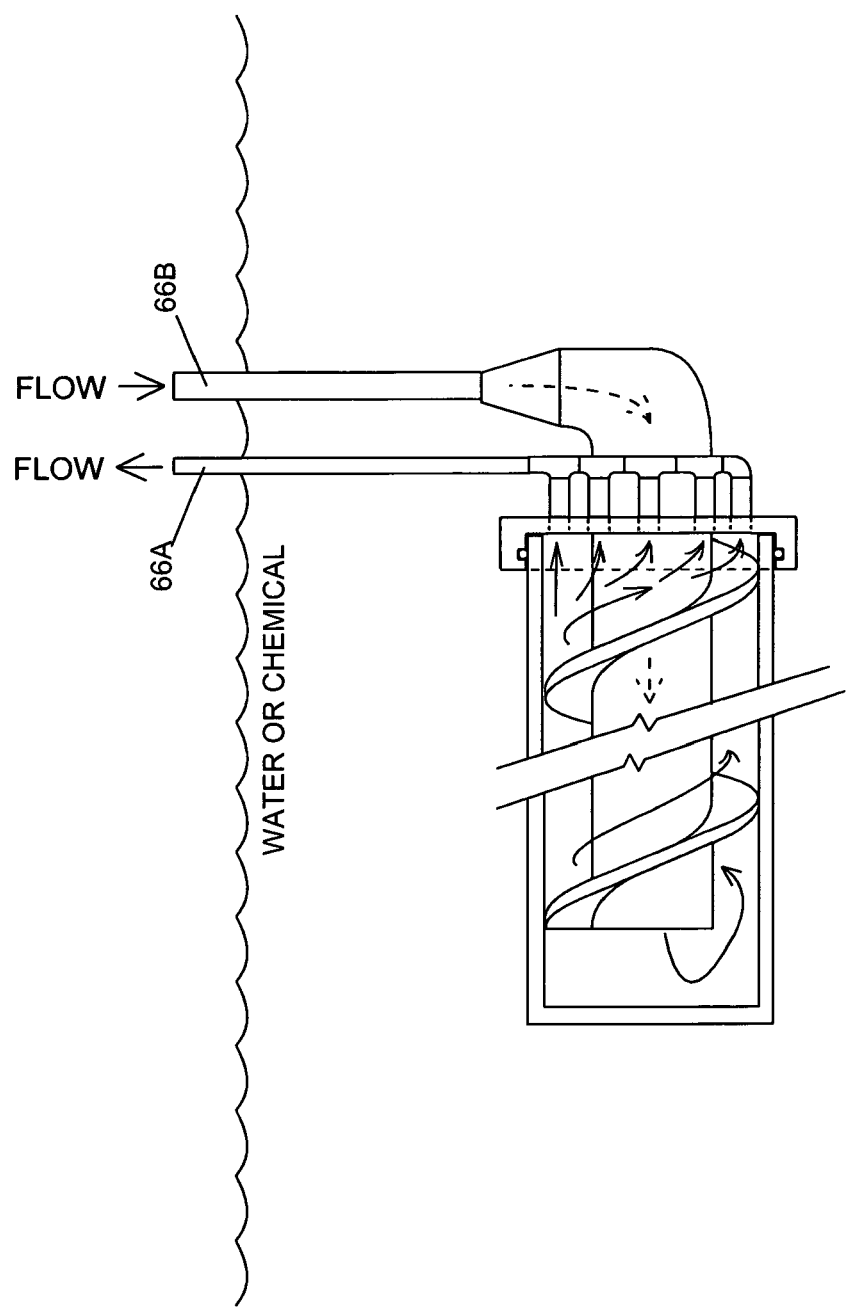
FIGS. 66, 67 and 68 show the coaxial-flow heat exchanging structure of the present invention suspended in an aqueous solution or mud, wherein the vertical metal fins are used to increase the heat transfer area of the thermally-conductive flowguide tube by making an external thermosiphon for aqueous solution circulation.
Figure 67:
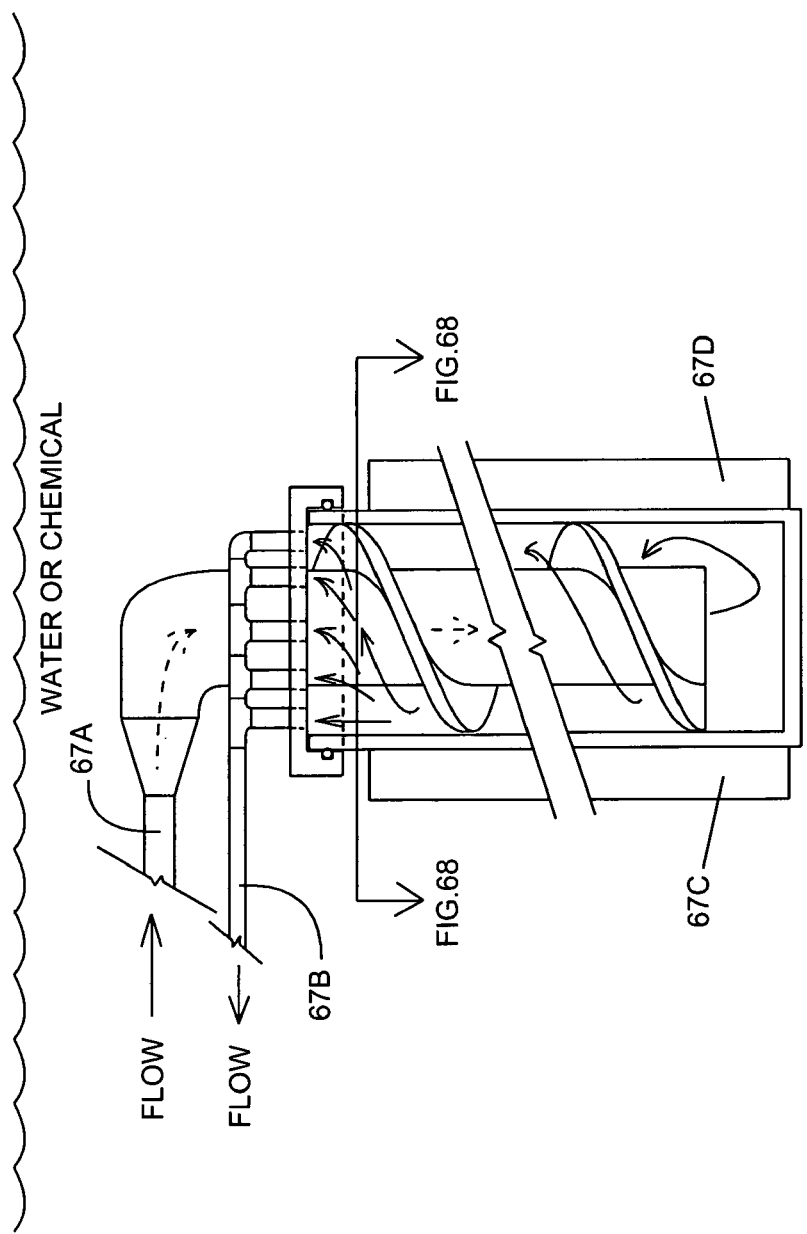
Figure 68:
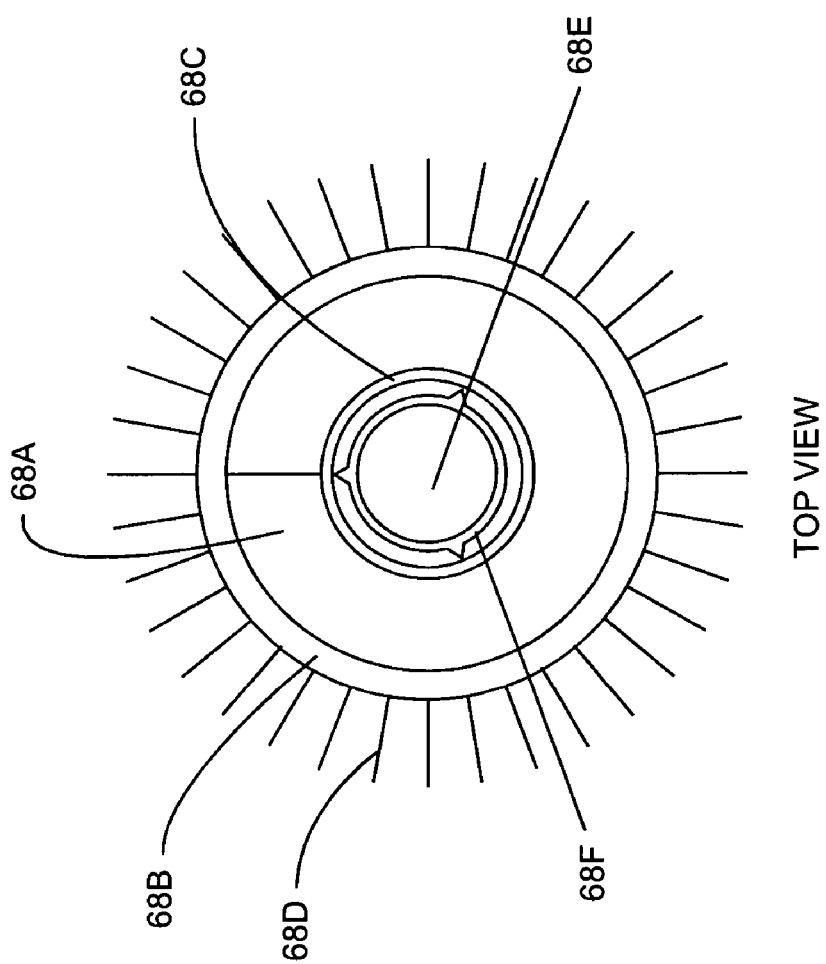

FIGS. 66, 67 and 68 show the coaxial-flow heat exchanging structure of the present invention suspended in an aqueous solution or mud. In these applications, the vertical metal fins are used to increase the heat transfer area of the thermally-conductive flowguide tube by making an external thermo-siphon for aqueous solution circulation. The fin width to thickness aspect ratio should be less than 10 to 1 to optimize the use of metal and heat transfer to the aqueous solution or mud. For installations in bodies of water, the fins are coated for anode operation to prevent bio-film growth and scaling, which reduces the heat transfer to the aqueous solution.

Figure 69:
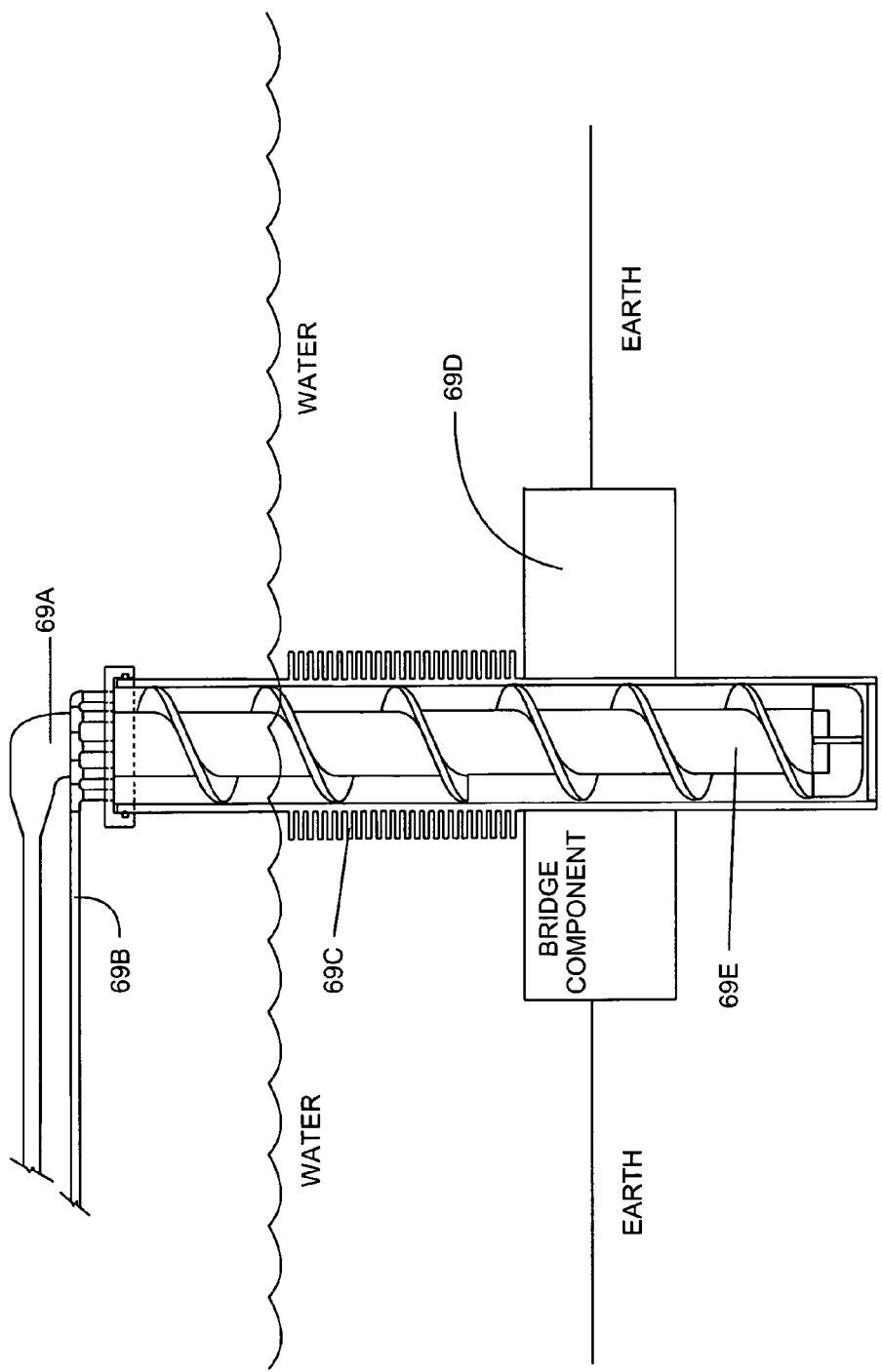
FIG. 69 shows the coaxial-flow heat exchanging structure of the present invention installed in a bridge component or piling, wherein in earthquake areas, the pilings are wrapped in a metal sheath to prevent structural damage in the earthquake, and the sheath could be installed with spiral-like flow channels to provide ground/water source heat to prevent icing of the road way or sidewalks during the winter.

FIG. 69 shows the coaxial-flow heat exchanging structure of the present invention installed in a bridge component or piling. In earthquake areas, the pilings are wrapped in a metal sheath to prevent structural damage in the earthquake, and the sheath could be installed with spiral-like flow channels to provide ground/water source heat to prevent icing of the road way or sidewalks during the winter.

Figure 70:
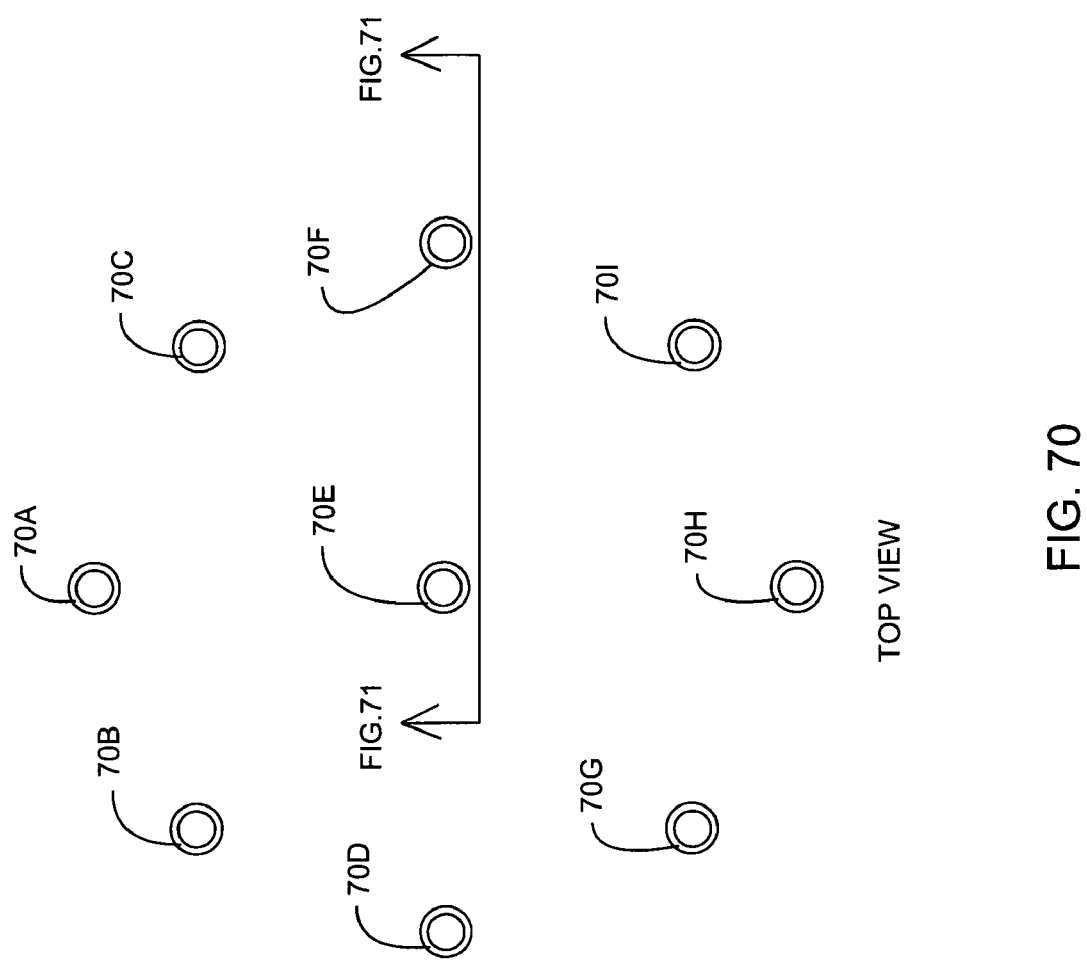
FIGS. 70 and 71 show the application of pad drilling of nine deviated wells to minimize the ground surface impact while maximizing the volume of ground contacted by the well bores, wherein long term operation allows the ground loop to thermal bank heat from the cooling season for use in the winter season, for cooling loads only, a shallow horizontal loop can be added to the ground-loop to remove heat from the thermal bank during the winter season, in the limit of deviated well drilling, a horizontal well as shown in FIG. 60 could replace the pad of nine deviated wells, the pad drilling also has the advantage of reduced heat loss from horizontal gathering piping and reduced risk of accidental damage from contractor digging operations.
Figure 71:
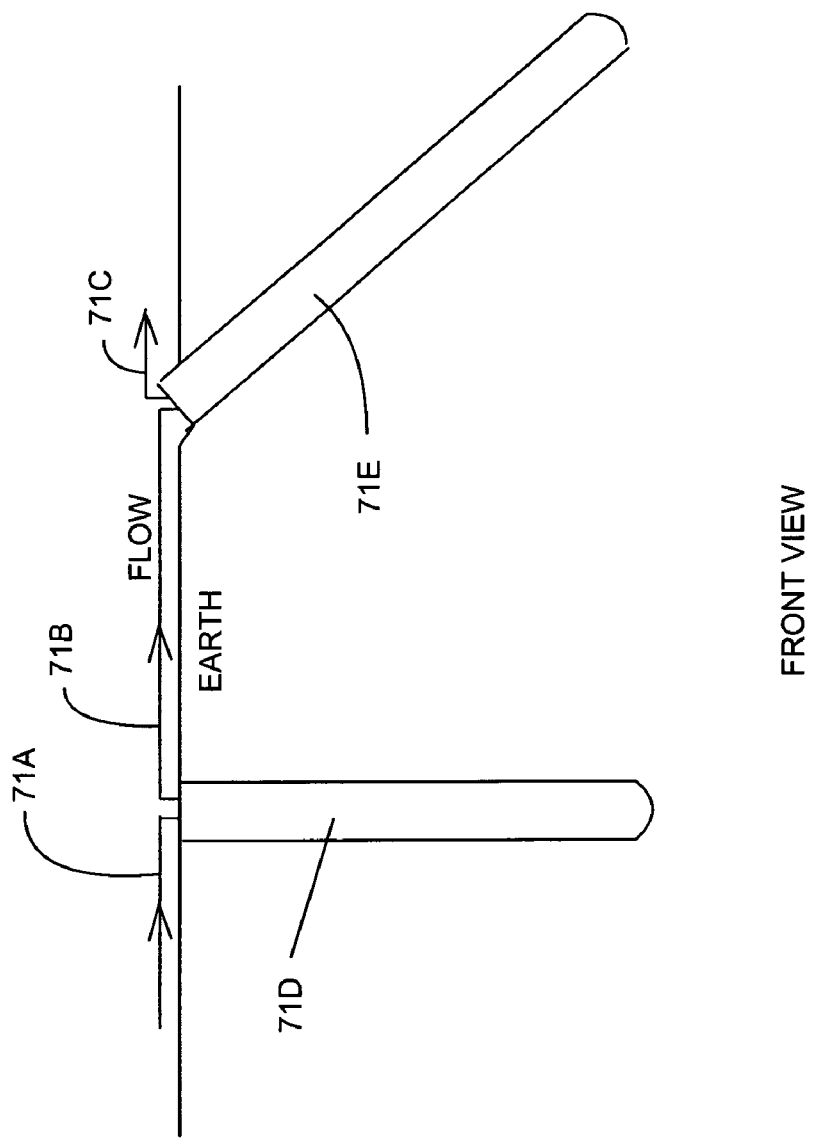

FIGS. 70 and 71 show the application of pad drilling of nine deviated wells to minimize the ground surface impact while maximizing the volume of ground contacted by the well bore. In such applications, long term operation allows the ground loop to thermal bank heat from the cooling season for use in the winter season. For cooling loads only, a shallow horizontal loop can be added to the ground-loop to remove heat from the thermal bank during the winter season, in the limit of deviated well drilling, a horizontal well as shown in FIG. 60 could replace the pad of nine deviated wells. The pad drilling also has the advantage of reduced heat loss from horizontal gathering piping and reduced risk of accidental damage from contractor digging operations.

Figure 72:
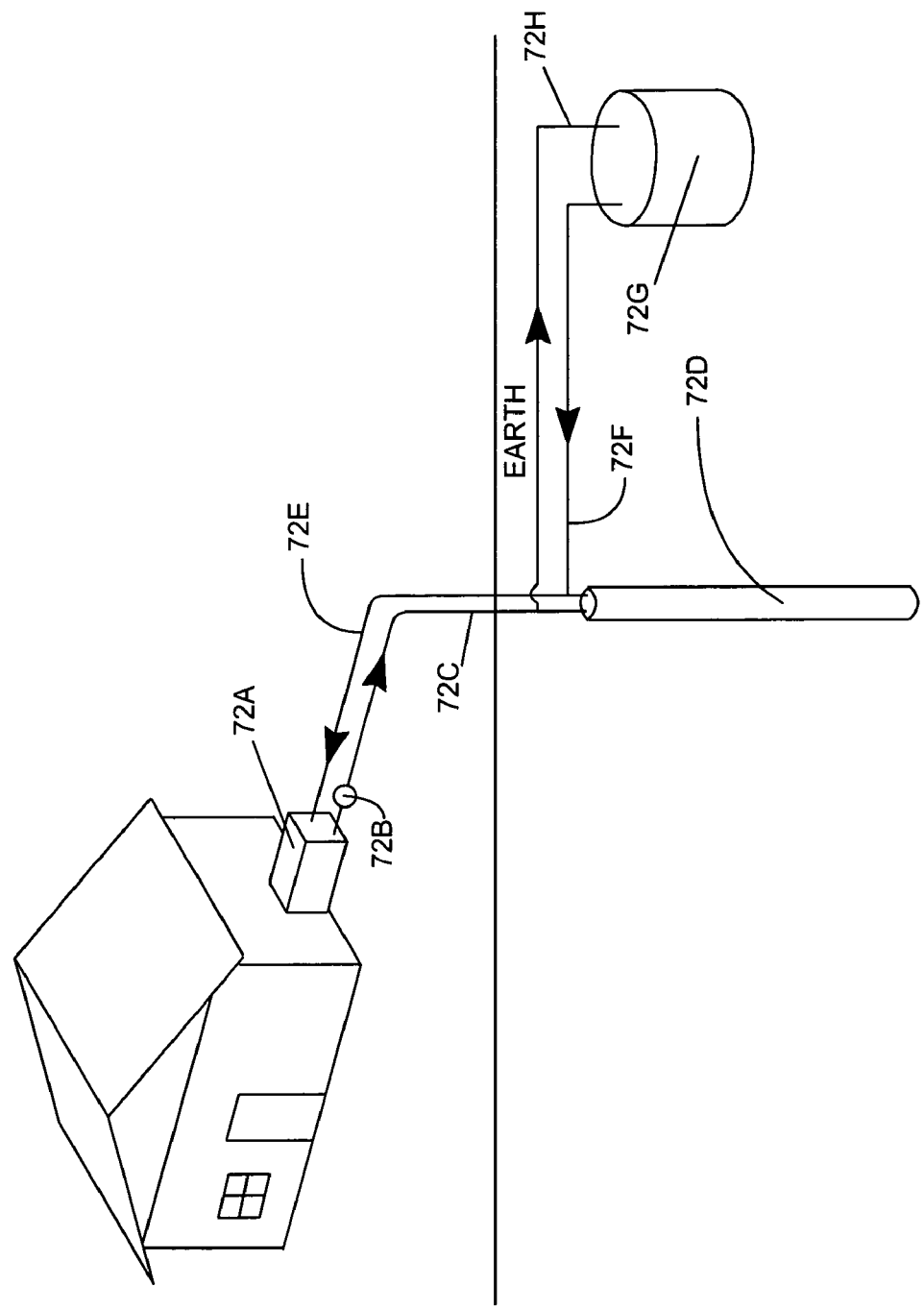
FIGS. 72 and 73 show the application of a single well heat exchanger for a residential home and multiple pad drilled heat exchangers for larger commercial heat and cooling loads, wherein an optional thermal bank tank is provided for night time operation when the electrical energy cost are cheaper or for day time operation when solar cells can provide electrical energy.
Figure 73:
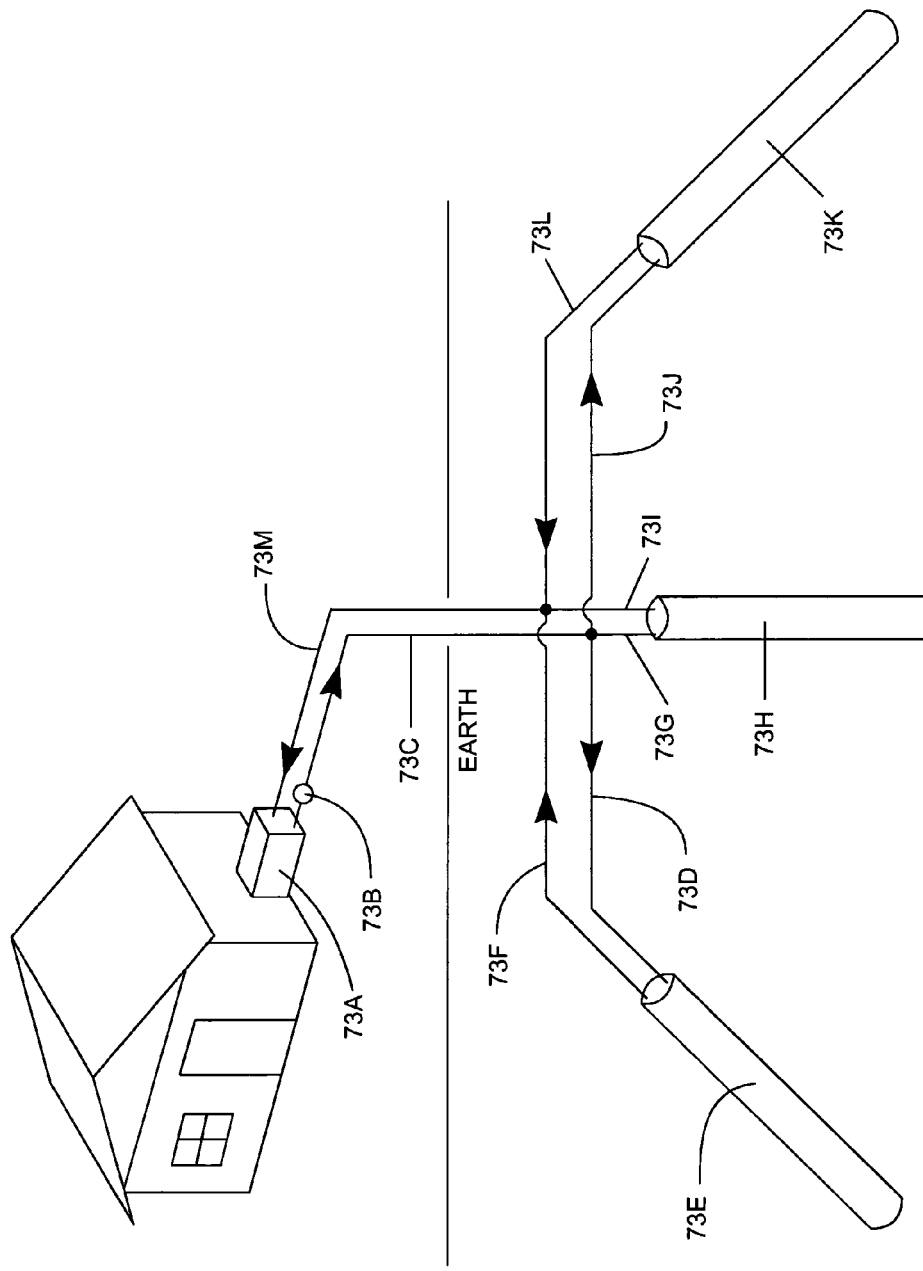

FIGS. 72 and 73 show the application of a single well heat exchanger for a residential home and multiple pad drilled heat exchangers for larger commercial heat and cooling loads. In this application, an optional thermal bank tank is provided for nighttime operation when the electrical energy cost are cheaper or for day time operation when solar cells can provide electrical energy. For remote cooling operations, e.g. for equipment used in cell phone towers, the ground loop can provide a uniform operational temperature, wherein for rest area restrooms, solar cells with battery back up can power the heat pump to prevent freezing of the plumbing and provide guest comfort. Also, a long horizontal well drilled in an aquifer can replace a pad of deviated wells.

Figure 74:
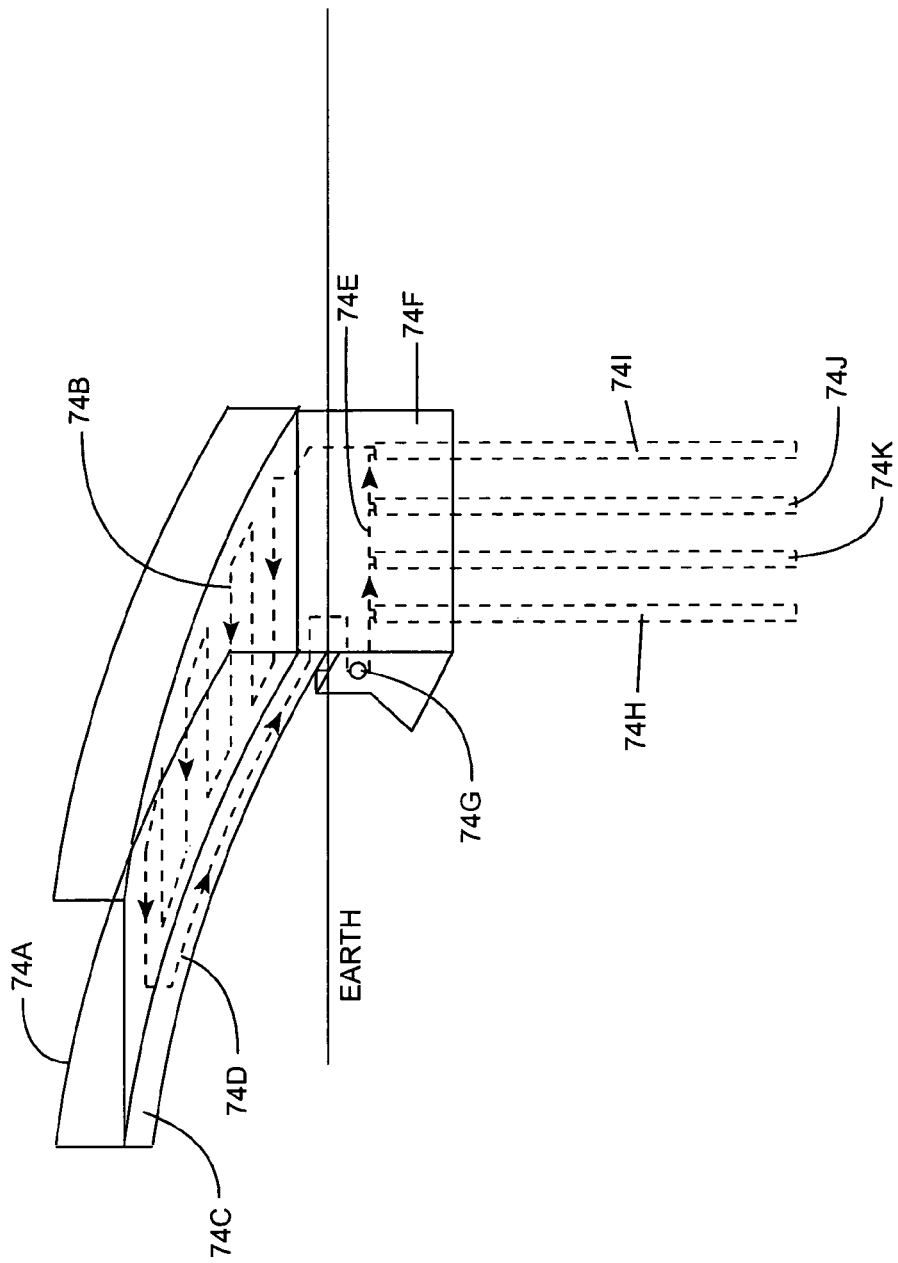
FIGS. 74 and 75 show the installation of small and large coaxial-flow heat exchanging structures of the present invention in ground to prevent icing or snow accumulation on side walks, bridges and heavily traveled intersections or steeply pitched roads.
Figure 75:
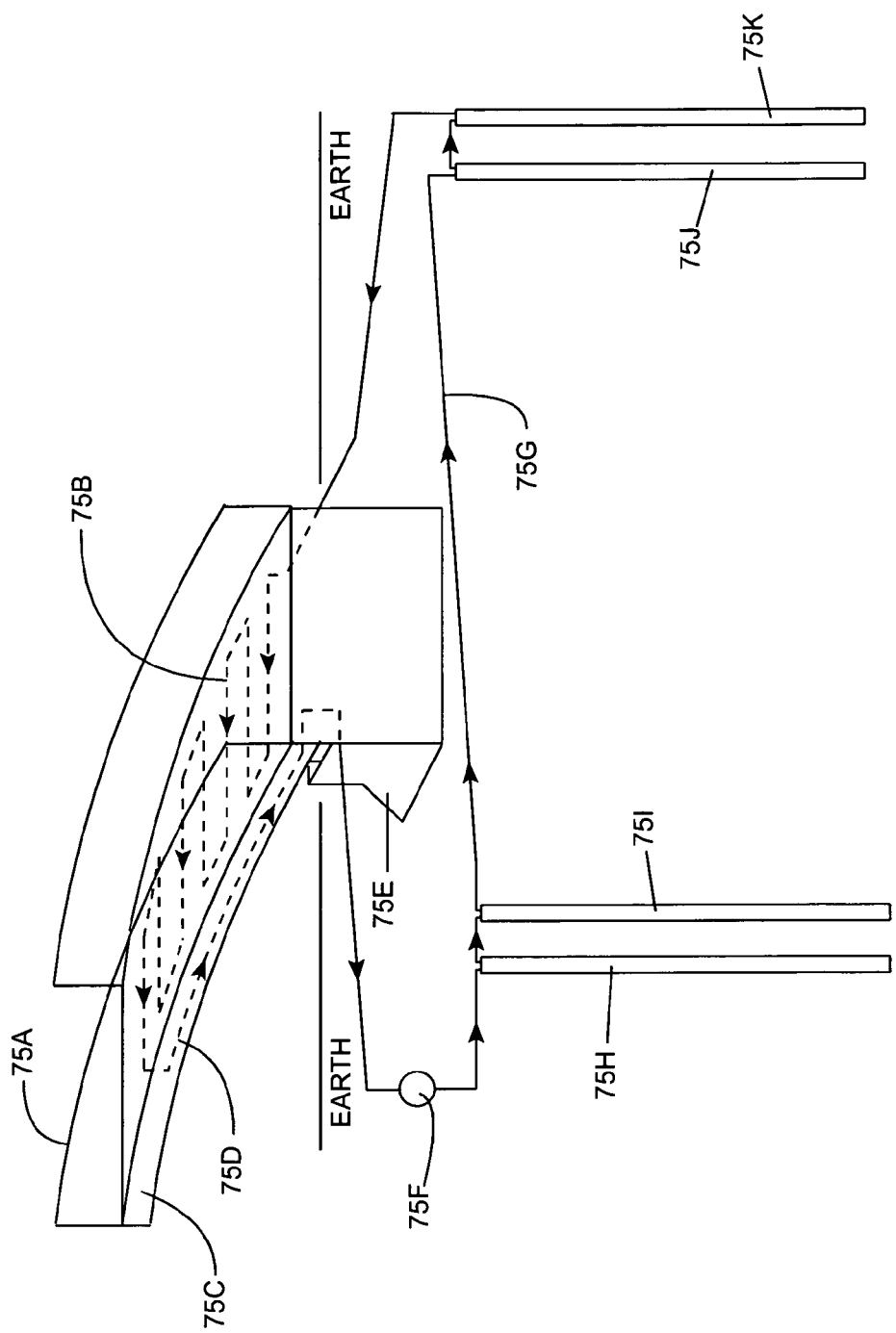

FIGS. 74 and 75 show the installation of small and large coaxial-flow heat exchanging structures of the present invention in ground to prevent icing or snow accumulation on side walks, bridges and heavily traveled intersections or steeply pitched roads. In such applications, the ground heat can keep the road surface from icing up and increase the evaporation rate of moisture on the road. Spring and summer operations can thermally bank (i.e. store) heat for intermittent winter surface de-icing, and to reduce energy cost, the highway department can remote operate the heat pump hours before the bad weather conditions move in the area and prevent the road conditions from becoming bad.

Figure 76:
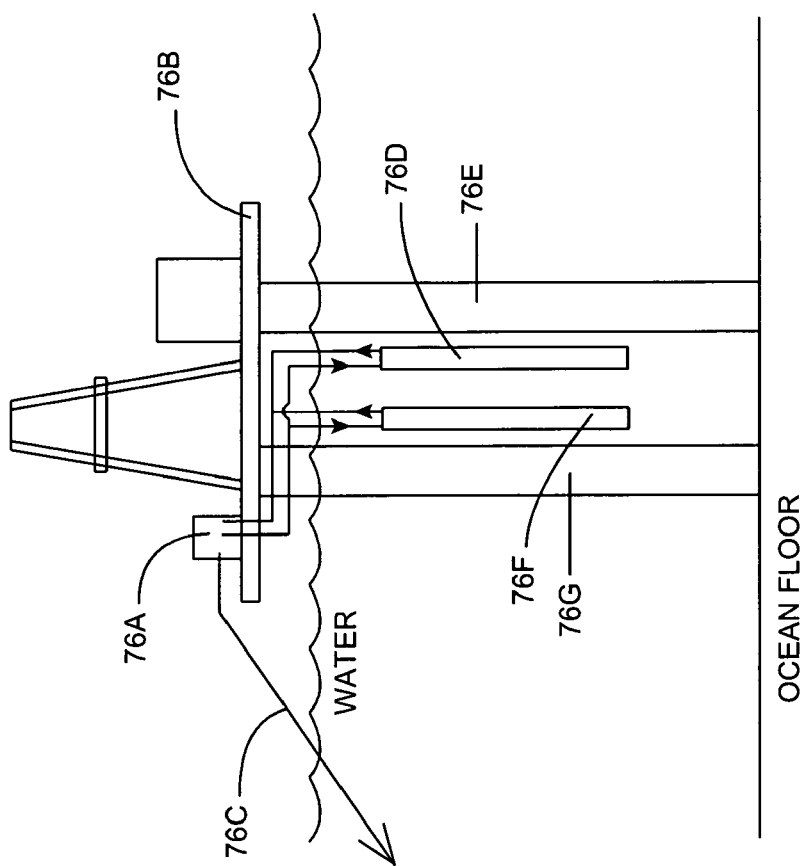
FIGS. 76 and 77 show applications using sea water or ballast water as the heat-pump heat sink for gas dehydration and oil de-waxing, wherein axial-flow heat exchanging structure of the present invention installed in is used to extract heat from the gas to cause the temperature to drop which then condenses water vapor and/or light hydrocarbon vapors.
Figure 77:
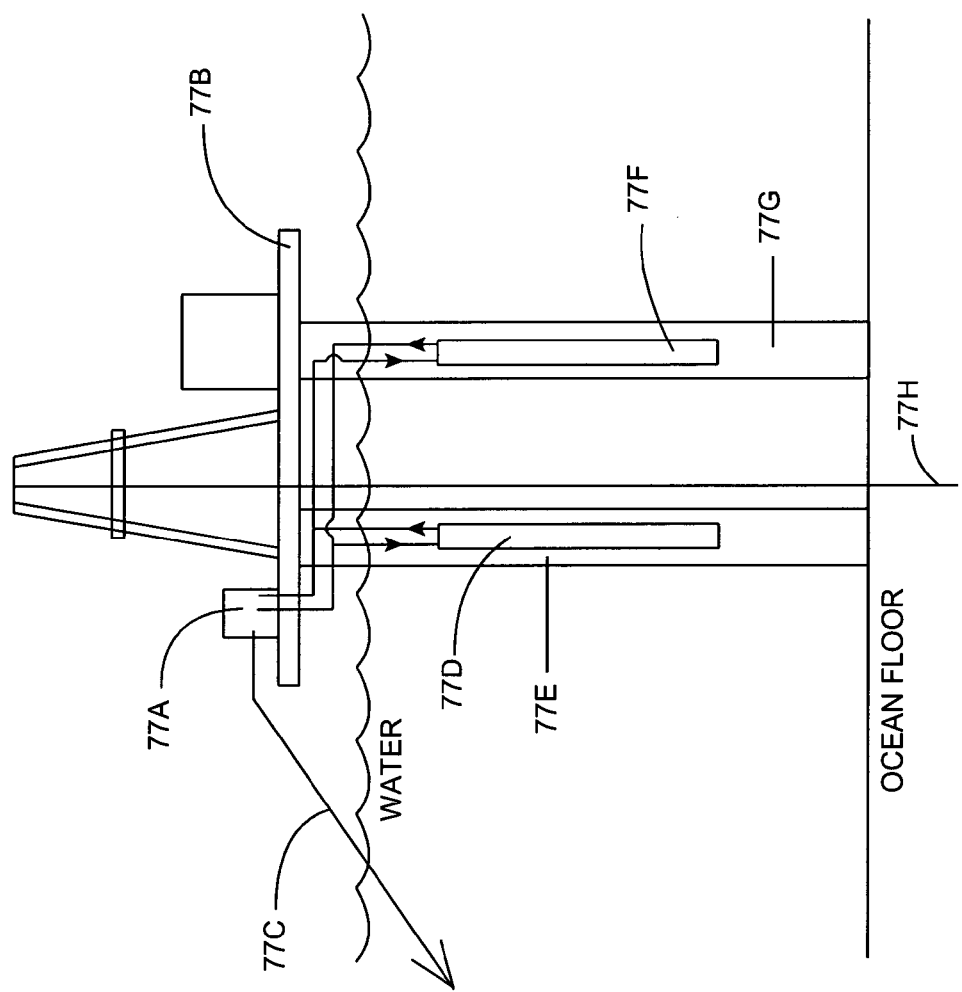

FIGS. 76 and 77 show applications using seawater or ballast water as the heat-pump heat sink for gas dehydration and oil de-waxing. In such applications, the coaxial-flow heat exchanging structure of the present invention can be used to extract heat from the gas to cause the temperature to drop which then condenses water vapor and/or light hydrocarbon vapors. The coaxial-flow heat exchanging structure can also be used to extract heat from oil with a cold finger to cause the wax to build up on the cold finger instead of on the pipeline wall transporting the oil to shore or the heat pump can be used to heat the oil to prevent or clean the wax buildup on the pipeline wall. The helical flow tubing can be submerged in the open seawater or submerged in the ballast water in the structure, wherein for open sea water, the exterior of the helical flow tubing is coated for anode operation to prevent bio-film growth on the heat exchanger. Using a closed loop heat exchanger with the seawater in locations teaming with sea life, greatly reduces the maintenance cost of the other heat exchangers especially, the heat exchanger used on the power plant.

Figure 78:
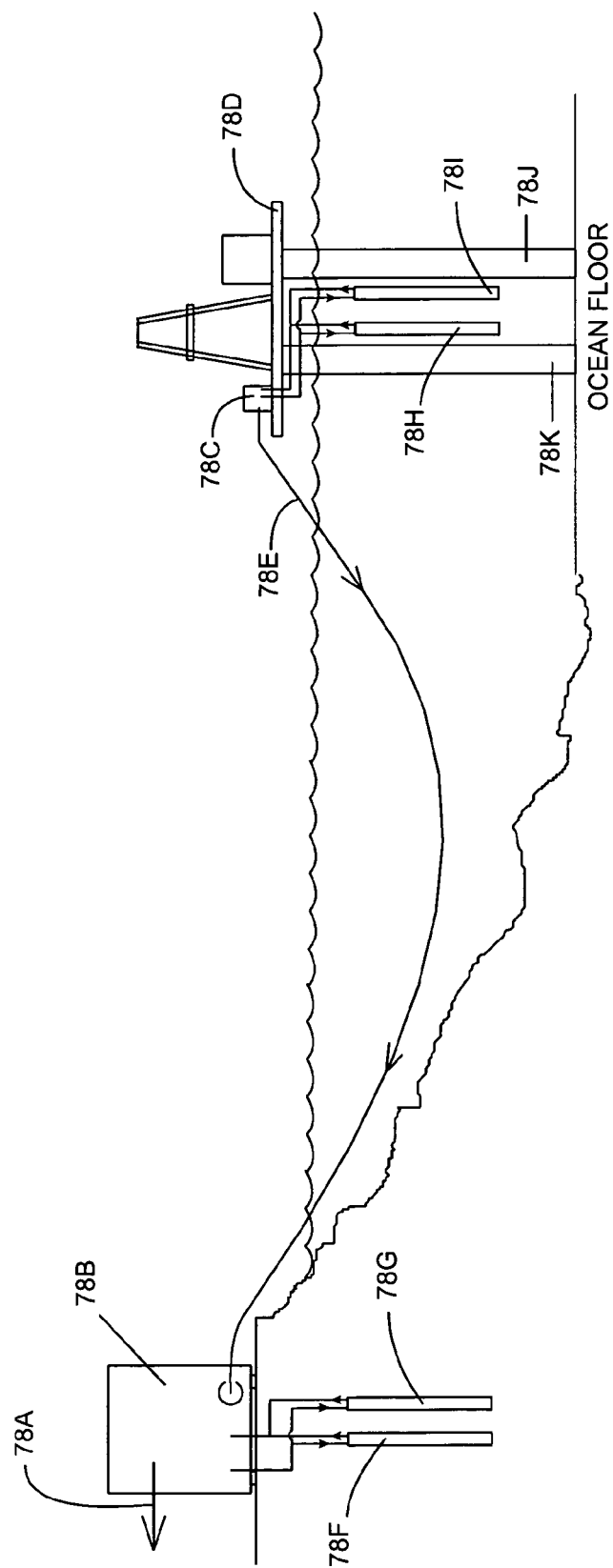
FIG. 78 shows the application of the coaxial-flow heat exchanging structure of the present invention in a ground-loop heat exchanging system used for pipeline quality gas dehydration on shore for gas produced from remote off shore wells.

FIG. 78 shows the application of the coaxial-flow heat exchanging structure of the present invention in a ground-loop heat exchanging system used for pipeline quality gas dehydration on shore for gas produced from remote off shore wells.

Figure 79:
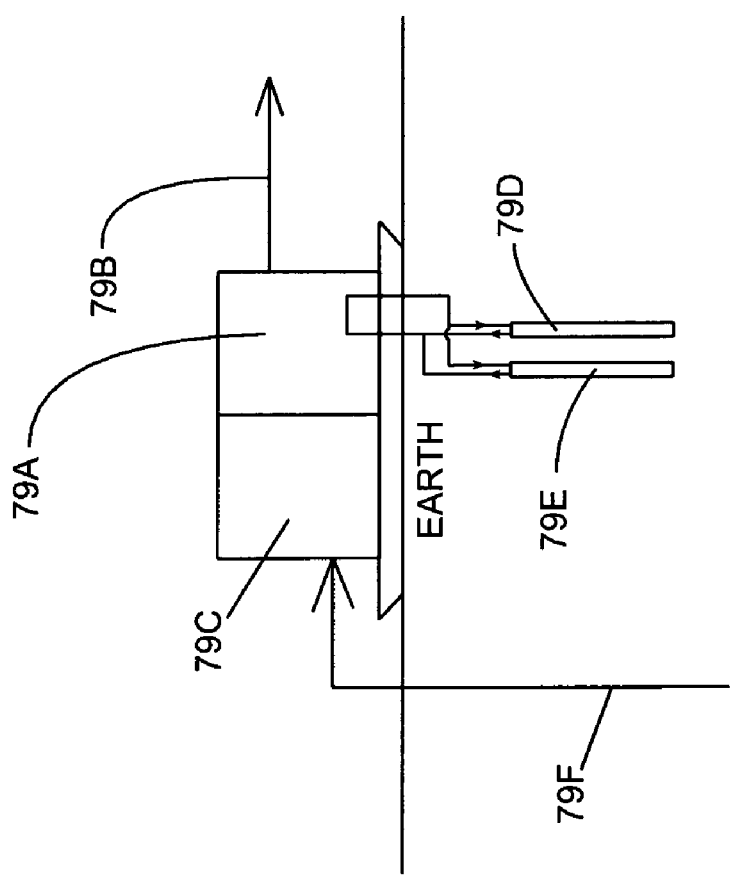
FIGS. 79, 80 and 81 show the coaxial-flow heat exchanging structure of the present invention installed in a ground-loop heat exchanger used for gas dehydration and condensate separation on land for a single well or a gathering system, wherein as shown in FIG. 80, the gas in the liquid separator is cooled to a temperature near the aquifer temperature, and then gas is cooled with a heat pump to a temperature near the gas hydrate temperature using a rotating heat exchanger, wherein the glycol cycle or calcium chloride salt cycle is used to remove moisture from the gas-hydrate temperature to the −30 F dew point for pipeline sales, and wherein the system reduces energy cost of gas dehydration and eliminates the release of benzene, toluene and other carcinogenetic hydrocarbon vapors to the atmosphere.
Figure 80:
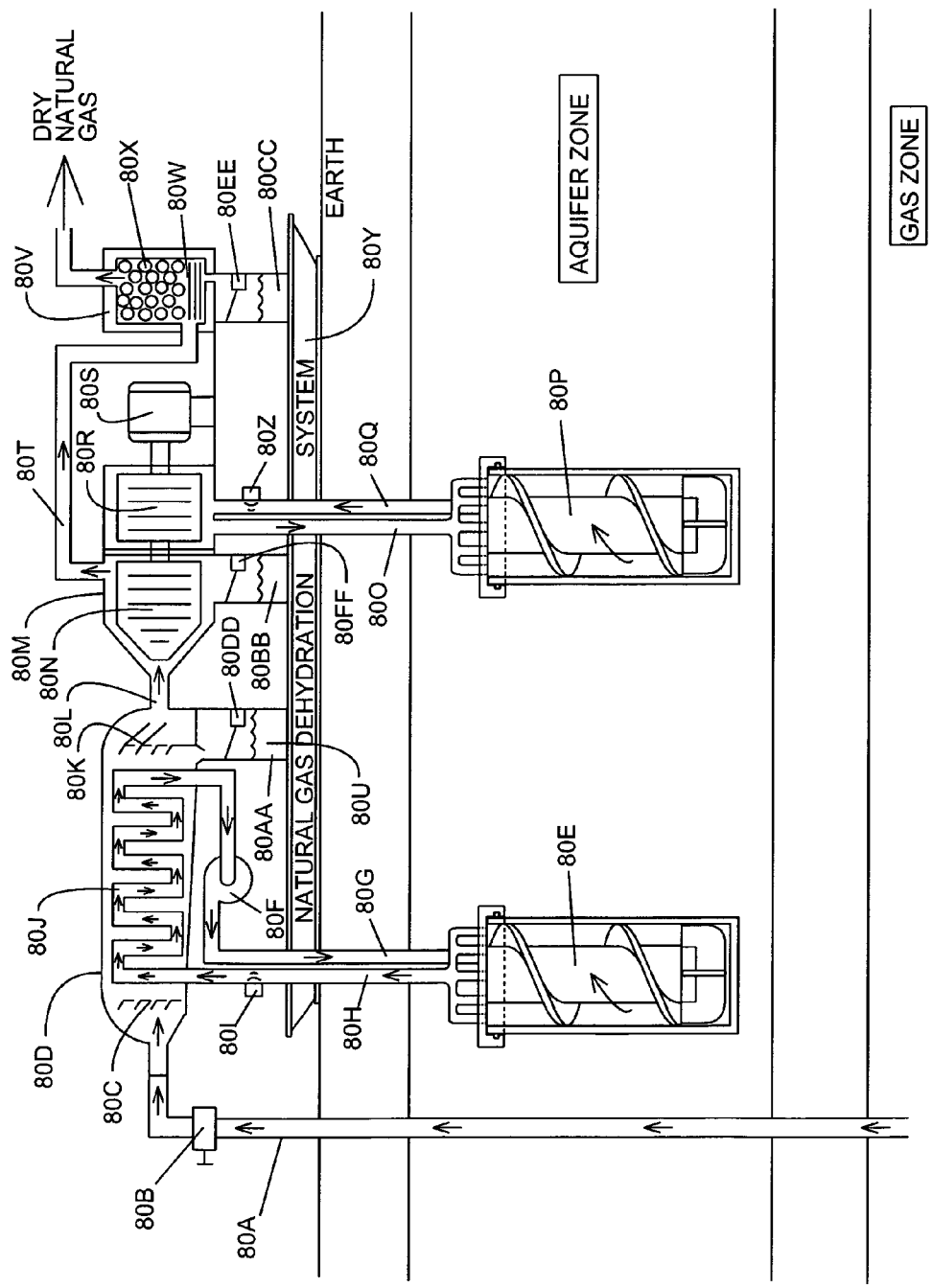
Figure 81:
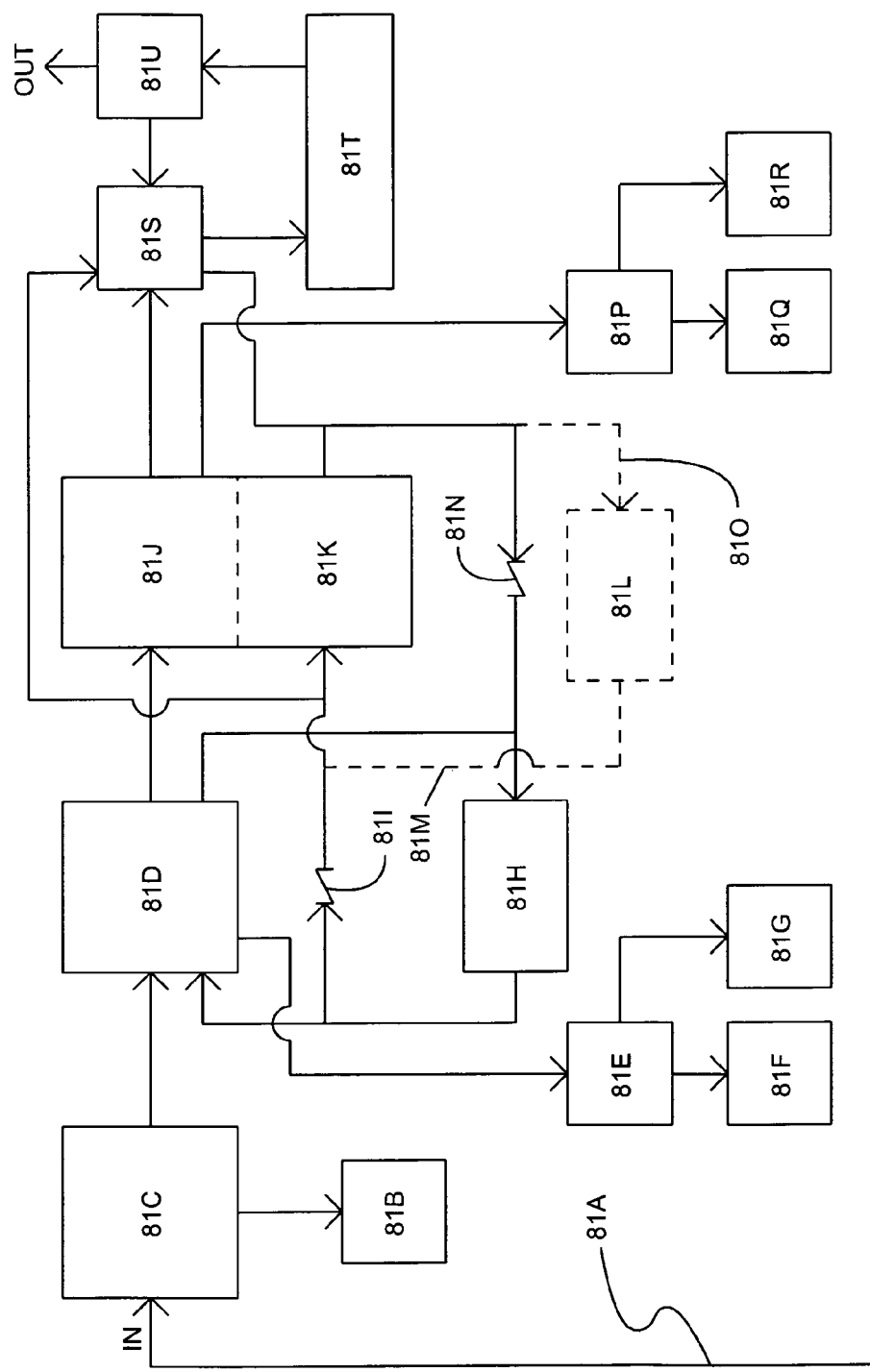

FIGS. 79, 80 and 81 show the coaxial-flow heat exchanging structure of the present invention installed in a ground-loop heat exchanger used for gas dehydration and condensate separation on land for a single well or a gathering system. As shown in FIG. 80, the gas in the liquid separator is cooled to a temperature near the aquifer temperature, and then gas is cooled with a heat pump to a temperature near the gas hydrate temperature using a rotating heat exchanger. The glycol cycle or calcium chloride salt cycle is used to remove moisture from the gas-hydrate temperature to the −30 F dew point for pipeline sales. The system can reduce energy cost of gas dehydration and eliminate the release of benzene, toluene and other carcinogenetic hydrocarbon vapors to the atmosphere.

Figure 82:
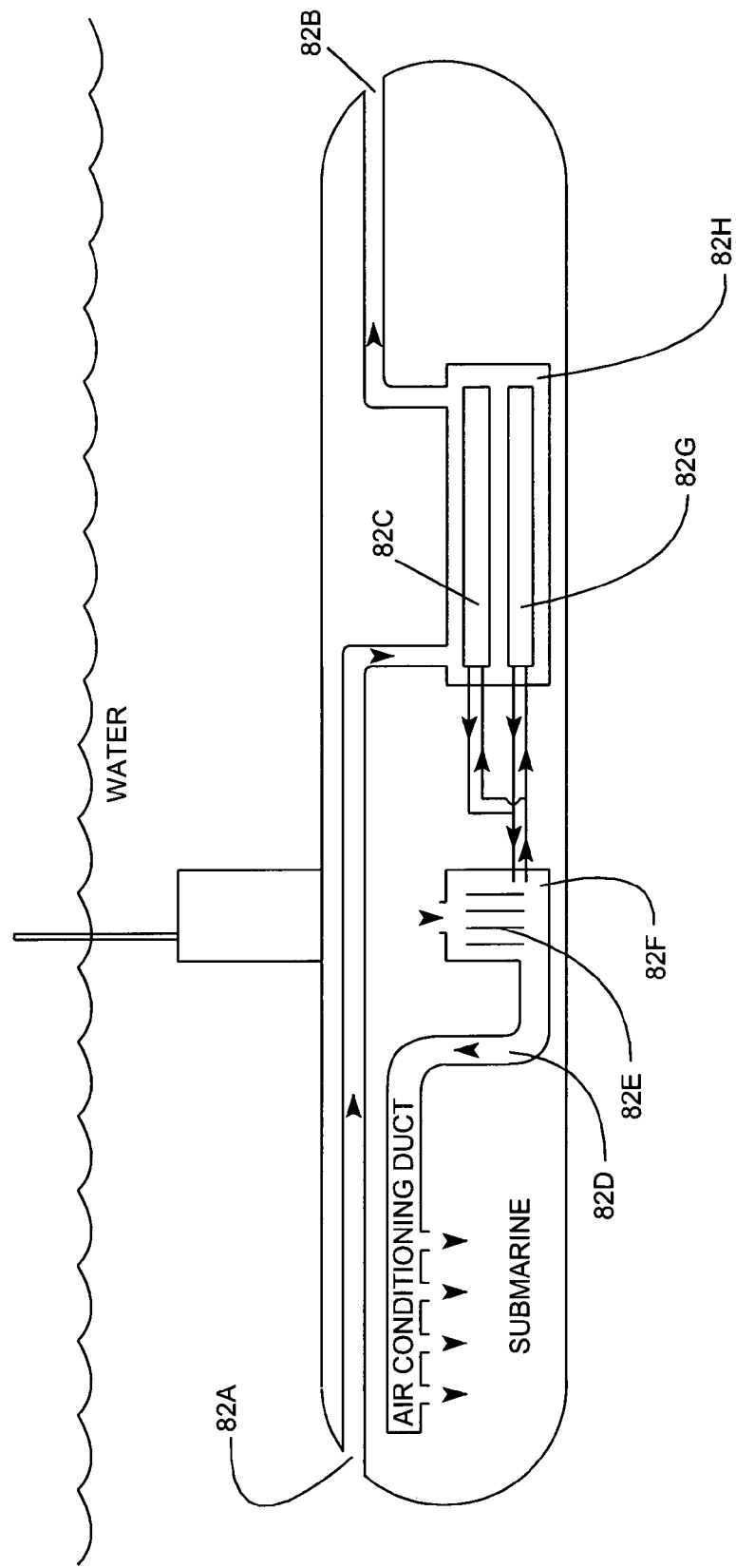
FIGS. 82 and 83 show the coaxial-flow heat exchanging structure of the present invention installed in a seawater heat exchanging system aboard a submarine for centralized and decentralized air condition and equipment cooling, wherein the purpose of the system is to reduce noise generation and increase the safety in case of a hull breach.
Figure 83:
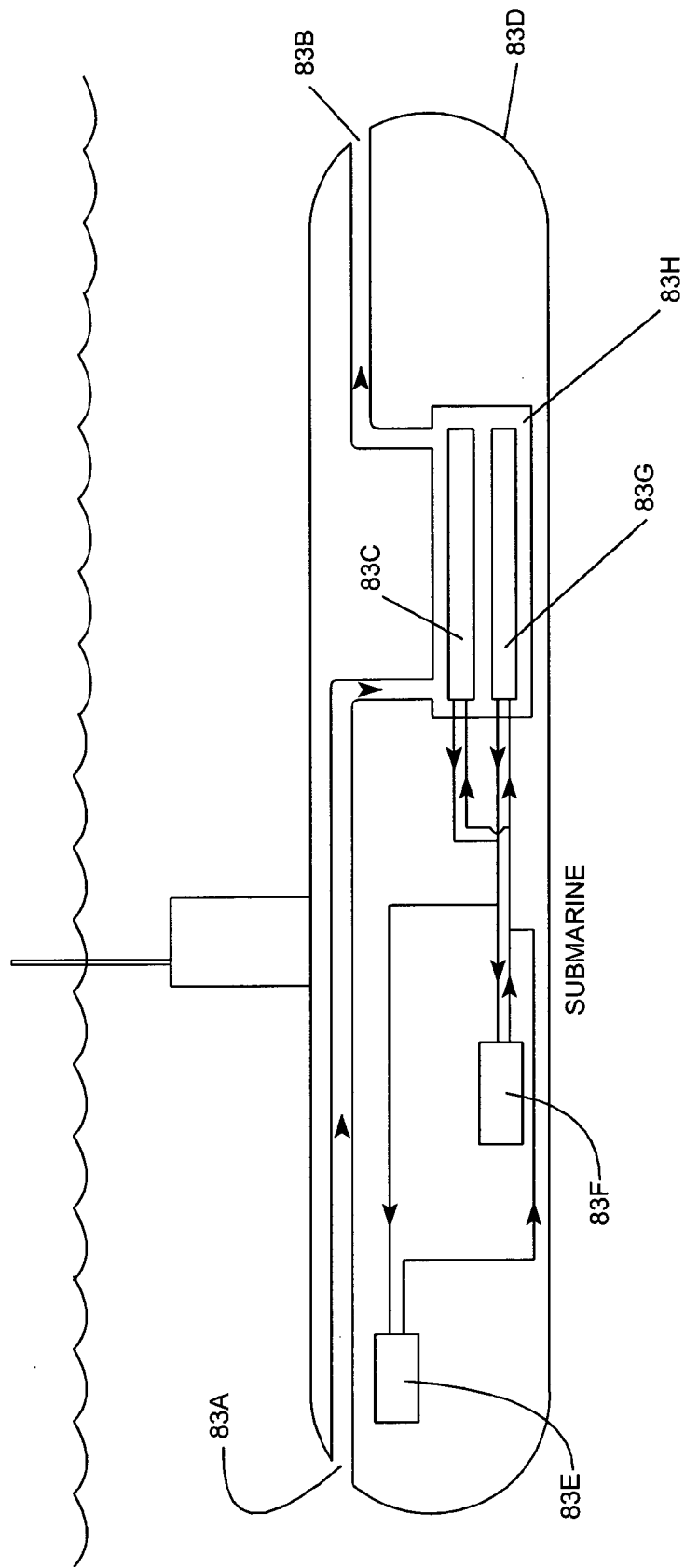

FIGS. 82 and 83 show the coaxial-flow heat exchanging structure of the present invention installed in a seawater heat exchanging system aboard a submarine, for centralized and decentralized air condition and equipment cooling. The purpose of the system is to reduce noise generation and increase the safety in case of a hull breach.

Figure 84:
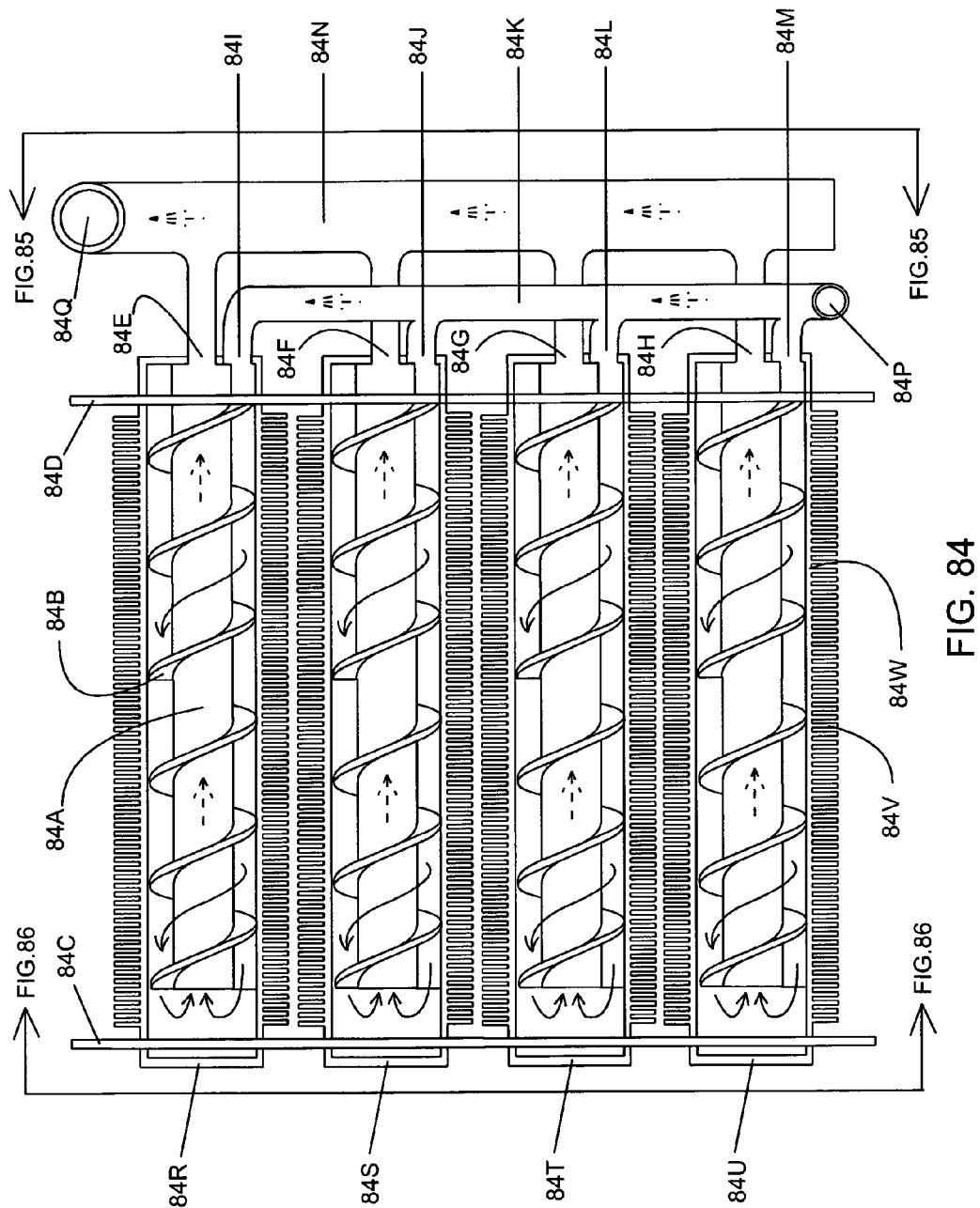
FIGS. 84, 85 and 86 show both side and cross-section views of the coaxial-flow heat exchangers of the present invention used in a submarine application, wherein the outer tubes are made of metal and they are finned to provide maximum heat transfer.
Figure 85:
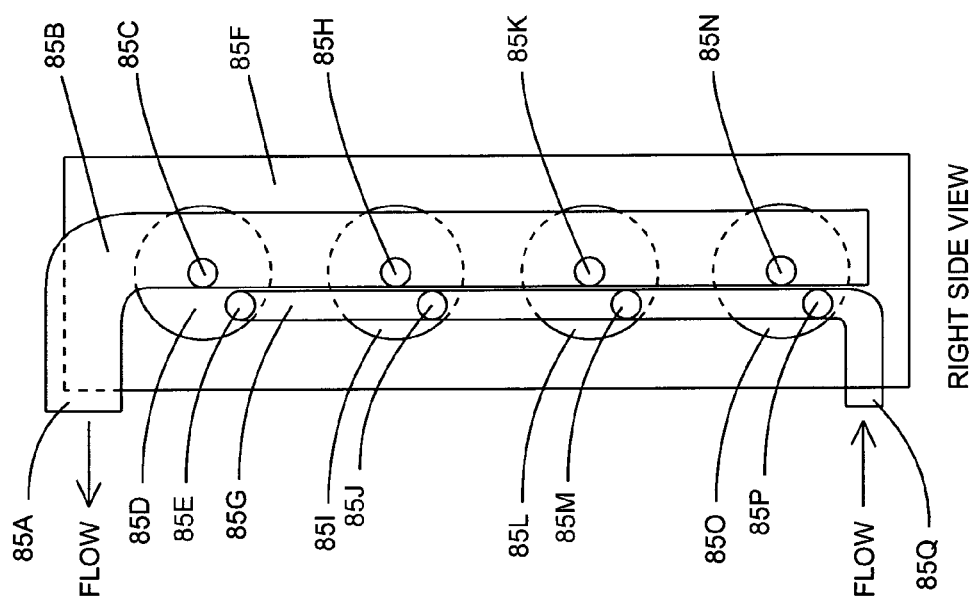
Figure 86:
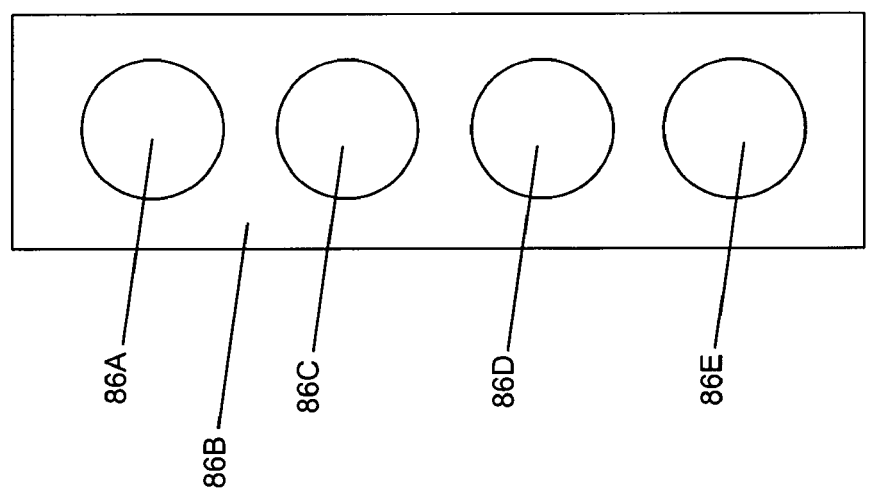

FIGS. 84, 85 and 86 show both side and cross-section views of an array of coaxial-flow heat exchangers of the present invention used in a submarine application. In this application, the outer tubes are made of metal and they are finned to provide maximum heat transfer. The fin width to thickness ratio is less than 10 to 1 to optimize the weight to heat transfer ratio. Also, mixed oxidant is injected into the seawater or a saltwater chlorinator to treat the seawater and prevent bio-film buildup on the fins. The heated seawater can be pre-diluted with fresh seawater to prevent showing a thermal plume around the submarine.

Figure 87:
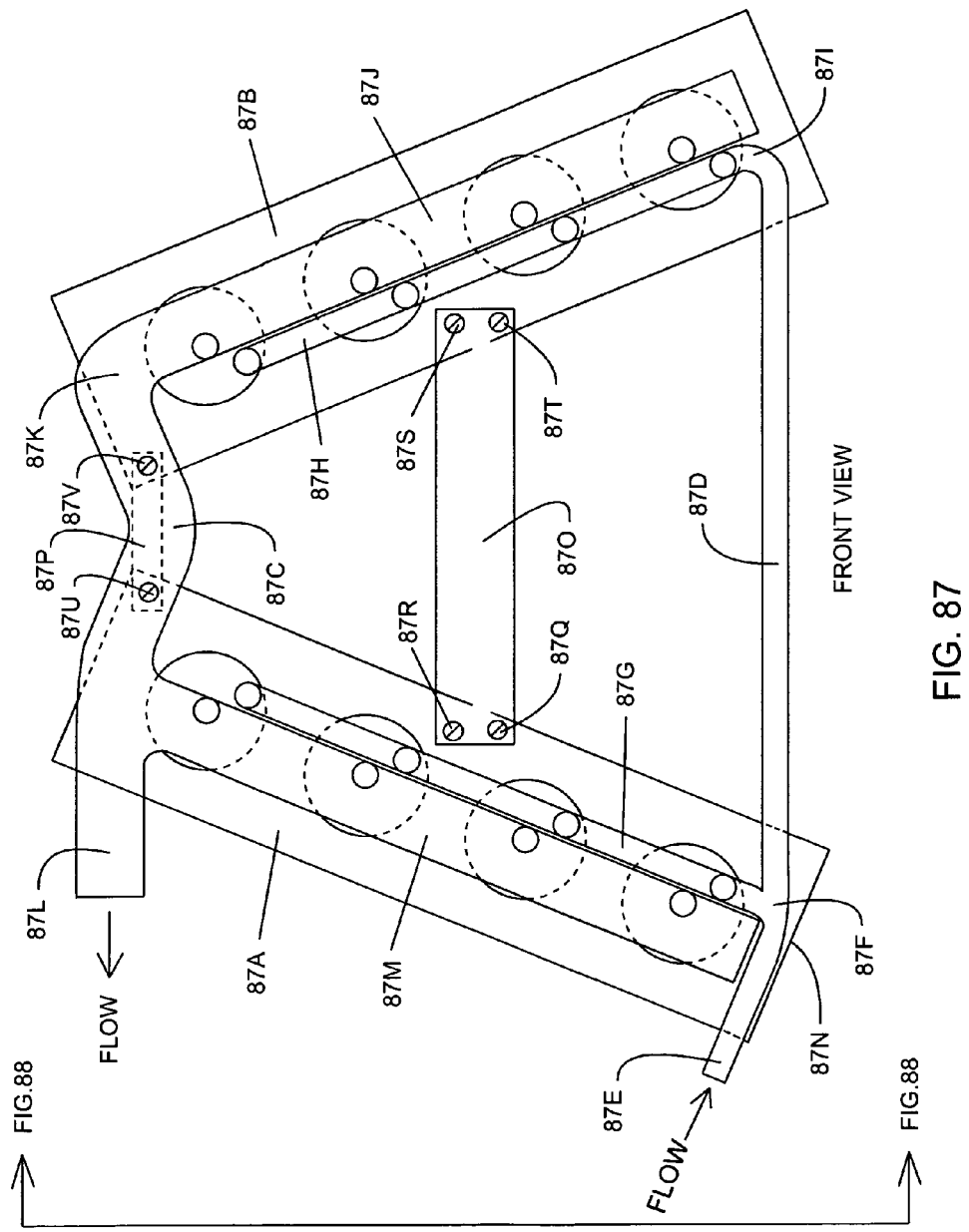
FIGS. 87, 88 and 89 show a side and cross-sectional views of the coaxial-flow heat exchanging structure of the present invention installed in an aqueous-based fluid to air heat exchanger.
Figure 88:
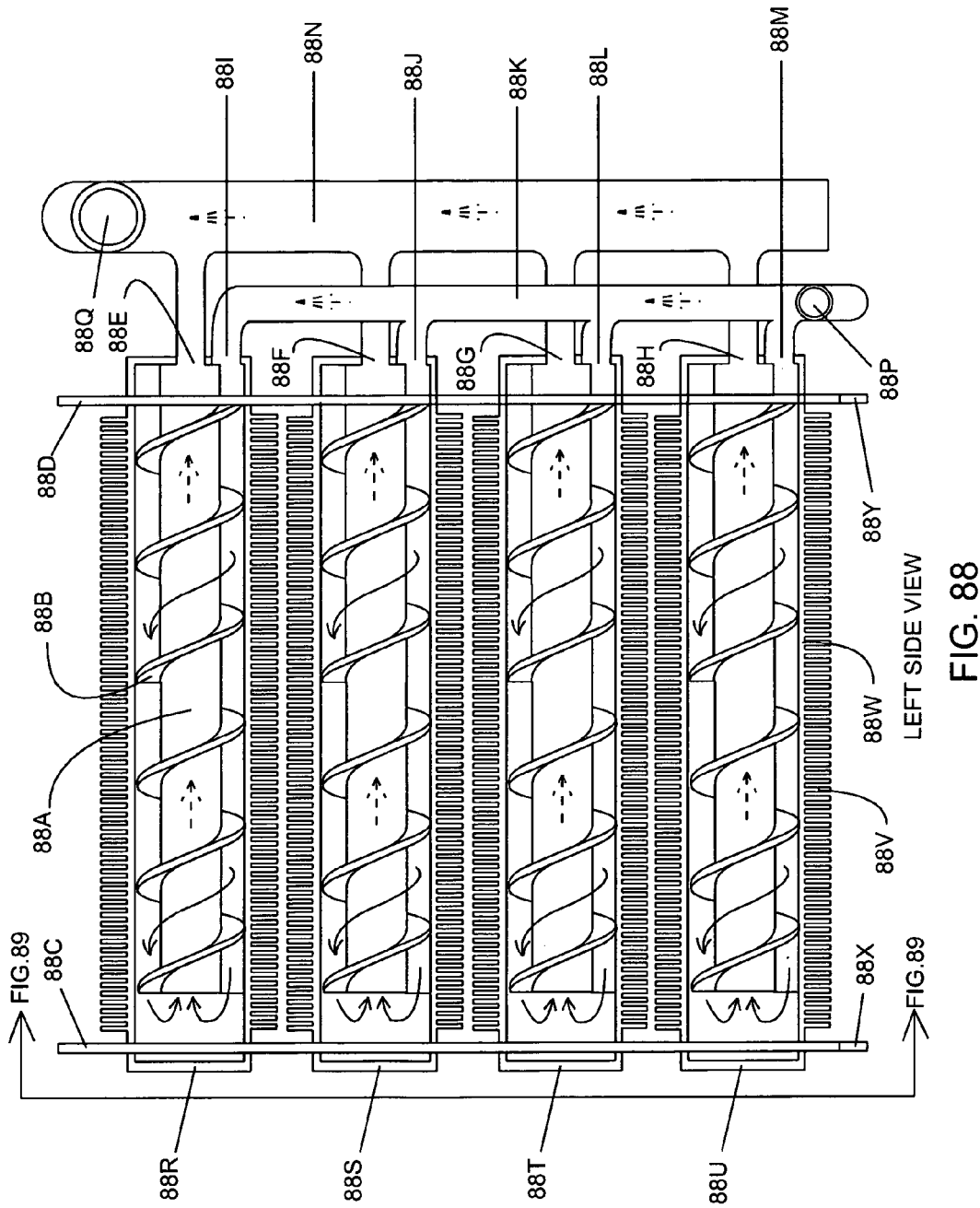
Figure 89:
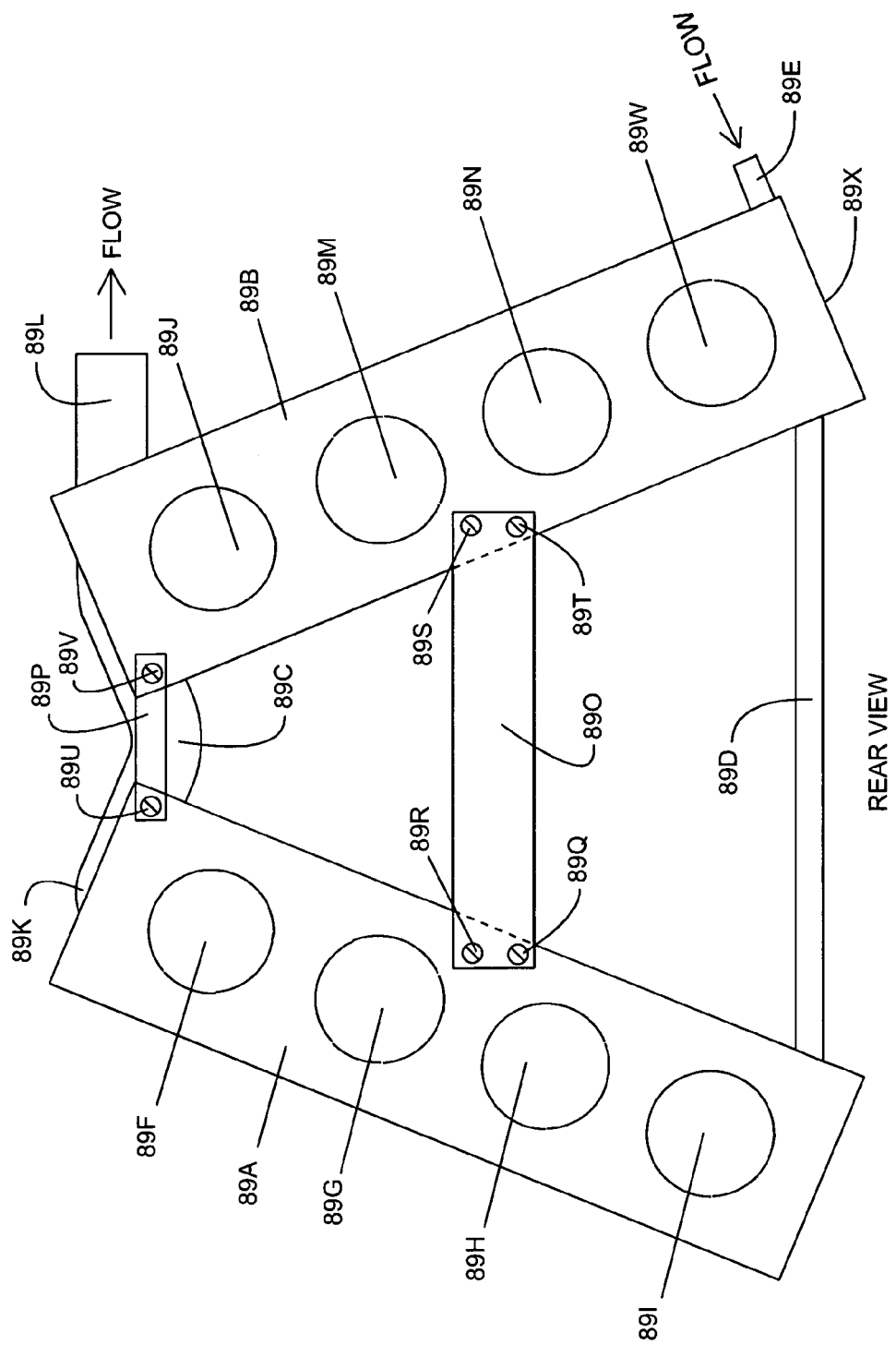

FIGS. 87, 88 and 89 show a side and cross-sectional views of the coaxial-flow heat exchanging structure of the present invention installed in an aqueous-based fluid to air heat exchanger. In this application, the heat exchanger is shown in an 'A' frame style. However, it can be used in the conventional block style. In this application, dirt particles are removed from the air with a filter or electrostatic precipitator, to prevent fouling the heat exchanger and reduce bio-film growth in the condensate line. Also, an optional ultraviolet light (not shown) can be used to sterilize the air and the surface of heat exchanger, to prevent mold and mildew from growing on the heat exchanger and in the duct work.

Figure 90:
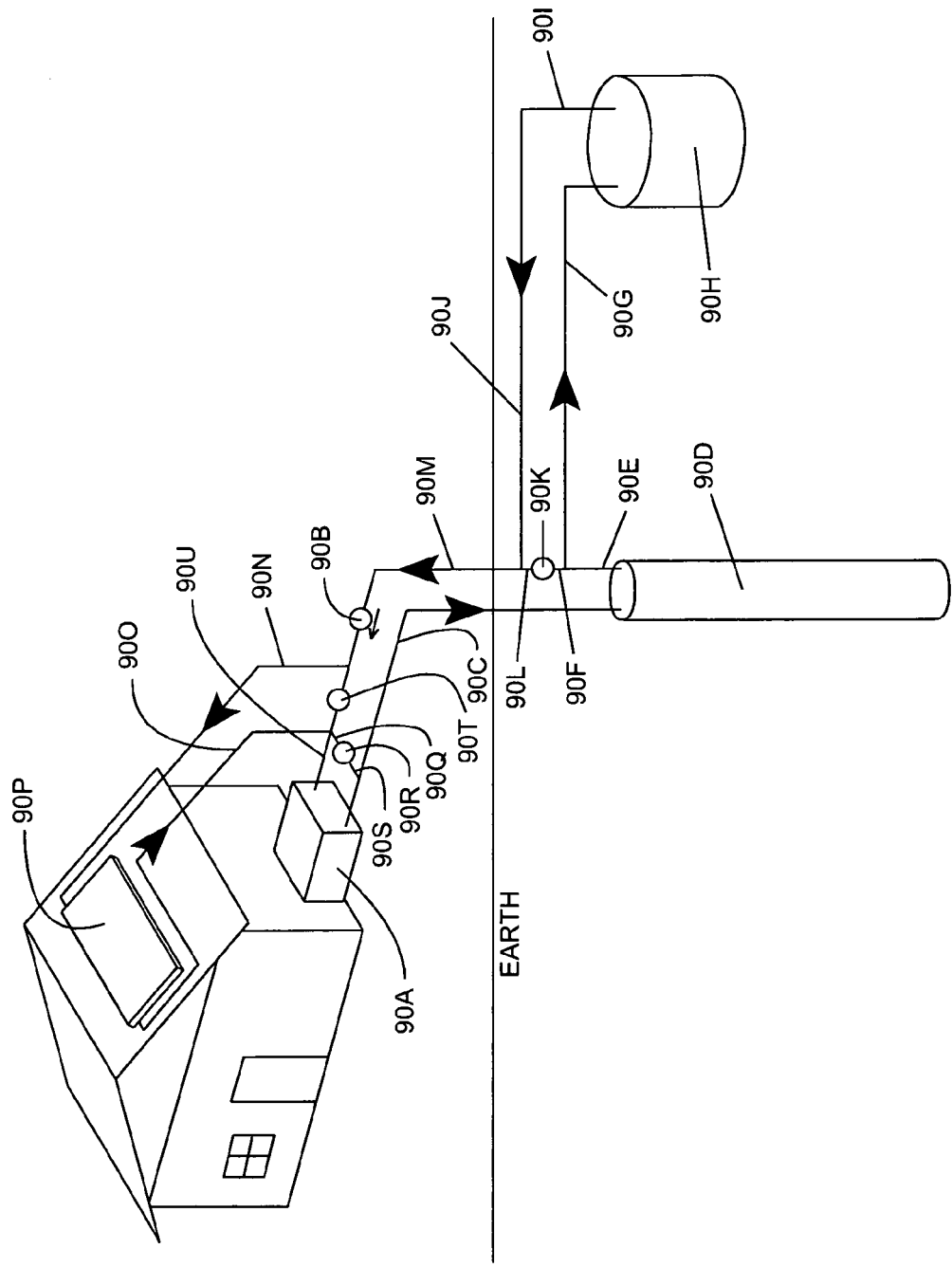
FIG. 90 shows the application of a single well heat exchanger for a residential home and multiple pad drilled heat exchangers for larger commercial heat and cooling loads, and wherein an optional thermal bank tank is provided for night time operation when the electrical energy cost are cheaper or for day time operation when solar cells can provide electrical energy.

FIG. 90 shows the application of a single well heat exchanger for a residential home and multiple pad drilled heat exchangers for larger commercial heat and cooling loads. In this application, an optional thermal bank tank is provided for night time operation when the electrical energy cost are cheaper or for day time operation when solar cells can provide electrical energy for remote cooling operations. For equipment used in cell phone towers, the ground loop can provide a uniform operational temperature. For rest area restrooms, solar cells with battery back up can power the heat pump to prevent freezing of the plumbing and provide guest comfort. Also, a long horizontal well drilled in an aquifer can replace a pad of deviated wells.

FIG. 91 shows a system of eleven deviated wells connected together in a heat pumping network. This schematic illustrates how the axial-flow heat exchanging structure of the present invention can be combined in various ways to realize improved heat pumps systems capable of handling diverse thermal loads.

Referring to FIGS. 92 through 94, apparatus will be described for manufacturing the helically-finned tubing used within the axial-flow heat exchanging structure of the present invention.

In FIG. 92, a rotating extrusion die is shown for manufacturing the helically-finned tubing within the coaxial-flow heat exchanging structure of the present invention. Preferably, the die is fabricated from a material compatible with the material being extruded and with a melting point temperature above that of the material being extruded. The die can be attached to a rotating fixture on the extrusion machinery using bolt holes 92H, 92I, 92J, and 92K. The rotatable extrusion die can also be welded to a rotating fixture.

As the liquid material is forced through the extrusion machinery outlet, the rotatable extrusion die 92A can rotate axially in the clockwise or counter-clockwise direction to form the flow guide through opening 92B. The axial flow heat exchanger flow guide tube and helical shaped flow guide is formed by material passing through opening 92L. The desired thickness of the flow guide and height of the flow guide from the external surface of the flowguide tube are determined by the dimensions of opening 92B. The inside surface of the flow guide tube is formed by surface 92N. The external surface of the flow guide tube is formed by surface 92M. The center mold core 92C is supported and connected to the rotatable die by support arms 92D, 92E, 92F, and 92G. The center mold core can extend beyond the front surface of 92A to support the extruded material as it exits the rotatable die which is determined by the material being extruded.

FIG. 93 shows how the center mold core 93C and 93E are held in position by support arms 93G, 93H, and 93I. The bolt holes 93J, 93K, and 93L can be drilled through or threaded. The flowguide tube external surface mold 93B and 93F shown can be perpendicular to the front surface of FIG. 92, 92A and can be angular. FIG. 94 shows how a rotatable extrusion die with the opening 94B is used to form the first flow guide and an additional flow guide opening 94C. Additional flowguide form openings can be cut or machined into the rotatable extrusion die 94A to form a number of flow guides desired during the extrusion process. FIG. 95 illustrates how the distance between the surface 95C of the mold core 95B determines the desired wall thickness of the flow guide tube as it is extruded through the rotatable extrusion die.

While various illustrative embodiments of the present invention have been disclosed in great detail herein above, is understood that the coaxial-flow heat-transfer technology employed in heat pump systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A coaxial-flow heat transfer system installed in a geological environment and facilitating the transfer of heat energy between an external heat energy exchanging system and said geological environment, said coaxial-flow heat transfer system comprising:

aqueous-based heat transfer fluid pumped through said external heat energy exchanging system to transfer heat between said aqueous-based heat transfer fluid and said external heat energy producing system; and a coaxial-flow heat transfer structure installed within said geological environment and including:

a proximal end;

a distal end;

an input port, provided at said proximal end, for receiving said aqueous-based heat transfer fluid at a first temperature from said external heat energy exchanging system;

an output port, provided at said proximal end, for outputting said aqueous-based heat transfer fluid at a second temperature to said external heat energy exchanging system;

an inner tube section having an outer wall surface extending between said proximal and distal ends, and supporting an inner flow channel having a substantially uniform inner diameter along its length and into which said aqueous-based heat transfer fluid can be introduced from said input port, and along which said aqueous-based heat transfer fluid flows towards said distal end; and an outer tube section, disposed coaxially around said inner tube section, and having an inner wall surface extending between said proximal and distal ends, and said outer tube section being in thermal communication with said geological environment and having a cap portion at said distal end sealing off said outer tube section from fluid leaks at said distal end;

wherein an outer flow channel is formed between the outer wall surface of said inner tube section and the inner wall surface of said outer tube section, and capable of conducting said aqueous-based heat transfer fluid flowing from the distal end of said inner flow channel and past said cap portion, along said outer flow channel towards said proximal end, so that the aqueous-based heat transfer fluid can exit from said output port and into said external heat energy exchanging system; and wherein a helically-arranged fin structure is disposed along a substantial portion of the length of said outer flow channel so as to form at least one helically-extending outer flow channel, for constantly rotating the aqueous-based heat transfer fluid flowing along said at least one helically-extending outer flow channel, from said distal end towards said proximal end, and thereby improving the transfer of heat energy between said aqueous-based heat transfer fluid and said geological environment along the length of said outer flow channel; and wherein the heat transfer process occurring between said aqueous-based heat transfer fluid and said geological environment is carried out without a change in state of said aqueous-based heat transfer fluid flowing within and along the inner and outer flow channels of said coaxial-flow heat transfer structure.

2. The coaxial-flow heat transfer system of claim 1, wherein said helically-arranged fin structure is mounted to the outer surface of said inner tube section.

3. The coaxial-flow heat transfer system of claim 1, wherein said helically-arranged fin structure is continuous along said flow channel.

4. The coaxial-flow heat transfer system of claim 1, wherein said helically arranged fin structure is mounted to the outer surface of the inner tube section.

5. The coaxial-flow heat transfer system of claim 1 wherein said inner tube section provides an insulating effect between said inner flow channel and said outer flow channel.

6. The coaxial-flow heat transfer system of claim 1, enables sinking of heat into the ground during cooling operations, or the sourcing of heat from the ground during heating operations.

7. The coaxial-flow heat transfer system of claim 1, wherein the coaxial-flow heat transfer structure functions as a sub-component of a heat pump system.

8. The coaxial-flow heat transfer system of claim 1, wherein said thermally conductive outer tube section is thermally-cemented into a bore drilled into the Earth.

9. The coaxial-flow heat transfer system of claim 8, wherein said bore extends through an aquifer.

10. The coaxial-flow heat transfer system of claim 1 which is installed in a deviated well bore.

11. The coaxial-flow heat transfer system of claim 10, wherein the deviated well bore is drilled nearly horizontal in an aquifer zone to maximize heat transfer to said geological environment.

12. The coaxial-flow heat transfer system of claim 11, wherein the deviated well bore uses a short turning radius to deviate from vertical to near horizontal and said thermally-conductive outer tube section is grouted to the surface to prevent aquifer contamination.

13. The coaxial-flow heat transfer system of claim 1, wherein said helically-arranged fin structure has a plurality of fin elements arranged at a predetermined pitch.

14. The coaxial-flow heat transfer system of claim 13, wherein said pitch and the number of fin elements are selected to rotate said aqueous-based heat transfer fluid at a desired circulation rate through said coaxial-flow heat transfer structure.

15. The coaxial-flow heat transfer system of claim 1, wherein said aqueous-based heat transfer fluid includes a heat transfer enhancing additive.

16. The coaxial-flow heat transfer system of claim 15, wherein said heat transfer enhancing additive is selected from the group consisting of biodegradable anti-freeze additives, and micron-sized particles, for increasing the heat capacity of said aqueous-based heat transfer fluid.

* * * * *